(12) United States Patent
Merkey et al.

(10) Patent No.: US 7,684,347 B2
(45) Date of Patent: Mar. 23, 2010

(54) METHOD AND APPARATUS FOR NETWORK PACKET CAPTURE DISTRIBUTED STORAGE SYSTEM

(75) Inventors: Jeffrey V Merkey, Lindon, UT (US); Bryan W Sparks, Lindon, UT (US)

(73) Assignee: Solera Networks, South Jordan, UT (US)

( * ) Notice: Subject to any disclaimer, the term of this patent is extended or adjusted under 35 U.S.C. 154(b) by 0 days.

(21) Appl. No.: 12/469,744

(22) Filed: May 21, 2009

(65) Prior Publication Data

US 2009/0219829 A1    Sep. 3, 2009

Related U.S. Application Data

(63) Continuation of application No. 12/356,079, filed on Feb. 4, 2009, which is a continuation of application No. 11/632,249, filed on Jan. 11, 2007, which is a continuation of application No. PCT/US2005/045566, filed on Dec. 16, 2005.

(60) Provisional application No. 60/638,707, filed on Dec. 23, 2004.

(51) Int. Cl.
*H04L 1/00* (2006.01)
*H04L 12/54* (2006.01)
*G06F 13/00* (2006.01)
*G06F 15/173* (2006.01)

(52) U.S. Cl. .................. 370/252; 370/428; 711/118; 711/136; 709/223; 709/224; 714/746

(58) Field of Classification Search ............... 711/118, 711/136, E12.103, E12.071, E12.016; 714/746, 714/E11.03; 370/252, 428; 709/223–224
See application file for complete search history.

(56) References Cited

U.S. PATENT DOCUMENTS

| | | | |
|---|---|---|---|
| 5,274,643 A | 12/1993 | Fisk | |
| 5,440,719 A | 8/1995 | Hanes et al. | |
| 5,526,283 A | 6/1996 | Hershey et al. | |
| 5,602,830 A | 2/1997 | Fichou et al. | |
| 6,041,053 A | 3/2000 | Douceur et al. | |
| 6,101,543 A | 8/2000 | Alden et al. | |
| 6,145,108 A | 11/2000 | Ketseoglou | |
| 6,185,568 B1 | 2/2001 | Douceur et al. | |
| 6,400,681 B1 | 6/2002 | Bertin et al. | |

(Continued)

FOREIGN PATENT DOCUMENTS

EP    0838930 A3    2/2003

(Continued)

*Primary Examiner*—Steven H Nguyen
(74) *Attorney, Agent, or Firm*—Dorsey & Whitney LLP

(57) ABSTRACT

This is invention comprises a method and apparatus for Infinite Network Packet Capture System (INPCS). The INPCS is a high performance data capture recorder capable of capturing and archiving all network traffic present on a single network or multiple networks. This device can be attached to Ethernet networks via copper or SX fiber via either a SPAN port (101) router configuration or via an optical splitter (102). By this method, multiple sources or network traffic including gigabit Ethernet switches (102) may provide parallelized data feeds to the capture appliance (104), effectively increasing collective data capture capacity. Multiple captured streams are merged into a consolidated time indexed capture stream to support asymmetrically routed network traffic as well as other merged streams for external consumption.

1 Claim, 20 Drawing Sheets

U.S. PATENT DOCUMENTS

| | | |
|---|---|---|
| 6,522,629 B1 | 2/2003 | Anderson, Sr. |
| 6,628,617 B1 | 9/2003 | Karol et al. |
| 6,675,218 B1 | 1/2004 | Mahler et al. |
| 6,693,909 B1 | 2/2004 | Mo et al. |
| 6,754,202 B1 | 6/2004 | Sun et al. |
| 6,789,125 B1 | 9/2004 | Aviani et al. |
| 6,907,468 B1 | 6/2005 | Moberg et al. |
| 6,958,998 B2 | 10/2005 | Shorey |
| 6,993,037 B2 | 1/2006 | Boden et al. |
| 6,999,454 B1 | 2/2006 | Crump |
| 7,002,926 B1 | 2/2006 | Eneboe et al. |
| 7,024,609 B2 | 4/2006 | Wolfgang et al. |
| 7,028,335 B1 | 4/2006 | Borella et al. |
| 7,032,242 B1 | 4/2006 | Grabelsky et al. |
| 7,039,018 B2 | 5/2006 | Singh et al. |
| 7,058,015 B1 | 6/2006 | Wetherall et al. |
| 7,061,874 B2 | 6/2006 | Merugu et al. |
| 7,065,482 B2 | 6/2006 | Shorey et al. |
| 7,072,296 B2 | 7/2006 | Turner et al. |
| 7,075,927 B2 | 7/2006 | Mo et al. |
| 7,116,643 B2 | 10/2006 | Huang et al. |
| 7,126,944 B2 | 10/2006 | Rangarajan et al. |
| 7,126,954 B2 | 10/2006 | Fang et al. |
| 7,142,507 B1 | 11/2006 | Kurimoto et al. |
| 7,145,906 B2 | 12/2006 | Fenner |
| 7,151,751 B2 | 12/2006 | Tagami et al. |
| 7,154,896 B1 | 12/2006 | Kim et al. |
| 7,162,649 B1 | 1/2007 | Ide et al. |
| 7,168,078 B2 | 1/2007 | Bar et al. |
| 7,200,122 B2 | 4/2007 | Goringe et al. |
| 7,203,173 B2 | 4/2007 | Bonney et al. |
| 7,218,632 B1 | 5/2007 | Bechtolsheim et al. |
| 7,237,264 B1 | 6/2007 | Graham et al. |
| 7,274,691 B2 | 9/2007 | Rogers |
| 7,277,399 B1 | 10/2007 | Hughes, Jr. |
| 7,283,478 B2 | 10/2007 | Barsheshet et al. |
| 7,292,591 B2 | 11/2007 | Parker et al. |
| 7,340,776 B2 | 3/2008 | Zobel et al. |
| 7,376,731 B2 | 5/2008 | Khan et al. |
| 7,376,969 B1 | 5/2008 | Njemanze et al. |
| 7,379,426 B2 | 5/2008 | Sekiguchi |
| 7,391,769 B2 | 6/2008 | Rajkumar et al. |
| 7,406,516 B2 | 7/2008 | Davis et al. |
| 7,408,938 B1 | 8/2008 | Chou et al. |
| 7,420,992 B1 | 9/2008 | Fang et al. |
| 7,423,979 B2 | 9/2008 | Martin |
| 7,433,326 B2 | 10/2008 | Desai et al. |
| 7,440,464 B2 | 10/2008 | Kovacs |
| 7,441,267 B1 | 10/2008 | Elliott |
| 7,444,679 B2 | 10/2008 | Tarquini et al. |
| 7,450,560 B1 | 11/2008 | Grabelsky et al. |
| 7,453,804 B1 | 11/2008 | Feroz et al. |
| 7,457,277 B1 | 11/2008 | Sharma et al. |
| 7,457,296 B2 | 11/2008 | Kounavis et al. |
| 7,457,870 B1 | 11/2008 | Lownsbrough et al. |
| 7,480,255 B2 | 1/2009 | Bettink |
| 7,489,635 B2 | 2/2009 | Evans et al. |
| 7,493,654 B2 | 2/2009 | Bantz et al. |
| 7,496,097 B2 | 2/2009 | Rao et al. |
| 7,499,590 B2 | 3/2009 | Seeber |
| 7,512,078 B2 | 3/2009 | Swain et al. |
| 7,512,081 B2 | 3/2009 | Ayyagari et al. |
| 7,522,499 B2 | 4/2009 | Aggarwal et al. |
| 7,522,521 B2 | 4/2009 | Bettink et al. |
| 7,522,594 B2 | 4/2009 | Piche et al. |
| 7,522,604 B2 | 4/2009 | Hussain et al. |
| 7,522,605 B2 | 4/2009 | Spencer et al. |
| 7,522,613 B2 | 4/2009 | Rotsten et al. |
| 7,525,910 B2 | 4/2009 | Wen |
| 7,525,963 B2 | 4/2009 | Su et al. |
| 7,526,795 B2 | 4/2009 | Rollins |
| 7,529,196 B2 | 5/2009 | Basu et al. |
| 7,529,242 B1 | 5/2009 | Lyle |
| 7,529,276 B1 | 5/2009 | Ramakrishnan |
| 7,529,932 B1 | 5/2009 | Haustein et al. |
| 7,529,939 B2 | 5/2009 | Bruwer |
| 7,532,623 B2 | 5/2009 | Rosenzweig et al. |
| 7,532,624 B2 | 5/2009 | Ikegami et al. |
| 7,532,633 B2 | 5/2009 | Rijsman |
| 7,532,726 B2 | 5/2009 | Fukuoka et al. |
| 7,533,256 B2 | 5/2009 | Walter et al. |
| 7,533,267 B2 | 5/2009 | Yoshimura |
| 2002/0085507 A1 | 7/2002 | Ku et al. |
| 2002/0089937 A1 | 7/2002 | Venkatachary et al. |
| 2002/0173857 A1* | 11/2002 | Pabari et al. .................. 700/1 |
| 2003/0221003 A1 | 11/2003 | Storry et al. |
| 2003/0231632 A1 | 12/2003 | Haeberlen |
| 2004/0010473 A1 | 1/2004 | Hsu et al. |
| 2004/0078292 A1 | 4/2004 | Blumenau |
| 2004/0103211 A1 | 5/2004 | Jackson et al. |
| 2005/0015547 A1 | 1/2005 | Yokohata et al. |
| 2005/0055399 A1 | 3/2005 | Savchuk |
| 2005/0083844 A1 | 4/2005 | Zhu et al. |
| 2005/0117513 A1 | 6/2005 | Park et al. |
| 2005/0132046 A1 | 6/2005 | de la Iglesia et al. |
| 2005/0207412 A1 | 9/2005 | Kawashima et al. |
| 2006/0013222 A1 | 1/2006 | Rangan et al. |
| 2006/0037072 A1 | 2/2006 | Rao et al. |
| 2006/0069821 A1 | 3/2006 | P et al. |
| 2006/0088040 A1 | 4/2006 | Kramer et al. |
| 2006/0114842 A1 | 6/2006 | Miyamoto et al. |
| 2006/0126665 A1 | 6/2006 | Ward et al. |
| 2006/0165009 A1 | 7/2006 | Nguyen et al. |
| 2006/0165052 A1 | 7/2006 | Dini et al. |
| 2006/0167894 A1 | 7/2006 | Wunner |
| 2006/0168240 A1 | 7/2006 | Olshefski |
| 2006/0203848 A1 | 9/2006 | Damphier et al. |
| 2006/0233118 A1 | 10/2006 | Funk et al. |
| 2007/0019640 A1 | 1/2007 | Thiede |
| 2007/0036156 A1 | 2/2007 | Liu et al. |
| 2007/0050465 A1 | 3/2007 | Canter et al. |
| 2007/0058631 A1 | 3/2007 | Mortier et al. |
| 2007/0140295 A1 | 6/2007 | Akaboshi |
| 2007/0147263 A1 | 6/2007 | Liao et al. |
| 2007/0162609 A1 | 7/2007 | Pope et al. |
| 2007/0162971 A1 | 7/2007 | Blom et al. |
| 2007/0286175 A1 | 12/2007 | Xu et al. |
| 2007/0291755 A1 | 12/2007 | Cheng et al. |
| 2007/0291757 A1 | 12/2007 | Dobson et al. |
| 2007/0297349 A1 | 12/2007 | Arkin |
| 2008/0117903 A1 | 5/2008 | Uysal |
| 2008/0175167 A1 | 7/2008 | Satyanarayanan et al. |
| 2008/0247313 A1 | 10/2008 | Nath et al. |
| 2009/0003363 A1 | 1/2009 | Benco et al. |
| 2009/0006672 A1 | 1/2009 | Blumrich et al. |
| 2009/0028161 A1 | 1/2009 | Fullarton et al. |
| 2009/0028169 A1 | 1/2009 | Bear et al. |
| 2009/0041039 A1 | 2/2009 | Bear et al. |
| 2009/0073895 A1 | 3/2009 | Morgan et al. |
| 2009/0092057 A1 | 4/2009 | Doctor et al. |
| 2009/0097417 A1 | 4/2009 | Asati et al. |
| 2009/0097418 A1 | 4/2009 | Castillo et al. |
| 2009/0103531 A1 | 4/2009 | Katis et al. |
| 2009/0109875 A1 | 4/2009 | Kaneda et al. |
| 2009/0113217 A1 | 4/2009 | Dolgunov et al. |
| 2009/0116403 A1 | 5/2009 | Callanan et al. |
| 2009/0116470 A1 | 5/2009 | Berggren |
| 2009/0119501 A1 | 5/2009 | Petersen |
| 2009/0122801 A1 | 5/2009 | Chang |

FOREIGN PATENT DOCUMENTS

| | | |
|---|---|---|
| EP | 1387527 A1 | 2/2004 |
| EP | 1004185 B1 | 9/2005 |

| | | | | | |
|---|---|---|---|---|---|
| EP | 1971087 | A1 | 9/2008 | JP | 2002064507 A | 2/2002 |
| EP | 1715627 | B1 | 10/2008 | | | |
| GB | 2337903 | A | 12/1999 | * cited by examiner | | |

Figure 7

```
+-----------------------------------------------+:
Network Interface Statistics Monitor
+-----------------------------------------------+:
| Network Interface       : eth1 (12)
| Device Type             : Ethernet
| Inet6 addr: fe80:0000:0000:0000:0230:48ff:fe28:d00b Scope: Link
| HWAddr: 00:30:48:28:D0:0B
| UP BROADCAST RUNNING MULTICAST
| MTU:1500 Metric:1 TX Queuelen:100
| Interrupt:11 Base address:0x3040 Memory:fc220000-0
| duplex-FULL line_speed-100 link_status-ACTIVE
| packets/second          : 1
| bytes/second            : 60
| dropped packets/second  : 0
| max packets/second      : 522
| max bytes/second        : 178094
| max drop packets/second : 0
| total packets captured  : 6311
| total bytes captured    : 1172764
*| dropped no buffers     : 0
+-----------------------------------------------+
```

Figure 8

```
+-----------------------------------------------+:
Disk Space Record Monitor
+-----------------------------------------------+:
*| disk space date/time   : 0x40A0F49D
|  member count           : 1
|  disk Id                : 20
|  partition Id           : 0
|  slot size              : 134283264 bytes
|  total slots            : 13404
|  cluster size           : 65536
|  total clusters         : 27465752
|  total 4K blocks        : 439452042
|  disk record blocks     : 3
|  logical data area start: 0x00000001
|  start of slot data     : 0x00000009
|  start of space table   : 0x00000001
|  space table size       : 483328 bytes
|  recycle count          : 0
|  starting LBA           : 0x00000040
*| 512 byte sector count  : 0xD18C0C50
+-----------------------------------------------+
```

Figure 9

```
+------------------------------------------------------------+
|                     Slot Chain Monitor                     |
+------------------------------------------------------------+
|                                                            |
|   INPCS Up Time     : 0 years 0 days 2 hours 32 min 13 sec |
|                                                            |
| Active Slot Chains                                         |
|                                                            |
| eth1 start/end 00000000->00000000 time start/end 40A0F49E/40A1184B
|   start: Tue May 11 09:43:26 2004  end: Tue May 11 12:15:39 2004
|   slots-1 elements-5851 size-134283264 bytes               |
|   active slot 0/72930000 packets-5850 ringbufs-512         |
|   total_bytes-1178564 metadata-327600                      |
|                                                            |
|   slot 00000000 elements-5851 size-1178824 slice_bytes-429183
|   start: Tue May 11 09:43:26 2004  end: Tue May 11 12:15:39 2004
|                                                            |
|                                                            |
|                                                            |
|                                                            |
+------------------------------------------------------------+
```

Figure 10

DSFS File System Organization

/ directory 2-eth0
3-eth1
/slots directory 0-2-eth0-12012004-101100-12012004-140000
1-2-eth0-12012004-140001-12012004-170000
2-2-eth0-12012004-170001-12012004-190023
3-3-eth1-12012004-101100-12012004-210133

/slice directory 0-2-eth0-12012004-101100-12012004-140000 -slice
1-2-eth0-12012004-140001-12012004-170000 -slice
2-2-eth0-12012004-170001-12012004-190023 -slice
3-3-eth1-12012004-101100-12012004-210133 -slice /create directory 0-predator.devicelogics.com
1-predator.devicelogics.com
2-predator.devicelogics.com
3-predator.devicelogics.com

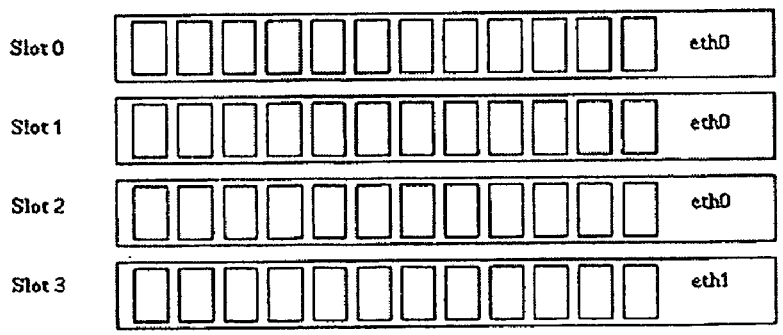

The Disk Space Record for a dsfs partition contains partition layout or slot storage and meta-table sizes and locations by cluster offset from the start of a partition.

Slot Storage Element layout

Slot Buffer storage elements consist of a 64K cluster at the beginning of the slot which stores meta data describing the slot buffers. Slots can consist of 16-2048 64K buffers.

Slot Storage Element internal storage method

Slot Chain Table

Space Table Layout

METHOD AND APPARATUS FOR NETWORK PACKET CAPTURE DISTRIBUTED STORAGE SYSTEM

This application is a continuation accelerated examination patent application of U.S. patent application Ser. No. 12/356,079, filed Feb. 4, 2009 and titled "Method and Apparatus for Network Packet Capture Distributed Storage System;" which is a continuation patent application of U.S. patent application Ser. No. 11/632,249, filed Jan. 11, 2007 and titled "Method and Apparatus for Network Packet Capture Distributed Storage System;" which is a national phase patent application filed under 35 U.S.C. §317 of PCT Patent Application No. PCT/US05/45566, filed Dec. 16, 2005 and titled "Method and Apparatus for Network Packet Capture Distributed Storage System;" which claims the benefit of U.S. Provisional Patent Application No. 60/638,707, filed Dec. 23, 2004 and titled "Method and Apparatus for Network Packet Capture Distributed Storage System." The disclosures of application Ser. No. 12/356,079, 11/632,249 and 60/638,707 are hereby incorporated by reference herein in their entireties.

BACKGROUND

The present invention relates to capturing and archiving computer network traffic. Networks allowing computer users to communicate and share information with one another are ubiquitous in business, government, educational institutions, and homes. Computers communicate with one another through small and large local area networks (LANs) that may be wireless or based on hard-wired technology such as Ethernet or fiber optics. Most local networks have the ability to communicate with other networks through wide area networks (WANs). The interconnectivity of these various networks ultimately enables the sharing of information throughout the world via the Internet. In addition to traditional computers, other information sharing devices may interact with these networks, including cellular telephones, personal digital assistants (PDAs) and other devices whose functionality may be enhanced by communication with other persons, devices, or systems.

The constant increase in the volume of information exchanged through networks has made network management both more important and more difficult. Enforcement of security, audit, policy compliance, network performance and use analysis policies, as well as data forensics investigations and general management of a network may require access to prior network traffic. Traditional storage systems, generally based on magnetic hard disk drive technology, have not been able to keep pace with expanding network traffic loads due to speed and storage capacity limitations. Use of arrays of multiple hard disks, increases speed and capacity but even the largest arrays based on traditional operating system and network protocol technologies lack the ability to monolithically capture and archive all traffic over a large network. Capture and archive systems based on current technologies also become part of the network in which they function, rendering them vulnerable to covert attacks or "hacking" and thus limiting their security and usefulness as forensic and analytical tools.

To overcome these limitations, a robust network packet capture and archiving system must utilize the maximum capabilities of the latest hardware technologies and must also avoid the bottlenecks inherent in current technologies. Using multiple gigabit Ethernet connections, arrays of large hard disk drives, and software that by-passes traditional bottlenecks by more direct communication with the various devices, it is possible to achieve packet capture and archiving on a scale capable of handling the traffic of the largest networks.

SUMMARY

The present invention describes an Infinite Network Packet Capture System (INPCS). The INPCS is a high performance data capture recorder capable of capturing and archiving all network traffic present on a single network or multiple networks. The captured data is archived onto a scalable, infinite, disk based LRU (least recently used) caching system at multiple gigabit (Gb) line speeds. The INPCS has the ability to capture and stream to disk all network traffic on a gigabit Ethernet network and allows this stored data to be presented as a Virtual File System (VFS) to end users. The file system facilitates security, forensics, compliance, analytics and network management applications. The INPCS also supports this capability via T1/T3 and other network topologies that utilize packet based encapsulation methods.

The INPCS does not require the configuration of a protocol stack, such as TCIP/IP, on the network capture device. As a result, the INPCS remains "invisible" or passive and thus not detectable or addressable from network devices being captured. Being undetectable and unaddressable, INPCS enhances security and forensic reliability as it cannot be modified or "hacked" from external network devices or directly targeted for attack from other devices on the network.

INPCS also provides a suite of tools and exposes the captured data in time sequenced playback, as a virtual network interface or virtual Ethernet device, a regenerated packet stream to external network segments and as a VFS file system that dynamically generates industry standard LIBPCAP (TCPDUMP) file formats. These formats allow the capture data to be imported into any currently available or custom applications that that support LIBPCAP formats. Analysis of captured data can be performed on a live network via INPCS while the device is actively capturing and archiving data.

In its basic hardware configuration, the INPCS platform is rack mountable device capable of supporting large arrays of RAID 0/RAID 5 disk storage with high performance Input/Output (I/O) system architectures. Storage of high-density network traffic is achieved by using copy-less Direct Memory Access (DMA). The INPCS device can sustain capture and storage rates of over 350 MB/s (megabytes per second). The device can be attached to Ethernet networks via, copper or fiber via either a SPAN port router configuration or via an optical splitter. The INPCS also supports the ability to merge multiple captured streams of data into a consolidated time indexed capture stream to support asymmetrically routed network traffic as well as other merged streams for external access, facilitating efficient network management, analysis, and forensic uses.

The INPCS software may be independently used as a standalone software package compatible with existing Linux network interface drivers. This offering of the INPCS technology provides a lower performance metric than that available in the integrated hardware/software appliance but has the advantage of being portable across the large base of existing Linux supported network drivers. The standalone software package for INPCS provides all the same features and application support as available with the appliance offering above described, but does not provide the high performance disk I/O and copy-less Direct Memory Access (DMA) switch technology of the integrated appliance.

Captured network traffic can be exposed to external appliances and devices or appropriate applications running on the INPCS appliance utilizing three primary methods: a VFS file system exposing PCAP formatted files, a virtual network interface (Ethernet) device and through a regenerated stream of packets to external network segments feeding external appliances. The INPCS file system acts as an on-disk LRU (least recently used) cache and recycles the oldest captured data when the store fills and allows continuous capture to occur with the oldest data either being recycled and overwritten or transferred to external storage captured network traffic. This architecture allows for an infinite capture system. Captured packets at any given time in the on-disk store represents a view in time of all packets captured from the oldest packets to the newest. By increasing the capacity of the disk array, a system may be configured to allow a predetermined time window on all network traffic from a network of a predetermined traffic capacity. For example a business, government entity, or university can configure an appliance with sufficient disk array storage to allow examination and analysis of all traffic during the prior 24 hours, 48 hours, or any other predetermined time frame.

BRIEF DESCRIPTION OF THE DRAWINGS

Other features and advantages of the present invention will be apparent from reference to a specific embodiment of the invention as presented in the following Detailed Description taken in conjunction with the accompanying Drawings, in which:

FIG. 7 depicts a tabular report generated by the DSMON utility showing Network Interface information;

FIG. 8 depicts a tabular report generated by the DSMON utility showing disk space information;

FIG. 9 depicts a tabular report generated by the DSMON utility showing slot chain information;

FIG. 10 depicts the DSFS file system organization;

DETAILED DESCRIPTION

The INPCS is a high performance data capture recorder capable of capturing all network traffic present on a network or on multiple networks and archiving the captured data on a scalable, infinite, disk based LRU (least recently used) caching system, as is known in the art, at multiple gigabit (Gb) line speeds. INPCS has the ability to capture and stream to disk all network traffic on a gigabit Ethernet network and to present the data as a Virtual File System (VFS). End users may access information by retrieving it from the VFS to facilitate network security, forensics, compliance, analytics and network management applications as well as media applications utilizing video or audio formats. INPCS also supports this capability via T1/T3 and other topologies known in the art that utilize packet based encapsulation methods.

The INPCS does not require the configuration of a protocol stack, such as TCP/IP, on the capture network device. This makes the INPCS "invisible" or passive and not addressable from the capture network segment. In this way, the device can't be targeted for attack since it can't be addressed on the network. The INPCS also provides a suite of tools to retrieve the captured data in time sequenced playback, as a virtual network interface or virtual Ethernet device, a regenerated packet stream to external network segments, or as a VFS that dynamically generates LIBPCAP (Packet Capture file format) and TCPDUMP (TCP protocol dump file format), CAP, CAZ, and industry standard formats that can be imported into any appropriate application that supports these formats. LIBPCAP is a system-independent interface for user-level packet capture that provides a portable framework for low-level network monitoring. Applications include network statistics collection, security monitoring, network debugging. The INPCS allows analysis of captured data while the device is actively capturing and archiving data.

Figure 1:
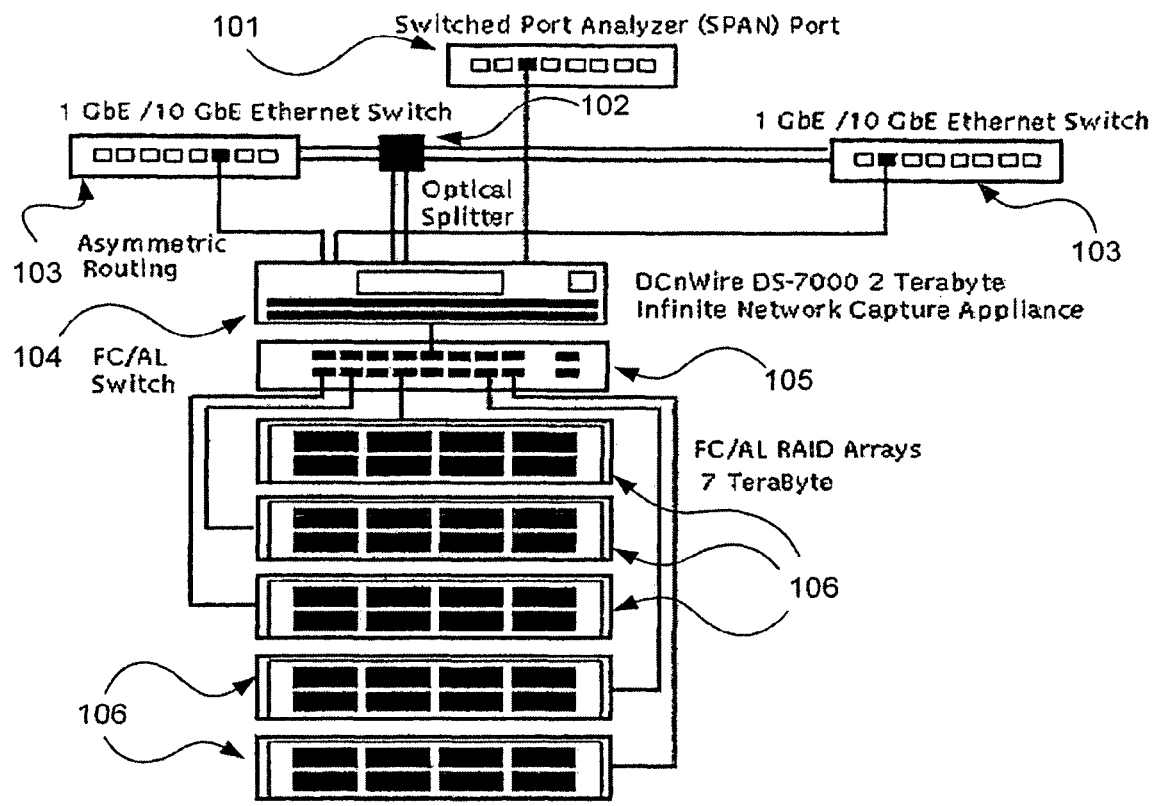
FIG. 1 depicts the hardware configuration of the INPCS appliance.

FIG. 1 depicts one embodiment of the hardware configuration of the integrated INPCS appliance. In this configuration the INPCS platform is rack mountable device that supports large amounts of RAID 0/RAID 5/RAID 0+1 and RAID 1 disk storage with high performance Input/Output (I/O) system architectures. The INPCS device can sustain capture and storage rates of over 350 MB/s (megabytes per second). The device can be attached to Ethernet networks via, copper or SX fiber via either a SPAN port (port mirrored) 101 router configuration or via an optical splitter 102. By this method, multiple sources of network traffic including gigabit Ethernet switches 103 may provide parallelized data feeds to the capture appliance 104, effectively increasing collective data capture capacity. Multiple captured streams of data are merged into a consolidated time indexed capture stream to support asymmetrically routed network traffic as well as other merged streams for external consumption.

Figure 2:
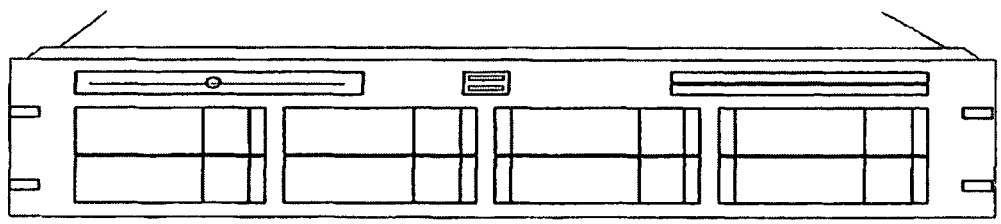
FIG. 2 depicts an INPCS 8x400 Appliance Chassis.

The merged data stream is archived to an FC-AL SAN (Fiber Channel Arbitrated Loop Storage Area Network) as is known in the art. The FC-AL switch 105 shown in FIG. 1 offers eight ports with dedicated non-blocking 100 MB/second or 1 GB/second point-point parallel connections. These ports direct the captured network traffic to multiple FL-AL RAID Arrays 106. The depicted arrays each provide a total storage capacity of 7 Terabyte and may be configured using standard RAID configurations as known in the art. The present embodiment provides a controller that supports RAID 0 (striping without redundancy) or RAID 5 (distributed parity), RAID 0+1 (mirrors with stripes), RAID 1 (mirrors) as the preferred storage modes. FIG. 2 depicts a typical appliance chassis (2U configuration) designed to hold up to 8 standard 3-inch hard disk drives, and the associated hardware, firmware, and software. In the current embodiment of the invention, each chassis would contain eight 400 GB hard disk drives for a total storage capacity of 3.2 Terabytes per chassis.

The INPCS platform is a UL/TUV and EC certified platform and is rated as a Class A FCC device. The INPCS unit also meets TUV-1002, 1003, 1004, and 1007 electrostatic discharge immunity requirements and EMI immunity specifications. The INPCS platform allows console administration via SSH (Secure Shell access) as well as by attached atty and tty serial console support through the primary serial port ensuring a secure connection to the device. The unit supports hot swapping of disk drives and dynamic fail over of IDE devices via RAID 5 fault tolerant configuration. The unit also supports a high performance RAID 0 array configuration for supporting dual 1000 Base T (1 Gb) stream to disk capture.

Captured network traffic stored on the SAN can be exposed to external appliances and devices or appropriate applications running on the INPCS appliance utilizing three primary methods: a VFS file system exposing PCAP formatted files, a virtual network interface (Ethernet) device and through a regenerated stream of packets to external network segments feeding external appliances. The INPCS file system acts as an on-disk LRU (least recently used) cache and recycles the oldest captured data when the store fills and allows continuous capture to occur with the oldest data either being recycled and overwritten or transferred to external storage for permanent archive of captured network traffic. This architecture allows for an infinite capture system.

In the VFS file system, files are dynamically generated by an implemented Linux VFS, known in the art, that resides on top of the disk LRU that INPCS employs to capture network traffic to the disk. Since INPCS presents data via a standard VFS, this allows this data to be easily imported or accessed by applications or to be exported to other computer systems on using network standards such as scp (secure copy), HTTPS (secure Hyper Text Transport Protocol), SMB (Microsoft's Server Message Block protocol) or NFS (the Unix Network File System protocol. This allows the INPCS device to be installed in a wide range of disparate networking environments. Additionally, exposing the captured network traffic through a file system facilitates transfer or backup to external devices including data tapes, compact discs (CD), and data DVDs. A file system interface for the captured traffic allows for easy integration into a wide range of existing applications that recognize and read such formats.

The INPCS allows the archived data to be accessed as Virtual Network Interface using standard Ethernet protocols. Many security, forensics and network management applications have interfaces that allow them to open a network interface card directly, bypassing the operating system. This allows the application to read packets in their "raw" form from the network segment indicated by the opened device. The INPCS virtual internet device may be mapped onto the captured data store such that the stored data appear to the operating system as one or more physical network devices and the time-stamped stored data appears as if it were live network traffic. This allows existing applications to mimic their inherent direct access to network interface devices but with packets fed to the device from the captured packets in the INPCS. This architecture allows for ready integration with applications that are designed to access real-time network data, significantly enhancing their usability by turning them into tools that perform the same functions with historical data.

The Virtual Network Interface also allows analysts to configure the behavior of the INPCS virtual Ethernet device to deliver only specific packets desired. For example, since the INPCS device is a virtual device a user may program its behavior. Tools are provided whereby only packets that meet predetermined requirements match a programmed filter specification (such as by protocol ID or time domain). Additionally, while physical Ethernet devices that are opened by an application are rendered unavailable to other applications, the virtual interface employed by INPCS allows for multiple applications to read from virtual devices (which may be programmed to select for the same or different packet subsets) without mutual exclusion and without any impact on real-time network performance.

While it may be used to examine historical data, the virtual interface capability also enables near real time monitoring of captured data for these applications by providing them with a large network buffer to run concurrently with full data archiving and capture of analyzed data, while providing alerts and live network analysis with no packet loss as typically happens with applications analyzing packets running on congested networks as standalone applications.

The INPCS also facilitates data access through regeneration. Captured packets in the INPCS store can be re-transmitted to external devices on attached network segments. This allows for a "regeneration" of packets contained in the store to be sent to external appliances, emulating the receipt of real-time data by such appliances or applications. The INPCS includes tools to program the behavior of regeneration. For instance, packets can be re-transmitted at defined packet rates or packets that meet particular predetermined criteria can be excluded or included in the regenerated stream.

External appliances receiving packets regenerated to them by the INPCS appliance are unaware of the existence of the INPCS appliance, thus integration with existing or future appliances is seamless and easy, including applications where confidentiality and security are of paramount importance.

This regeneration method also facilitates "load balancing" by retransmitting stored packet streams to external devices that may not be able to examine packets received into the INPCS appliance at the real-time capture rate. Additionally, this method can make external appliances more productive by only seeing packets that a user determines are of interest to current analysis. Regeneration has no impact on the primary functions of the INPCS as it can be accomplished while the INPCS appliance is continuing to capture and store packets from defined interfaces.

The INPCS file system acts as an on-disk LRU (least recently used) cache, as is known in the art and recycles the oldest captured data when the store fills and allows continuous capture to occur with the oldest data either being recycled and overwritten or pushed out onto external storage for permanent archive of capture network traffic. This architecture allows for an infinite capture system. Captured packets at any given time in the on-disk store represents a view in time of all packets captured from the oldest packets to the newest.

The INPCS software is implemented as loadable modules loaded into a modified Linux operating system kernel. This module provides and implements the VFS, virtual network device driver (Ethernet), and the services for regeneration of packets to external network segments, as described above. INPCS uses a proprietary file system and data storage. The Linux drivers utilized by the INPCS modules have also been modified to support a copyless DMA switch technology that eliminates all packet copies. Use of the copyless receive and send methodology is essential to achieving the desired throughput of the INPC. Copyless sends allow an application to populate a message buffer with data before sending, rather than having the send function copy the data.

Captured packets are DMA (direct memory access) transferred directly from the network ring buffers into system storage cache without the need for copying or header dissection typical of traditional network protocol stacks. Similar methods are used for captured packets scheduled for writing to disk storage. These methods enable extremely high levels of performance and allows packet data to be captured and then written to disk at speeds of over 350 MB/s and allows support for lossless packet capture on gigabit networks. This enables the INPCS unit to capture full line rate gigabit traffic without any packet loss of live network data. This architecture allows real time post analysis of captured data by applications such as the popular Intrusion Detection System (IDS) software Snort, without the loss of critical data (packets). Additionally, should further research be desired, such as for session reconstruction, the full store of data is available to facilitate error free reconstruction.

These methods are superior to the more traditional "sniffer" and network trigger model that would require users and network investigators to create elaborate triggers and event monitors to look for specific events on a network. With INPCS, since every network packet is captured from the network, the need for sophisticated trigger and event monitor technology is obsolete since analysis operations are simply a matter of post analysis of a large body of captured data. Thus, INPCS represents a new model in network troubleshooting and network forensics and analysis since it allows analysts an unparalleled view of live network traffic and flow dynamics.

Since the unit captures all network traffic, it is possible to replay any event in time which occurred on a network. The device creates, in essence, a monolithic "network buffer" that contains the entire body of network traffic.

In one embodiment, INPCS exposes the capture data via a VFS file system (DSFS) as PCAP files. The mounted DSFS file system behaves like traditional file systems, where files can be listed, viewed, copied and read. Since it is a file system, it can be exported via the Linux NFS or SMBFS to other attached network computers who can download the captured data as a collection time-indexed slot files or as consolidated capture files of the entire traffic on a network. This allows analysts the ability to simply copy those files of interest to local machines for local analysis. These capture PCAP files can also be written to more permanent storage, like a CD, or copied to another machine.

The INPCS File System (DSFS) also creates and exposes both time-replay based and real-time virtual network interfaces that map onto the capture packet data, allowing these applications to process captured data in real time from the data storage as packets are written into the DSFS cache system. This allows security applications, for instance, to continuously monitor capture data in real time and provide IDS and alert capability from a INPCS device while it continues to capture new network traffic without interruption. This allows existing security, forensics, compliance, analytics and network management applications to run seamlessly on top of the INPCS device with no software changes required to these programs, while providing these applications with a lossless method of analyzing all traffic on a network.

The INPCS unit can be deployed as a standalone appliance connected either via a Switched Port Analyzer (SPAN) or via an optical splitter via either standard LX or SX fiber optic connections. The unit also supports capture of UTP-based Ethernet at 10/100/1000 Mb line rates.

The INPCS unit can also be configured to support asymmetrically routed networks via dual SX fiber to gigabit Ethernet adapters with an optical splitter connecting the TX/RX ports to both RX ports of the INPCS device.

Figure 3:
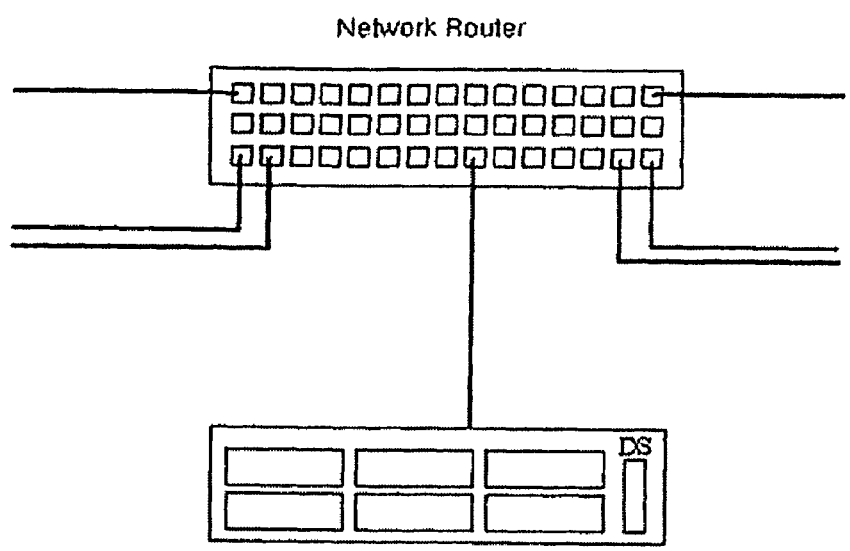
FIG. 3 depicts the INPCS appliance in a switch port analyzer configuration.

In SPAN configurations the INPCS unit is connected to a router, then the router is configured to mirror selected port traffic into the port connected to the INPCS Unit. FIG. 3 depicts schematically the use of the INPCS appliance in a SPAN configuration. In this configuration, the INPCS appliance is connected to a router port, and the router is configured to mirror (i.e. to copy) packets from other selected ports to the SPAN configured port on the host router. This method does degrade performance of the router to some extent, but is the simplest and most cost effective method of connecting a INPCS appliance to a network for monitoring purposes.

One distinct advantage of using a SPAN configuration relates to multi-router networks that host large numbers of routers in a campus-wide networked environment such as those that exist at universities or large business establishments. Routers can be configured to mirror local traffic onto a specific port and redirect this traffic to a central router bank to collect data on a campus-wide wide basis and direct it to a specific router that hosts an INPCS data recording appliance. This deployment demonstrates that even for a very large network utilizing gigabit Ethernet segments, this method is both deployable, and practical. At a University of 30,000 or more students with workstations and servers using Windows, Unix, Linux, and others operating systems, serving faculty, staff, labs and the like, average network traffic in and out of the university may be expected to continue at a sustained rate of approximately 55 MB/s with peaks up to 80 MB/s across multiple gigabit Ethernet segments. A deployment of the INCPS appliance utilizing a SPAN configuration can be effected without noticeable effect on the network and the INCPS can readily capture all network traffic at these rates and thus keep up with capture of all network traffic in and out of the university or similar sized enterprise.

Figure 4:
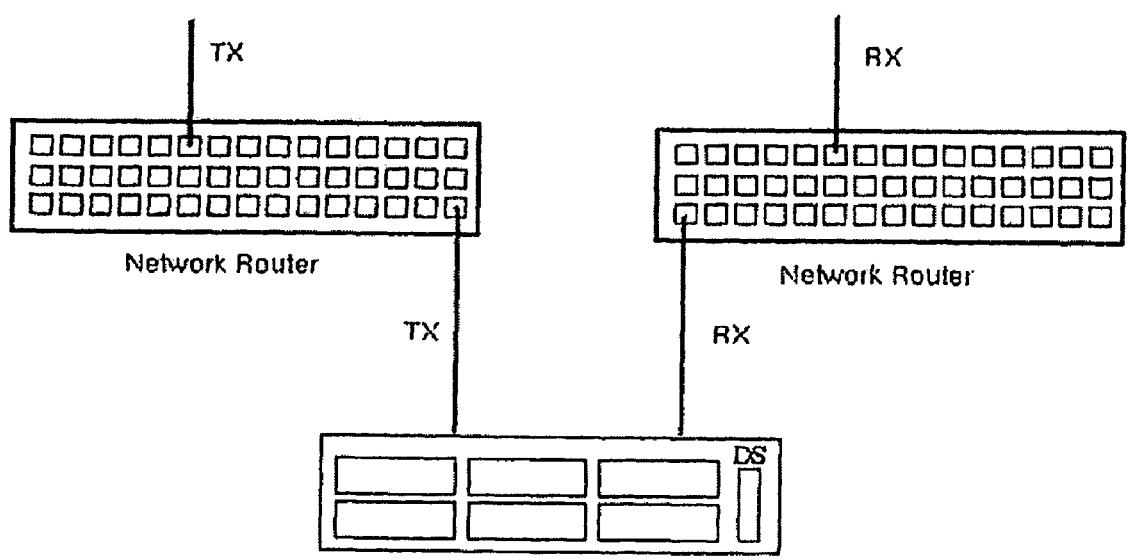
FIG. 4 depicts the INPCS appliance in an asymmetric routed configuration.

The INPCS appliance can be configured to support capture of network traffic via an in-line optical splitter that diverts RX (receive) and TX (transmit) traffic in a configuration that feeds into two SX gigabit Ethernet adapters within the INPCS appliance. FIG. 4 depicts the use of the INPCS appliance in such an asymmetric routed configuration. In this configuration, the INPCS appliance is connected to an optical splitter that supports either SX (multi-mode) or LX (single mode long haul) fiber optic gigabit cables. This method provides very high levels of performance and is non-intrusive. The non-intrusive nature of this configuration method renders the INPCS appliance totally invisible on the customer network since the unit is completely shielded from view of any outside network devices.

There are further advantages related to support of asymmetric routing. In some large commercial networks RX and TX channels that carry network traffic between routers can be configured to take independent paths through the network fabric as a means of increasing the cross-sectional bandwidth of a network. Networks maintained in large financial markets, for example, may configure their networks in this manner. With this approach, it is required (in both the optical splitter configuration and in configurations involving SPAN port deployment) to re-integrate the captured traffic from one or more capture chains into a consolidated chain so that the network traffic can be reassembled and viewed in a logical arrival order.

Figures 5, 6:
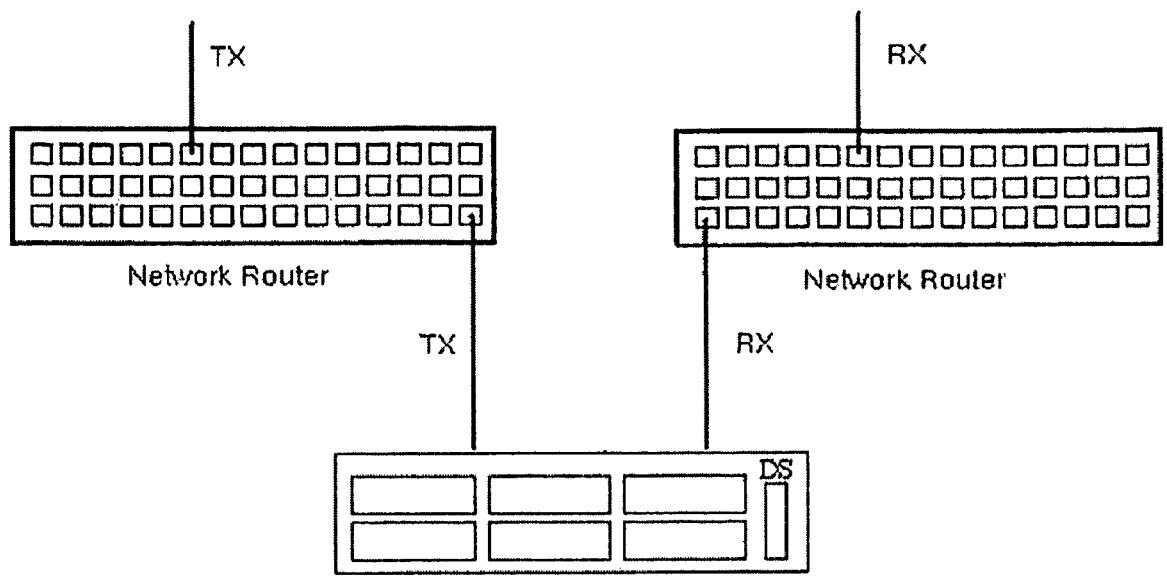
FIG. 5 depicts in the INPCS appliance in an in-line optical splitter configuration.
FIG. 6 depicts a typical menu tree for the DSMON utility.

The INPCS appliance supports both of these modes and also provides the ability to present the view of the captured network traffic as a merged and consolidated chain of captured packets. FIG. 5 shows the INPCS appliance in an optical splitter configuration. By default, the INPCS supports only SX fiber in the appliance chassis. For users requiring LX fiber support, optical splitters and converters may be added to the configuration to allow LX to SX fiber connections via an external network tap device.

The INPCS provides several utilities that allow configuration of virtual interfaces, starting and stopping data capture on physical adapters, mapping of virtual network interfaces onto captured data in the data store, and monitoring of network interfaces and capture data status. In addition, the entire captured data store is exported via a virtual file system that dynamically generates LIBPCAP files from the captured data as it is captured and allows these file data sets to be viewed and archived for viewing and forensic purposes by any network forensics programs that support the TCPDUMP LIBPCAP file formats for captured network traffic.

The DSCAPTURE utility configures and initiates capture of network data and also allows mapping of virtual network interfaces and selection of specific time domains based on packet index, date and time, or offset within a captured chain of packets from a particular network adapter or network segment.

The utility provides the following functions as they would appear in a command line environment:

```
[root@predator pfs]#
[root@predator pfs]# dscapture
USAGE: dscapture start <interface>
    dscapture stop <interface>
```

-continued

```
dscapture init
dscapture map show
dscapture map <virtual interface> <capture interface>
dscapture set time <virtual interface> "MM-DD-YYYY
HH:MM:SS"
    dscapture set index <virtual interface> <packet #>
    dscapture set offset <virtual interface> <offset>
[root@predator pfs]#
```

The function DSCAPTURE INIT will initialize the INPCS capture store. DSCAPTURE START and DSCAPTURE STOP start and stop packet capture of network traffic, respectively, onto the local store based on network interface name. By default, Linux names interfaces eth0, eth1, eth2, etc. such that control code would resemble the following:

```
[root@predator pfs]#
[root@predator pfs]#
[root@predator pfs]# dscapture stop eth1
dscapture: INPCS stop interface eth1 (0)
[root@predator pfs]#
[root@predator pfs]# dscapture start eth1
dscapture: INPCS start interface eth1 (0)
[root@predator pfs]#
[root@predator pfs]#
```

The DSCAPTURE MAP and DSCAPTURE MAP SHOW functions allow specific virtual network interfaces to be mapped from physical network adapters onto captured data located in the store. This allows SNORT, TCPDUMP, ARGUS, and other forensic applications known in the art to run on top of the INPCS store in a manner identical to their functionality were running on a live network adapter. This facilitates the use of a large number of existing or custom-designed forensic applications to concurrently analyze captured traffic at near real-time performance levels. The virtual interfaces to the captured data emulating a live network stream will generate a "blocking" event when they encounter the end of a stream of captured data from a physical network adapter and wait until new data arrives. For this reason, these applications can be used in unmodified form on top of the INPCS store while traffic is continuously captured and streamed to these programs in real time with concurrent capture of network traffic to the data store, as shown in the following command line sequence:

```
[root@predator pfs]#
[root@predator pfs]# dscapture map show
Device    Type    Last    Replay Date/Time .microseconds
    lo
    sit0
    eth0
    eth1
    ifp0 [ Virtual ]
    ifp1 [ Virtual ]
    ifp2 [ Virtual ]
    ifp3 [ Virtual ]
    ift0 [ Time Replay ]
    ift1 [ Time Replay ]
    ift2 [ Time Replay ]
    ift3 [ Time Replay ]
Virtual Interface Mappings
Virtual Physical
ifp0 -> eth1 start time: Tue May 11 09:43 :24 2004 .0
ift0 -> eth1 start time: Tue May 11 09:43:24 2004 .0
[root@predator pfs]#
```

The DSCAPTURE function also allows the mapping of specific virtual interfaces to physical interfaces as shown in the following command line sequence and display:

```
[root@predator pfs]#
[root@predator pfs]# dscapture map ift2 eth1
dscapture: virtual interface [ift2] mapped to [eth1]
[root@predator pfs]#
[root@predator pfs]#
```

The DSCAPTURE MAP SHOW function will now display:

```
[root@predator pfs]# dscapture map show
Device Type Last Replay Date/Time .microseconds
    lo
    sit0
    eth0
    eth1
    ifp0 [ Virtual ]
    ifp1 [ Virtual ]
    ifp2 [ Virtual ]
    ifp3 [ Virtual ]
    ift0 [ Time Replay ]
    ift1 [ Time Replay ]
    ift2 [ Time Replay ]
    ift3 [ Time Replay ]
Virtual Interface Mappings
Virtual Physical
    Ifp0 -> eth1 start time: Tue May 11 09:43:24 2004 .0
    Ift0 -> eth1 start time: Tue May 11 09:43:24 2004 .0
    ift2 -> eth1 start time: Tue May 11 09:43:242004 .0
[root@predator pfs]#
```

There are two distinct types of virtual network interfaces provided by INPCS. ifp<#> and ift<#> named virtual network interfaces. the ifp<#> named virtual interfaces provide the ability to read data from the data store at full rate until the end of the store is reached. The ift<#> named virtual interfaces provide time sequenced playback of captured data at the identical time windows the data was captured from the network. This second class of virtual network interface allows data to be replayed with the same timing and behavior exhibited when the data was captured live from a network source. This is useful for viewing and analyzing network attacks and access attempts as the original timing behavior is fully preserved. The DSCAPTURE function also allows the virtual network interfaces to be indexed into the store at any point in time, packet number, or data offset a network investigator may choose to review, as in the follow command line sequence:

```
dscapture set time <virtual interface> "MM-DD-YYYY HH:MM:SS"
dscapture set index <virtual interface> <packet #>
dscapture set offset <virtual interface> <offset>
```

These commands allow the user to configure where in the stream the virtual interface should start reading captured packets. In a large system with over two terabytes of captured data, the investigator may only need to examine packets beginning at a certain date and time. This utility allows the user to set the virtual network interface pointer into the capture stream at a specific location. When the virtual device is then opened, it will begin reading packets from these locations rather that from the beginning of the capture stream.

The DSMON utility allows monitoring of a INPCS device from a standard Linux console, afty, or xterm window connected to the device via serial port, SSH (Secure Shell Login), or via a Terminal Window via an xterm device as is known in the art. This program provides comprehensive monitoring of data capture status, captured data in the store, network interface statistics, and virtual interface mappings.

FIG. 6 depicts menu options for DSMON function screen console. The user may select and view information pertaining to network interfaces, slot cache, disk storage, slot chains, available virtual interfaces, and merged chains. The DSMON utility supports monitoring of all network interfaces and associated hardware statistics, including dropped packet, FIFO and frame errors, receive packet and byte counts, etc. This utility also monitors cache usage within the system, disk storage usage, a capture monitor that records malformed packets, total captured packets, disk channel I/O performance statistics, slot chain information including the mapping of slot chains to physical network interfaces, the number of slots chained to a particular adapter, the dates and time packet chains are stored in slots and their associated chains, virtual interface mappings, virtual interface settings, and merged slot chains for support of asymmetric routed captured traffic, traffic captured and merged from optical splitter configurations.

Described below are typical excerpts from several DSMON panels detailing some of the information provided by this utility to network administrators and forensic investigators from the INPCS appliance and standalone software package.

FIG. 7 depicts a typical tabular report generated by the DSMON utility showing the status of the Network Interface. The display provides comprehensive information regarding the identify of the Network Interface, the device type, internet address, hardware address, broadcast type, maximum transmission unit (MTU) setting, interrupt status, line/link status, packet receive rate, byte receive rate, maximum burst rate for packets and bytes received, packets dropped, total packets and bytes captured, and dropped buffers. With this information, a user can be assured of the integrity of the captured data as well as in trouble-shooting network problems that may arise.

FIG. 8 depicts a typical tabular report generated by the DSMON utility showing the status of the disk storage of the INPCS. The display provides comprehensive information regarding the disk storage including time stamp, disk information, slot information, and data on cluster and block allocations, data and slot starting points, and logical block addressing.

FIG. 9 depicts a typical tabular report generated by the DSMON utility showing the status of the slot chain, each slot representing a pre-determined segment of captured data. The display provides information regarding the INPCS up time, active slot chains and their start times and sizes.

The INPCS data recorder exposes captured data via a custom Virtual File System (DSFS) that dynamically generates LIBPCAP formatted files from the slots and slot chains in the data store. This data can be accessed via any of the standard file system access methods allowing captured data to be copied, archived and reviewed or imported into any programs or applications that support the LIBPCAP formats. By default, the INPCS system exposes a new file system type under the Linux Virtual File System (VFS) interface as follows:

```
[root@predator predator]# cat /proc/filesystems
nodev   rootfs
nodev   bdev
nodev   proc
nodev   sockfs
nodev   tmpfs
nodev   shm
nodev   pipefs
nodev   binfmt_misc
        ext3
        ext2
        minix
        msdos
        vfat
        iso9660
nodev   nfs
nodev   autofs
nodev   devpts
nodev   usbdevfs
        dsfs
[root@predator predator]#
```

The DSFS registers as a device based file system and is mounted as a standard file system via the mount command under standard System V Unix systems and systems that emulate the System V Unix command structure. This file system can be exposed to remote users via such protocols as NFS, SAMBA, InterMezzo, and other remote file system access methods provided by standard distributions of the Linux operating system. This allows the DSFS file system to be remotely access from Windows and Unix workstation clients from a central location.

DSFS appears to the operating system and remote users as simply another type of file system supported under the Linux Operating System, as shown in the command line sequence below:

```
[root@predator predator]# mount
/dev/hda5 on / type ext3 (rw)
none on /proc type proc (rw)
usbdevfs on /proc/bus/usb type usbdevfs (rw)
/dev/hda1 on /boot type ext3 (rw)
none on /dev/pts type devpts (rw,gid=5,mode=620)
none on /dev/shm type tmpfs (rw)
/dev/hda4 on /dos type vfat (rw)
/dev/sda1 on /pfs type dsfs (rw)
[root@predator predator]#
[root@predator predator]#
```

FIG. 10 depicts the DFS file system structure schematically. The DSFS file system is a read only file system from user space. However, it does support chmod and chown commands to assign specific file permissions to designated end users of the system. This allows a central administrator to allow selected individuals to access files contained in the DSFS file system on an individual basis, allowing greater freedom to configure and administer the system if it is intended to be used by a Network Security Office that has more than one Network Forensic Investigator.

Only the underlying capture engine subsystem can write and alter data in the DSFS file system. Beyond the assignment of user permissions to specific files, DSFS prohibits alteration of the captured data by any user, including the system administrator. This ensures the integrity of the captured data for purposes of chain of custody should the captured data be used in criminal or civil legal proceedings where rules of evidence are mandatory.

By default, the read-write nature of the DSFS file system is read only for users accessing the system from user space, and the Unix 'df' command will always report the store as inaccessible for writing, as shown in the following example of a command line sequence:

```
[root@predator predator]#
[root@predator predator]# df -h
Filesystem      Size    Used    Avail   Use %   Mounted on
/dev/hda5       34G     5.5G    27G     18%     /
/dev/hda1       190M    21M     160M    12%     /boot
none            1.5G    0       1.5G    0%      /dev/shm
/dev/hda4       2.0G    219M    1.8G    11%     /dos
/dev/sda1       1.7T    1.7T    0       100%    /pfs
[root@predator predator]#
[root@predator predator]#
```

The DSFS File System is organized into the following directory structure:

```
[root@predator pfs]# ls -l
total 890
-r--------  1 root root   1285179 May 11 12:49 12-eth1
-r--------  1 root root    532263 May 11 12:49 12-eth1-slice
dr-x------  2 root root         0 May 11 12:49 merge
dr-x------  3 root root        36 May 11 12:49 slice
dr-x------  3 root root        36 May 11 12:49 slots
dr-x------  8 root root      1536 May 11 12:49 stats
[root@predator pfs]#
[root@predator pfs]#
[root@predator pfs]#
```

By default, DSFS exposes captured slot chains in the root DSFS directory by adapter number and name in the system as a complete chain of packets that are contained in a LIBPCAP file. If the captured adapter contains multiple slots within a chain, the data is presented as a large contiguous file in PCAP format with the individual slots transparently chained together. These files can be opened either locally or remotely and read into any program that is designed to read LIBPCAP formatted data.

These master slot chains are in fact comprised of sub chains of individual slots that are annotated by starting and ending date and time. There are two files created by default for each adapter. One file contains the full payload of network traffic and another file has been frame sliced. Frame slicing only presents the first 96 bytes of each captured packet, and most Network Analysis software is only concerned with the payload of the network headers, and not the associated data within a packet. Providing both files reduces the amount of data transferred remotely over a network during network analysis operations since a frame sliced file is available for those applications that do not need the full network payload.

There are also several subdirectories that present the individual slots that comprise each slot chain represented in the root directory of the DSFS volume. These directories allow a more granular method of reviewing the captured data and are stored by slot and network adapter name along with the start and end capture times for the packets contain in each individual slot. A directory called "slots" is created that presents the full network payload of all packet data and a directory called "slice" that presents the same slot data in frame-sliced format. These slot files are also dynamically generated LIB-PCAP files created from the underlying DSFS data store.

A SLOTS directory entry with individual slots for eth1 with full payload would appear as in the following command line sequence:

```
[root@predator slots]#
[root@predator slots]# ls −1
total 650
-r-------- 1 root root 1293948 May 11 13:00 0-12-eth1-
        05112004-094313-05112004-130005
-r-------- 1 root root 35881 May 11 13:02 1-12-eth1-
        05112004-130212-05112004-130228
[root@predator slots]#
```

A SLICE directory entry with individual slots for eth1 with frame sliced payload would appear as follows:

```
[root@predator slice]#
[root@predator slice]# ls −1
total 285
-r-------- 1 root root 538671 May 11 13:00 0-12-eth1-
        05112004-094313-05112004-130005-slice
-r-------- 1 root root 43321 May 11 13:03 1-12-eth1-
        05112004-130212-05112004-130309-slice
[root@predator slice]#
[root@predator slice]#
```

These files can be imported into TCPDUMP or any other LIBPCAP based application from the DSFS File System, as follows:

```
[root@predator slots]#
[root@predator slots]#
[root@predator slots]# tcpdump -r 0-12-eth1-05112004-094313-
        05112004-130005 | more
09:43:29.629701 802.1d config 8000.02:e0:29:0a:fb:33.8000 root
        8000.02:e0:29:0a:fb:33 pathcost 0 age 0 max 8 hello 2
        fdelay 5
09:43:31.629701 802.1d config 8000.02:e0:29:0a:fb:33.8000 root
        8000.02:e0:29:0a:fb:33 pathcost 0 age 0 max 8 hello 2
        fdelay 5
09:43:33.219701 192.168.20.17.netbios-ns >
        192.168.20.255.netbios-ns: NBT UDP PACKET(137):
        QUERY; REQUEST; BROADCAST (DF)
09:43:33.219701 arp who-has 192.168.20.17 tell 192.168.20.34
09:43:33.629701 802.1d config 8000.02:e0:29:0a:fb:33.8000 root
        8000.02:e0:29:0a:fb:33 pathcost 0 age 0 max 8 hello 2
        fdelay 5
```

The master slot chain files can also be imported from the root DSFS directory in the same manner and can be copied and archived as simple system files to local or remote target directories for later forensic analysis, as shown in the following command line example:

```
[root@predator pfs]# ls −1
total 164
-r-------- 1 root    root    182994 May 11 13:18 12-eth1
-r--------- 1 root   root    147295 May 11 13:18 12-eth1-slice
dr-x------ 2 root    root         0 May 11 13:18 merge
dr-x------ 4 root    root        72 May 11 13:03 slice
dr-x------- 4 root   root        72 May 11 13:02 slots
dr-x------- 8 root   root      1536 May 11 13:12 stats
[root@predator pfs]#
[root@predatorpfs]# tcpdump -r 12-eth1 | more
09:43:29.629701 802.1d config 8000.02:e0:29:0a:fb:33.8000 root
        8000.02:e0:29:0a:fb:33 pathcost 0 age 0 max 8 hello 2
        fdelay 5
```

```
09:43:31.629701 802.1d config 8000.02:e0:29:0a:fb:33.8000 root
        8000.02:e0:29:0a:fb:33 pathcost 0 age 0 max 8 hello 2
        fdelay 5
09:43:33.219701 192.168.20.17.netbios-ns >
        192.168.20.255.netbios-ns: NBT UDP PACKET(137):
        QUERY; REQUEST; BROADCAST (DF)
09:43:33.219701 arp who-has 192.168.20.17 tell 192.168.20.34
09:43:33.629701 802.1d config 8000.02:e0:29:0a:fb:33.8000 root
        8000.02:e0:29:0a:fb:33 pathcost 0 age 0 max 8 hello 2
        fdelay 5
09:43:35.629701 802.1d config 8000.02:e0:29:0a:fb:33.8000 root
        8000.02:e0:29:0a:fb:33 pathcost 0 age 0 max 8 hello 2
        fdelay 5
09:43:37.629701 802.1d config 8000.02:e0:29:0a:fb:33.8000 root
        8000.02:e0:29:0a:fb:33 pathcost 0 age 0 max 8 hello 2
        fdelay 5
```

It is also possible to copy these files like any other system file for purposes of archiving captured network traffic using the following commands:

```
[root@predator slots]#
[root@predator slots]# ls −1
total 680
-r-------- 1 root root 1293948 May 11 13:00 0-12-eth1-
        05112004-094313-05112004-130005
-r-------- 1 root root 96276 May 11 13:09 1-12-eth1-
        05112004-130212-05112004-130917
[root@predator slots]#
[root@predator slots]#
[root@predator slots]# cp 0-12-eth1-05112004-094313-05112004-
130005 /pcap
[root@predator slots]#
[root@predator slots]#
[root@predator slots]#
```

The DSFS "stats" directory contains text files that are dynamically updated with specific statistics information similar to the information reported through the DSMON utility. These files can also be opened and copied; thereby, providing a snapshot of the capture state of the INPCS system for a particular time interval, as shown:

```
[root@predator stats]# ls −1
total 23
-r-------- 1 root root      11980 May 11 13:12 diskspace
-r-------- 1 root root       8375 May 11 13:12 diskspace.txt
-r-------- 1 root root       5088 May 11 13:12 network
-r-------- 1 root root       8375 May 11 13:12 network.txt
-r-------- 1 root root       5132 May 11 13:12 slots
-r-------- 1 root root       4456 May 11 13:12 slots.txt
[root@predator stats]#
[root@predator stats]#
```

For example, the file slot.txt contains the current cache state of all slot buffers in the DSFS system and can be displayed and copied as a simple text file with the following command line sequence:

```
[root@predator stats]#
[root@predator stats]# cat slots.txt
slot total       :16
slot readers     :0
capture buffers        : 32784
capture buffer size    : 65536
slot io posted         : 0
```

-continued

```
slot io pending         : 0
slot_memory_in_use      : 2202235904 bytes
slot_memory_allocated   : 2202235904 bytes
slot_memory_freed       : 0 bytes
Network Interface       : lo (1)
active slot 0/00000000   packets-0 ringbufs-0
total_bytes-0 metadata-0
Network Interface : sit0 (2)
active slot 0/00000000   packets-0 ringbufs-0
total_bytes-0 metadata-0
Network Interface       : eth0 (11)
active slot 0/00000000 packets-0 ringbufs-0
  total_bytes-0Network Interface    : eth1 (12)
  active slot 1/728A0000 packets-1177 ringbufs-512
  total_bytes-125125 metadata-65912
  Slot Cache Buffer State
  slot 0000001/728A0000 i:12 1:01 (VALID DIRTY UPTD LOCK
    HASHED)
  slot 0000000/7279C000 i:12 1:00 (VALID UPTD HASHED)
  slot 0000000/72798000 i:00 1:00 (FREE)
  slot 0000000/72794000 i:00 1:00 (FREE)
  slot 0000000/72790000 i:00 1:00 (FREE)
  slot 0000000/7278C000 i:00 1:00 (FREE)
  slot 0000000/72788000 i:00 1:00 (FREE)
  slot 0000000/72784000 i:00 1:00 (FREE)
  slot 0000000/72780000 i:00 1:00 (FREE)
  slot 0000000/7277C000 i:00 1:00 (FREE)
  slot 0000000/72778000 i:00 1:00 (FREE)
  slot 0000000/72774000 i:00 1:00 (FREE)
  slot 0000000/72770000 i:00 1:00 (FREE)
  slot 0000000/7276C000 i:00 1:00 (FREE)
  slot 0000000/72768000 i:00 1:00 (FREE)
  slot 0000000/72764000 i:00 1:00 (FREE)
  Slot Cache Buffer Detail
  slot 0000001/728A0000 i:12 1:01 (VALID DIRTY UPTD LOCK)
     time/age-40A12340/40A125BB start-0/0 last-1693/0
     packets-1182 ring-512 bytes-126639 meta-66192 io-0
  slot 0000000/7279C000 i:12 1:00 (VALID UPTD)
     time/age-40A0F49E/00000000 start-0/0 last-0/0
     packets-6011 ring-0 bytes-1197748 meta-336616 io-0
```

In addition, an existing "merge" directory allows files to be dynamically created to provide merged slot chains for support of asymmetric routed traffic and optical tap configurations of captured data.

Figure 11:
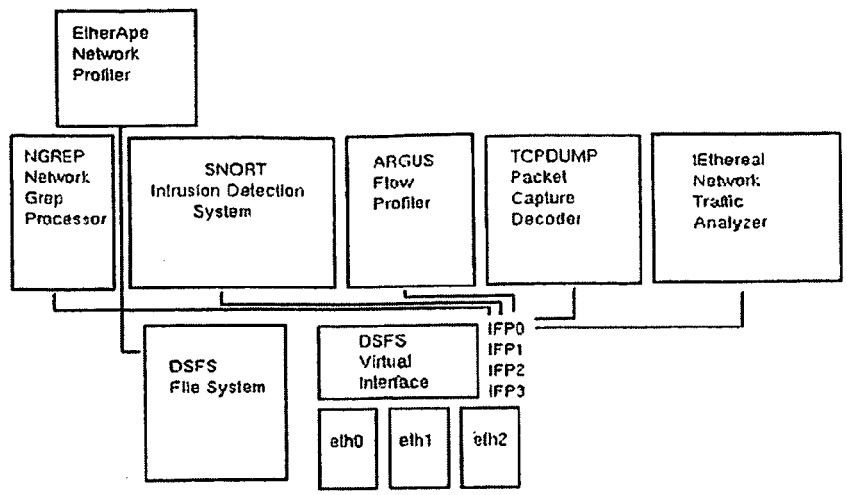
FIG. 11 depicts the use of standard forensic and analytical tools in conjunction with the INPCS appliance.

All of the standard applications that support network interface commands can be deployed with INPCS through the use of virtual network interface. FIG. 11 depicts the use of the INPPCS in conjunction with a number of standard network analysis and forensic tools known in the art. TCPDUMP can be configured to run on top of INPCS by utilizing Virtual Network Interfaces, as in the following command line sequence:

```
[root@predator /]#
[root@predator /]# tcpdump -i ifpd | more
tcpdump: WARNING: ifp0: no IPv4 address assigned
tcpdump: listening on ifp0
09:43:29.629701 802.1d config 8000.02:e0:29:0a:fb:33.8000 root
   8000.02:e0:29:0a:fb:33 pathcost 0 age 0 max 8 hello 2
   fdelay 5
09:43:31.629701 802.1d config 8000.02:e0:29:0a:fb:33.8000 root
   8000.02:e0:29:0a:fb:33 pathcost 0 age 0 max 8 hello 2
   fdelay 5
09:43:33.219701 192.168.20.17.netbios-ns >
   192.168.20.255.netbios-ns: NBT UDP PACKET(137):
   QUERY; REQUEST; BROADCAST (DF)
09:43:33.219701 arp who-has 192.168.20.17 tell 192.168.20.34
09:43:33.629701 802.1d config 8000.02:e0:29:0a:fb:33.8000 root
   8000.02:e0:29:0a:fb:33 pathcost 0 age 0 max 8 hello 2
   fdelay 5
09:43:35.629701 802.1d config 8000.02:e0:29:0a:fb:33.8000 root
   8000.02:e0:29:0a:fb:33 pathcost 0 age 0 max 8 hello 2
   fdelay 5
09:43:37.629701 802.1d config 8000.02:e0:29:0a:fb:33.8000 root
   8000.02:e0:29:0a:fb:33 pathcost 0 age 0 max 8 hello 2
   fdelay 5
09:43:39.629701 802.1d config 8000.02:e0:29:0a:fb:33.8000 root
   8000.02:e0:29:0a:fb:33 pathcost 0 age 0 max 8 hello 2
   fdelay 5
```

The SNORT Intrusion Detection System can be run with no software changes on top of the INPCS data recorder through the same use of the virtual network interfaces provided by the INPCS appliance. Since the Virtual Interfaces block when they reach the end of store data, SNORT can run in the background in real time reading from data captured and stored in a INPCS appliance as it accumulates. The procedure for invoking and initializing SNORT appears as shown in the following command line sequence and display:

```
[root@predator snort]#
[root@predator snort]# snort -i ifp0
Running in IDS mode with inferred config file: ./snort.conf
Log directory = /var/log/snort
Initializing Network Interface ifp0
OpenPcap( ) device ifp0 network lookup:
Ifp0: no IPv4 address assigned
--= =Initializing Snort = =--
Initializing Output Plugins!
Decoding Ethernet on interface ifp0
Initializing Preprocessors!
Initializing Plug-ins!
Parsing Rules file ./snort.conf
++++++++++++++++++++++++++++++++++++++++++++++++++++
Initializing rule chains ...
,----------[Flow Config]--------------------
|Stats Interval: 0
|Hash Method:   2
|Memcap:        10485760
|Rows:          4099
|Overhead Bytes: 16400(%0.16)
-------------------------------------------
No arguments to frag2 directive, setting defaults to:
   Fragment timeout: 60 seconds
   Fragment memory cap: 4194304 bytes
   Fragment min_ttl: 0
   Fragment ttl_limit: 5
   Fragment Problems: 0
   Self preservation threshold: 500
   Self preservation period: 90
   Suspend threshold: 1000
   Suspend period: 30
Stream4 config:
   Stateful inspection: ACTIVE
   Session statistics: INACTIVE
   Session timeout: 30 seconds
   Session memory cap: 8388608 bytes
   State alerts: INACTIVE
   Evasion alerts: INACTIVE
   Scan alerts: INACTIVE
   Log Flushed Streams: INACTIVE
   MinTTL: 1
   TTL Limit: 5
   Async Link: 0
   State Protection: 0
   Self preservation threshold: 50
   Self preservation period: 90
   Suspend threshold: 200
   Suspend period: 30
Stream4_reassemble config:
   Server reassembly: INACTIVE
   Client reassembly: ACTIVE
   Reassembler alerts: ACTIVE
   Zero out flushed packets: INACTIVE
```

-continued

```
    flush_data_diff_size: 500
    Ports: 21 23 25 53 80 110 111 143 513 1433
    Emergency Ports: 21 23 25 53 80 110 111 143 513 1433
Httpinspect Config:
GLOBAL CONFIG
    Max Pipeline Requests: 0
    Inspection Type: STATELESS
    Detect Proxy Usage: NO
    IIS Unicode Map Filename: ./unicode.map
    IIS Unicode Map Codepage: 1252
DEFAULT SERVER CONFIG:
    Ports: 8    Flow Depth: 300
    Max Chunk Length: 500000
    Inspect Pipeline Requests: YES
    URI Discovery Strict Mode: NO
    Allow Proxy Usage: NO
    Disable Alerting: NO
    Oversize Dir Length: 500
    Only inspect URI: NO
    Ascii: YES alert: NO
    Double Decoding: YES alert: YES
    %U Encoding: YES alert: YES
    Bare Byte: YES alert: YES
    Base36: OFF
    UTF 8: OFF
    IIS Unicode: YES alert: YES
    Multiple Slash: YES alert: NO
    IIS Backslash: YES alert: NO
    Directory: YES alert: NO
    Apache WhiteSpace: YES alert: YES
    IIS Delimiter: YES alert: YES
    IIS Unicode Map: GLOBAL IIS UNICODE MAP CONFIG
    Non-RFC Compliant Characters: NONE
rpc_decode arguments:
    Ports to decode RPC on: 111 32771
0 8080 8180
    alert_fragments: INACTIVE
    alert_large_fragments: ACTIVE
    alert_incomplete: ACTIVE
    alert_multiple_requests: ACTIVE
telnet_decode arguments:
    Ports to decode telnet on: 21 23 25 119
1615 Snort rules read...
1615 Option Chains linked into 152 Chain Headers
0 Dynamic rules
++++++++++++++++++++++++++++++++++++++++++++++++++++
----------------------[thresholding-config]-------------------------
| memory-cap: 1048576 bytes
+----------------------[thresholding-global]-------------------------
| none
+----------------------[thresholding-local]-------------------------
-----------------------------------------------------------------
| gen-id=1 sig-id=2275 type=Threshold tracking=dst count=5
Seconds=60
+----------------------[suppression]-------------------------------
-----------------------------------------------------------------
Rule application order: ->activation->dynamic->alert->pass->log
-== Initialization Complete ==--
```

Figure 12:
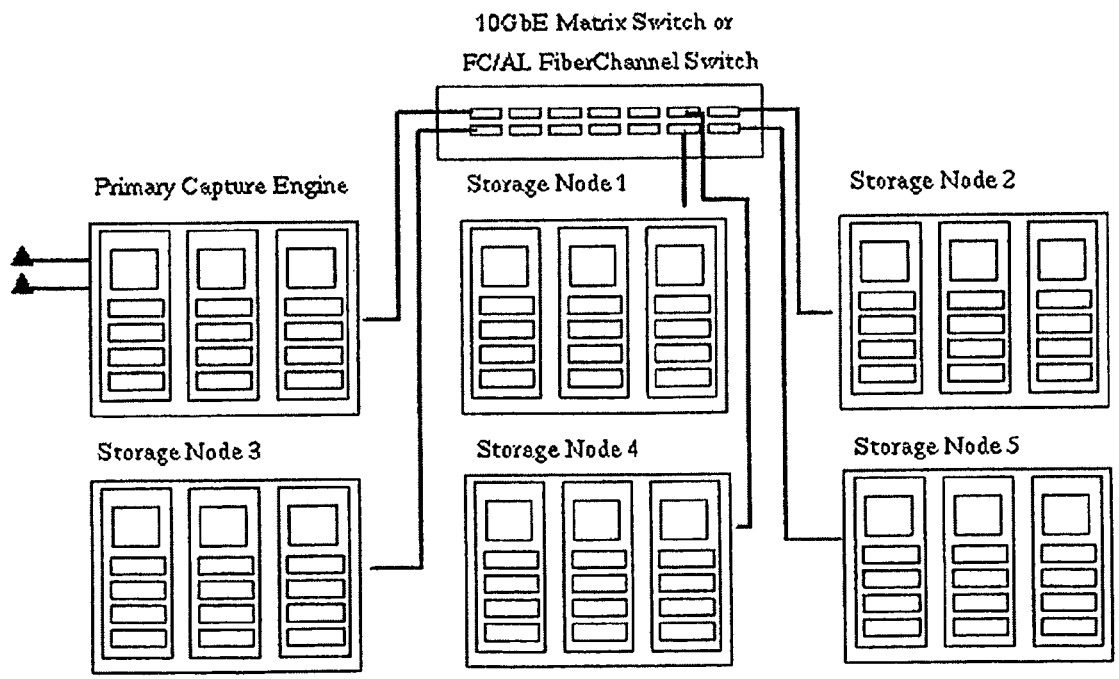
FIG. 12 depicts the internal system architecture of the INPCS.

FIG. 12 depicts the internal system architecture of the INPCS. In its current embodiment, the invention is designed as a high speed on-disk LRU cache of storage segments that are treated as non-volatile (written to disk) cache segments that capture and store network traffic at gigabit per second line rates. The architecture is further enhanced to provide the ability to stripe and distribute slot cache segments across multiple nodes in a storage cluster utilizing Fiber Channel or 10 GbE (10 gigabit) (iSCSI) Ethernet networking technology. Slot Storage segments are allocated and maintained in system memory as large discrete cache elements that correspondingly map to a cluster based mapping layer in system storage. These slot cache segments are linked into long chains or linked lists on non-volatile (disk) storage based upon the network interface for which they contain packets and network payload data captured from a particular network segment.

The invention also allows rapid traffic regeneration of the captured data and retrieval of captured data via standard file system and network device interfaces into the operating system. This flexible design allows user space applications to access captured data in native file formats and native device support formats without the need for specialized interfaces and APIs (application programming interfaces).

Data is streamed from the capture adapters into volatile (memory) slot cache buffers via direct DMA mapping of the network adapter ring buffer memory and flushed into non-volatile (disk) as the volatile cache fills and overflows. Each slot cache segment is time based and has a start time, end time, size, and chain linkage meta tag and are self annotated and self describing units of storage of network traffic. As the slot cache storage system fills with fully populated slot cache segments, older segments in a slot chain are overwritten or pushed/pulled into long term archive storage.

The invention uses two primary disk partition types for the storage and archival of captured network traffic. These on-disk layouts facilitate rapid I/O transactions to the non-volatile (on-disk) storage cache for writing to disk captured network traffic. There are three primary partition types embodied in the invention. Partition type 0x97, 0x98 and partition type 0x99 as are known in the art.

Partition type 0x97 partitions are used by the system to storage active data being captured from a live network medium. Partition type 0x98 partitions are long term storage used to archive captured network traffic into large on-disk library caches that can span up to 128 Tera-bytes of disk storage for each Primary capture partition. Type 0x97 partitions are described by a Disk Space Record header located on each partition.

The Disk Space Record Header describes the block size, partition table layout, and slot storage layout of a type 0x97 partition. The Disk Space Record Header uses the following on-disk structure to define the storage extents of either a type 0x97 or type 0x98 storage partition.

```
typedef struct _DISK_SPACE_RECORD
{
    volatile unsigned long version;
    ULONG id_stamp;
    volatile unsigned long state;
    volatile unsigned long io_state;
    ULONG timestamp;
    ULONG date;
    ULONGtime;
    ULONG disk_id;
    ULONG partition_id;
    ULONG disk_record_blocks;
    ULONG member_id;
    ULONG member_slot;
    ULONG member_count;
    ULONG members[MAX_RECORD_MEMBERS];
#ifADDRESS_64
    long long member_cluster_map[MAX_RECORD_MEMBERS];
#else
    ULONG member_cluster_map[MAX_RECORD_MEMBERS];
#endif
    ULONG start_lba[MAX_RECORD_MEMBERS];
    ULONG sector_count[MAX_RECORD_MEMBERS];
    ULONG cluster_size;
    ULONG start_of_logical_data_area;
#if ADDRESS_64
    long long size;       // in 4K blocks
    long long total_clusters;
#else
    ULONG size;           // in 4K blocks
    ULONG total_clusters;
#endif
```

-continued

```
    ULONG total_slot_records;
    ULONG start_of_slot_data;
    ULONG start_of_space_table;
    ULONG space_table_size;
    ULONG start_of_name_table;
    ULONG name_table_size;
    ULONG start_of_machine_table;
    ULONG machine_table_size;
    ULONG disk_space_present;
#if CONFIG_CLUSTER_STRIPING
#ifADDRESS_64
    long long striped_size;        // in 4K blocks
    long long striped_total_clusters;
#else
    ULONG striped_size;            // in 4K blocks
    ULONG striped_total_clusters;
#endif
    ULONG striped_total_slot_records;
    ULONG striped_space_present;
    ULONG striped_detected_member_count;
#endif
    ULONG slot_size;
    ULONG bitmap_full;
    ULONG recycle_count;
    ULONG slot_starting_cluster[MAX_INTERFACE_SLOTS];
    ULONG slot_ending_cluster[MAX_INTERFACE_SLOTS];
    ULONG slot_starting_time_domain[MAX_INTERFACE_SLOTS];
    ULONG slot_ending_time_domain[MAX_INTERFACE_SLOTS];
    ULONG slot_chain_size[MAX_INTERFACE_SLOTS];
    long long slot_element_count[MAX_INTERFACE_SLOTS];
    long long slot_element_bytes[MAX_INTERFACE_SLOTS];
    long long slot_slice_bytes[MAX_INTERFACE_SLOTS];
    SPACE_TABLE space_entry[MAX_INTERFACE_SLOTS];
    SPACE_TABLE slice_entry[MAX_INTERFACE_SLOTS];
    BYTE slot_names[MAX_INTERFACE_SLOTS][IFNAMSIZ];
    INTERFACE_INFO interface_info[MAX_INTERFACE_SLOTS];
// in memory structures
    #if (!LINUX_UTIL)
    spinlock_t d_lock;
    ULONG d_flags;
#endif
    struct _DISK_SPACE_RECORD *next;
    struct _DISK_SPACE_RECORD *prior;
    SPACE_TABLE_BUFFER *space_table_head;
    SPACE_TABLE_BUFFER *space_table_tail;
    NAME_TABLE_BUFFER *name_table_head;
    NAME_TABLE_BUFFER *name_table_tail;
    BIT_BLOCK_HEAD allocation_bitmap;
    BIT_BLOCK_HEAD slot_bitmap;
    BIT_BLOCK_HEAD chain_bitmap[MAX_INTERFACE_SLOTS];
    ULONG io_count;
    ASYNCH_IO io[MAX_BUFFER_SIZE / IO_BLOCK_SIZE];
    ULONG active_slot_records;
    BYTE *name_hash;
    ULONG name_hash_limit;
    volatile unsigned long signature;
    MACHINE_TABLE_BUFFER *machine_table_head;
    MACHINE_TABLE_BUFFER *machine_table_tail;
    ULONG buffer_count;
} DISK_SPACE_RECORD;
```

Disk Space Records also allow chaining of Disk Space Records from multiple type 0x97 or type 0x98 partitions based upon creation and membership ID information stored in a membership cluster map, which allows the creation of a single logical view of multiple type 0x97 partitions. This allows the system to concatenate configured type 0x97 partitions into stripe sets and supports data striping across multiple devices, which increases disk channel performance dramatically.

Disk Space Records also define the internal table layouts for meta-data and chaining tables used to manage slot cache buffer chains within a virtual Disk Space Record set. Disk Space records contain table pointers that define the tables used by the DSFS file system to present slot storage as logical files and file chains of slot storage elements.

Disk Space Record based storage divides the storage partition into contiguous regions of disk sectors called slots. Slots can contain from 16 up to 2048 64K blocks of 512 byte sectors, and these storage elements are stored to disk in sequential fashion. Slots are access via a sequential location dependent numbering scheme starting at index 0 up to the number of slots that are backed up by physical storage on a particular disk device partition. Each Disk Space Record contains a space table. The space table is a linear listing of structures that is always NUMBER_OF_SLOTS*sizeof (SPACE_TABLE-ENTRY) in size. The Space table maintains size, linkage, and file attribute information for a particular slot and also stores the logical chaining and ownership of particular slots within a logical slot chain.

Figure 13:
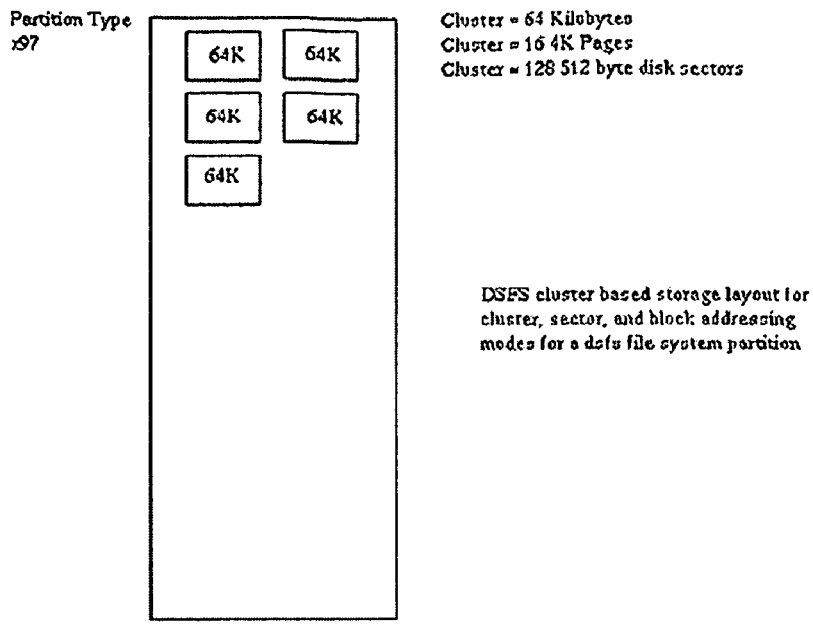
FIG. 13 depicts the Disk Space Store Partition as a contiguous list of physical 64K clusters.

FIG. 13 depicts the Disk Space Store Partition that is addressed as a contiguous list of physical 64K clusters. A cluster is defined as a 64K unit of storage that consists of 128 contiguous 512 byte sectors on a disk device. DSFS views partitions as linear lists of cluster based storage, and storage addressing is performed on the unit of a cluster for partition type 0x97 and 0x98. All disk addresses are generated and mapped based on a logical 64K cluster unit of storage and caching. Slots are comprised of chains of 64K buffers that correspondingly map to 64 cluster addresses on a Disk Space Store partition or a Virtual Disk Store Partition. Disk Space Records that perform striping use an algorithm that round robins the cluster address allocation between the various partitions that comprise a DSFS Disk Space Record member stripe set.

Virtual Cluster addresses are generated for stripe sets using the following algorithm:

```
register int j = (cluster_number % disk_space_record->
    member_count);
logical sector address = disk_space_record->start_lba[j] +
    ((cluster_number / disk_space_record->member_count) *
    (disk_space_record->cluster_size / 512));
```

The module of a cluster number relative to the number of stripe members is performed and used as an index into a particular disk LBA offset table of partition offsets within a disk device partition table that calculates the relative LBA offset of the 64K cluster number. Cluster numbers are divided by the number of striped members to determine and physical cluster address and sector LBA offset into a particular stripe set partition.

Figure 14:
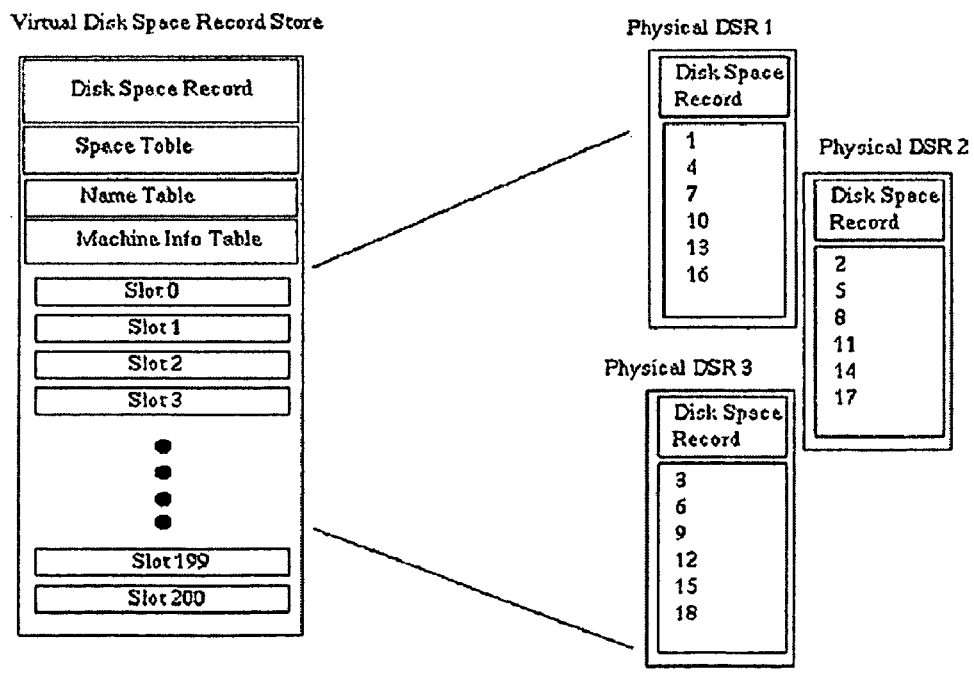
FIG. 14 depicts the Disk Space Record in which logical slots are mapped on to physical devices.

FIG. 14 depicts the Disk Space record in which logical slots are mapped on to physical devices. The Disk Space record is always the first storage sector in a DSFS partition. Storage sectors in a DSFS partition are always calculated to align on configured I/O block size (4K) page boundaries. There are instances where a partition can be created that does not align on a 4K boundary relative to LBA sector addressing. DSFS partitions are always adjusted to conform with aligned block addressing relative to LBA 0 if a partition has been created that is not block aligned. The algorithm performing this addressing alignment uses the following calculation to enforce I/O block size (4K) alignment:

```
register ULONG spb, lba;
spb = (SystemDisk[j]->DeviceBlockSize / SystemDisk[j]->
```

-continued

```
    BytesPerSector);
Rounded I/O Device Blocks = (SystemDisk[j]->
    PartitionTable[i].StartLBA + (spb − 1)) / spb;
SystemDisk[j]->StartOfPartition[i]= lba * spb; // adjusted LAB Start
    of Partition
```

Figure 15:
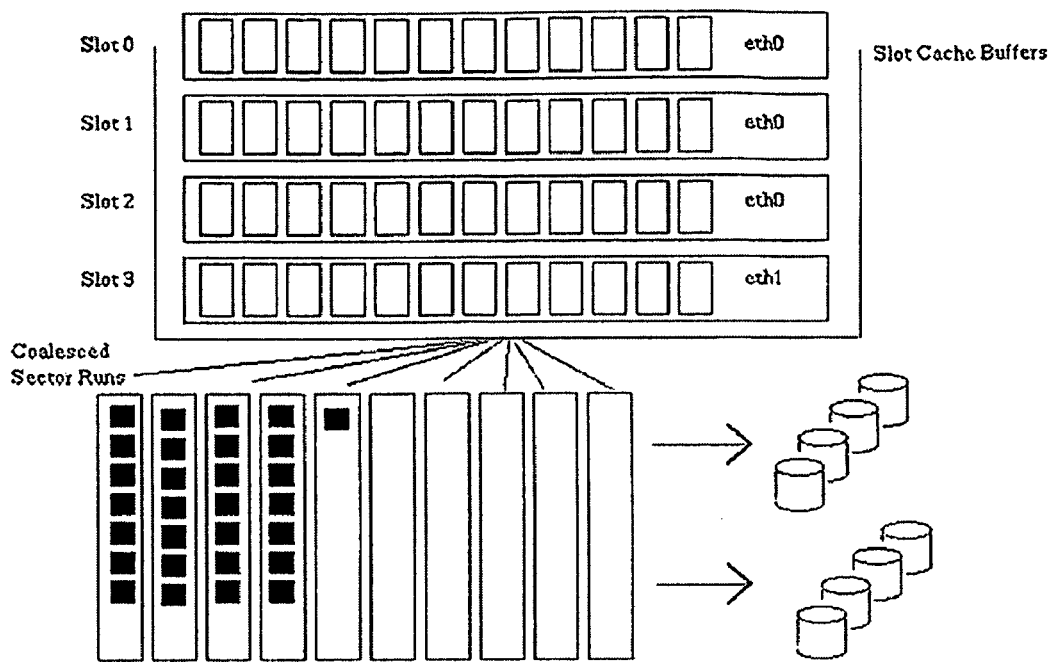
FIG. 15 depicts the slot cache buffers stored as contiguous runs.
Figure 16:
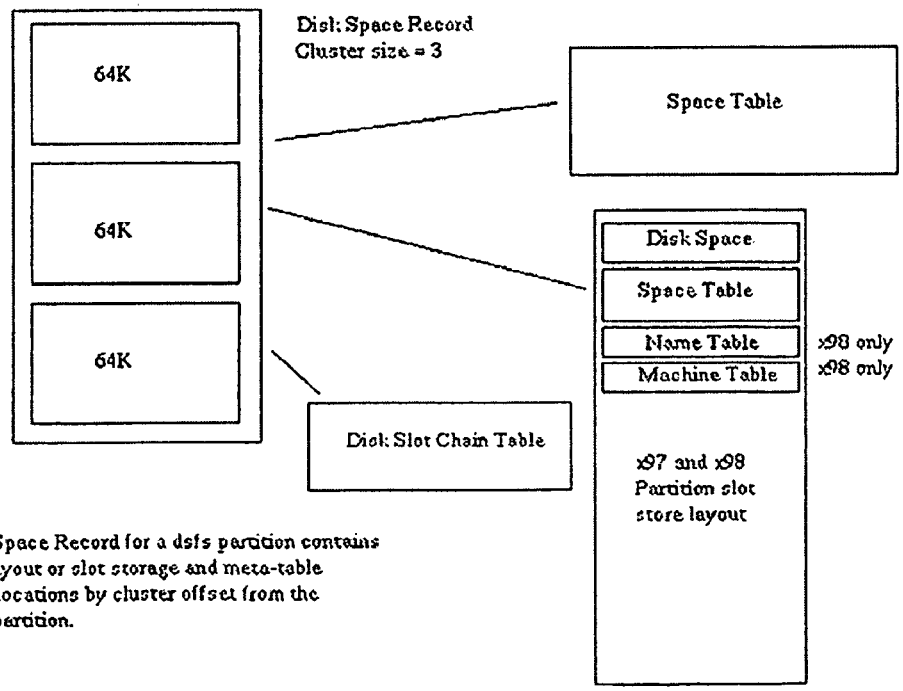
FIG. 16 depicts the use of a Name Table and Machine Table in a type 0x98 partition.

This optimization allows all I/O requests to the disk layout to be coalesced into 4K page addresses in the disk I/O layer. All read and write requests to the disk device are performed through the I/O layers as a 4K page. FIG. 15 depicts the slot cache buffers stored as contiguous runs of 16-2048 sectors. The sector run size may be configured as a compile-time option. Slots are submitted for I/O in coalesced requests that transmit a single scatter-gather list of DMA addresses and in sector order resulting in minimal head movement on the physical device and large coalesced I/O capability.

The Disk Space Record (DSR) will occupy the first cluster of an adjusted Disk Space Record partition. The DSR records the cluster offset into the virtual Disk Space Store of the location of the Space Table, and optionally for partition type 0x98, the Name and Machine Tables as well. There is also a cluster record that indicates where the slot storage area begins on a Virtual Disk Space Store Partition.

The DSR also contains a table of slot chain head and tail pointers. This table is used to create slot chains that map to physical network adapters that are streaming data to the individual slot chains. This table supports a maximum of 32 slot chains per Disk Space Record Store. This means that a primary capture partition type 0x97 can archive up to 32 network adapter streams concurrently per active Capture Partition.

Type 0x98 Archive Storage Partitions employ a Name Table and Machine table that are used to store slots from primary capture partitions for long term storage and archive of network traffic and also record the host machine name and the naming and meta-tagging information from the primary capture partition. depicts the use of a Name Table and Machine Table in a type 0x98 partition. When slots are archived from the primary capture partition to a storage partition, the interface name and machine host name are added to the name table and the host name table on the archive storage partition. This allow multiple primary capture partitions to utilize a pool of archive storage to archive captured network traffic from specific segments into a large storage pool for archival and post capture analysis.

Archive storage can be mapped to multiple Network Capture Appliances as a common pool of slot segments. Archive storage pools can also be subdivided into storage zones with this architecture and tiered as a hierarchical cache and archive network traffic for months, or even years from target segments.

Individual Slot addresses are mapped to the Disk Space Store based upon partition size, number of slots, storage record cluster size, and reserved space based on the following algorithm:

```
slot_cluster = (disk space record->start_of_slot_data +
    (slot_number * (disk_space_record->slot_size /
    disk_space_record->cluster_size)));
```

The Start of slot data is the logical cluster address that immediately follows the last cluster of the space table for type 0x97 partitions and the last cluster of the machine table for type 0x98 partitions. Slots are read and written as a contiguous run of sectors to and from the disk storage device starting with the mapped slot cluster address derived from the slot number.

A slot defines a unit of network storage and each slot contains a slot header and a chain of 64K clusters. The on-disk structure of a slot is identical to the cache in-memory structure and both memory and the on-disk slot caches are viewed and treated by DSFS as specialized forms of LRU (last recently used) cache.

Figure 17:
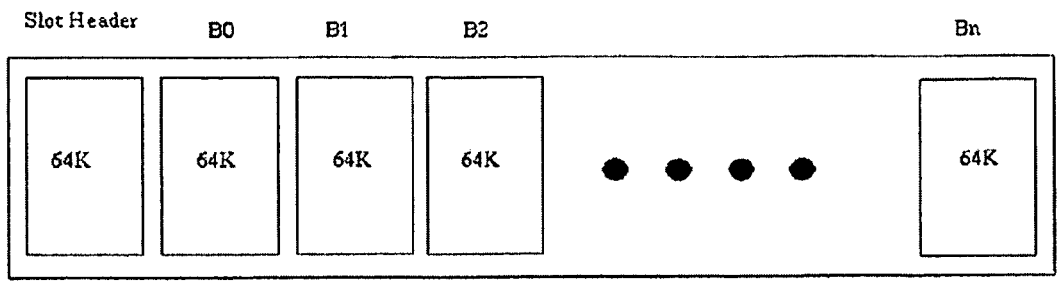
FIG. 17 depicts the slot storage element layout comprising 64K clusters.
Figure 18:
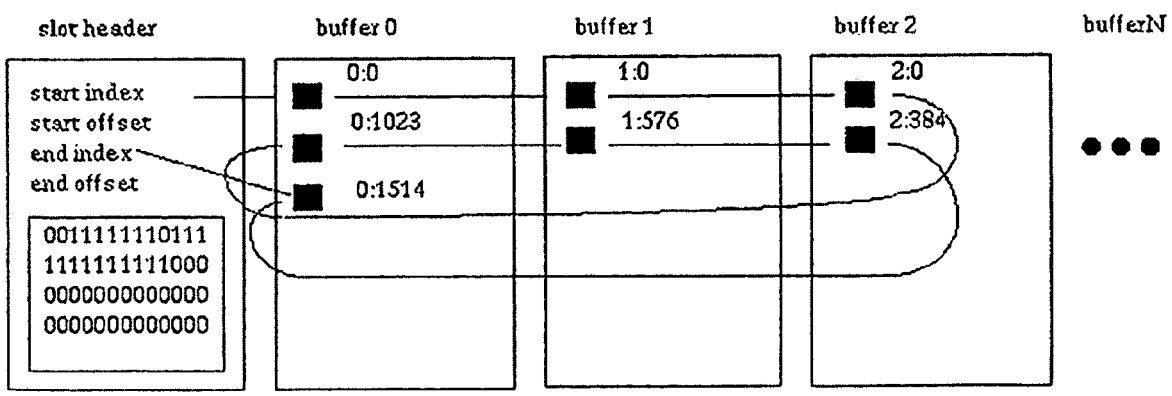
FIG. 18 depicts the slot header and pointer system to the slot buffers containing data.

The slot header stores meta-data that describes the content and structure of a slot and its corresponding chain of 64 clusters. FIG. 17 depicts the slot storage element layout comprising 64K clusters. The slot header points to the buffers as a character byte stream and also maintains starting index: offset pairs into buffer indexes within a slot. FIG. 18 depicts the slot header and pointer system to the slot buffers containing data. Buffers in a slot are indexed zero relative to the first buffer element contained in a slot buffer segment. A slot can have from 16-2048 buffer elements. Slots also provide a block oriented method for packet traversal that allow network packets to be skipped over based on index:offset pair. This index: offset pair is handled by the file system layers as a virtual index per packet into a slot segment.

The slot buffer header points to the first index:offset and the last index:offset pair within a slot segment buffer, and also contains a bitmap of buffer indexes that are known to contain valid slot data. These indexes are used by the I/O caching layer for reading sparse slots (slots not fully populated with network packet data) into memory efficiently.

Slot buffer sizes must match the underlying hardware in order for the algorithm to work properly. The high performance of this invention is derived from the technique described for filling of pre-load addresses into a network adapter device ring buffer. Network adapters operate by pre-loading an active ring or table on the adapter with memory addresses of buffer addresses to receive incoming network packets. Since the adapter cannot know in advance how large a received packet may be, the pre-loaded addresses must be assumed to be at least as large as the largest packet size the adapter will support. The algorithm used by DSFS always assumes at least the free space of (PACKET_SIZE+1) must be available for a pre-load buffer since buffers can exceed the maximum packet size due to VLAN (Virtual LAN) headers generated by a network router or switch.

The network adapter allocates buffers from the DSFS slot cache into the adapter based upon the next available index: offset pair. The buffers are maintained as a linear list of index addresses that are cycled through during allocation that allows all ring buffer entries to be pre-loaded from a buffer array (i.e. slot segment) in memory. The number of slot buffers must therefore be (NUMBER_OF_RING_BUFFERS*2) at a minimum in order to guarantee that as buffers elements are received and freed, the adapter will always obtain a new pre-load buffer without blocking on a slot segment that has too many buffers allocated for a given ring buffer.

Figure 19:
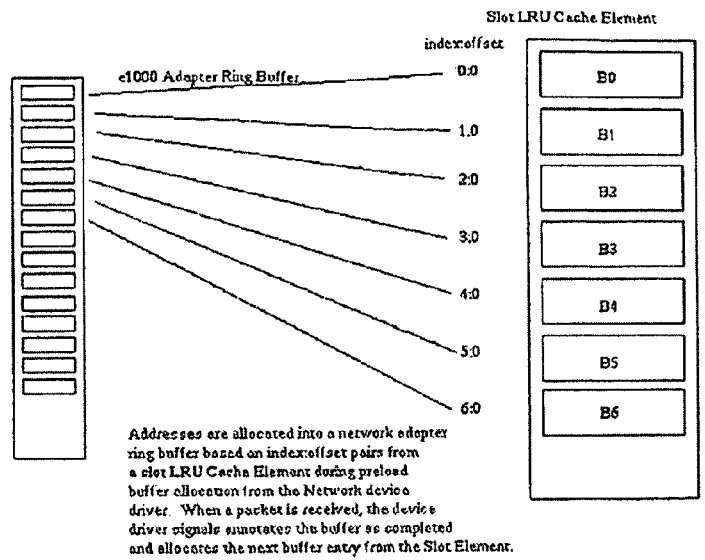
FIG. 19 depicts sequential loading of slot cache elements on an LRU basis from an e1000 Adaptor Ring Buffer.

Since ring buffer ring buffer pre-load/release behavior is always sequential in a network adapter, this model works very well, and as the buffer chain wraps, the adapter ring buffer will continue to pre-load buffers as free-behind network packets are released to the operating system on receive interrupts. FIG. 19 depicts sequential loading of slot cache elements on an LRU basis from an e1000 Adaptor Ring Buffer. This has the affect of harnessing the DMA engine on the network adapter to move network traffic into the slot buffer segment without copying the network data.

As buffers are allocate from a slot cache element and pre-loaded into the adapter ring buffer memory, the buffer header is pinned in memory for that particular buffer, and subsequent allocation requests will skip this buffer until the pre-loaded element has been received from the adapter.

This is necessary because the size of the received buffer is unknown. It is possible to round robin allocate pre-load buffers to the maximum size (MTU—maximum transmission unit) of a network packet, however, this method wastes space. In the current invention, preloads pin buffer headers until receipt so that subsequent allocation requests to the buffer will use space more efficiently.

Figure 20:
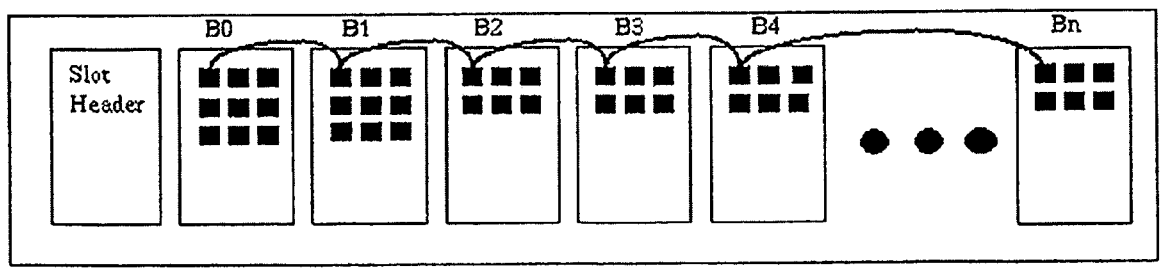
FIG. 20 depicts slot buffers allocated in a round-robin pattern from each buffer element in a slot buffer list.

Slot buffers are allocated in a round-robin pattern from each buffer element in a slot buffer list, as depicted in FIG. 20. Linkages are maintained between each element into the next buffer that are accessed by means of an index:offset pair as described. These comprise a coordinate address for a buffer location of stored data and allow the lost buffer to preload capture addresses into the ring buffers of a capture device that supports direct DMA access at very high data rates into a slot buffer element cached in memory. Reading the captured data requires that the slot be held in memory and the elements traversed via a set of linkages within each element header that point to the next index:offset address pair for a stored element or network packet.

The allocation algorithm is as follows:

```
for (lock_count = 0, search_count = 0,
    curr = (slot->current_buffer % slot->d->buffer_count);;)
    {
    buffer = (slot->buffers[slot->current_buffer % slot->d->
    buffer_count]);
    if (!buffer)
        {
#if INTERFACE STATISTICS
        ioctl_stats.i_stats[index].dropped_elements_no_buffers++;
        ioctl_stats.i_stats[index].dropped_elements_current++;
#endif
#if VERBOSE
        getcaptrace(0, (void *)8, -1, -1);
#endif
        spin_unlock_irqrestore(&slot->s_lock, slot->s_flags);
        return (get_collision_buffer( ));
        }
    if (!buffer->flags)
        {
#if DYNAMIC_MTU
        if ((buffer->buffer_offset + sizeof(ELEMENT_HEADER) +
        (ndevs[index]->mtu * )) < slot->buffer_size)
#else
        if ((buffer->buffer_offset + sizeof(ELEMENT_HEADER) +
        slot->max_packet_size) < slot->buffer_size)
#endif
            {
            p = (BYTE *)&buffer->buffer[buffer->buffer_offset];
            element = (ELEMENT_HEADER *) p;
            element->id_stamp = ELEMENT_SIGNATURE;
            element->slot = slot;
            element->sequence = slot->sequence++;
            element->buffer = buffer;
            element->state = 0;
            element->timestamp = 0;
            element->date = 0;
            element->time = 0;
            element->interface = index;
            element->length = 0;
            buffer->header_offset = buffer->buffer_offset;
            buffer->buffer_offset += sizeof(ELEMENT_HEADER);
            buffer->flags = -1;
            buffer->state |= L_DIRTY;
            if (!slot->b->cluster_bitmap[buffer->index])
                {
#if VERBOSE
                slot->posted_count++;
#endif
                slot->b->cluster_bitmap[buffer->index] = 1;
                }
```

-continued

```
            slot->state |= L_DIRTY;
            slot->buffers_allocated++;
            p = (BYTE *)&buffer->buffer[buffer->buffer_offset];
            last_element = (ELEMENT_HEADER *)slot->last_element;
            if (last_element)
                {
                last_element->next_offset = buffer->header_offset;
                last_element->next_index =
                    (slot->current_buffer % slot->d->buffer_count);
#if (!TEST_AUTO_REPAIR)
                if (slot->last_buffer)
                    slot->last_buffer->state |= L_DIRTY;
#endif
                element->previous_offset = slot->b->last_element_offset;
                element->previous_index = slot->b->last_element_index;
                element->next_offset = 0;
                element->next_index = 0xFFFFFFFF;
                }
            else
                {
                slot->b->starting_index =
                    (slot->current_buffer % slot->d->buffer_count);
                slot->b->starting_offset = buffer->header_offset;
                element->previous_offset = 0;
                element->previous_index = 0xFFFFFFFF;
                element->next_offset = 0;
                element->next_index = 0xFFFFFFFF;
                }
            slot->last_buffer = buffer;
            slot->last_element = element;
            slot->b->last_element_offset = buffer->header_offset;
            slot->b->last_element_index = (slot->current_buffer % slot->
            d->buffer_count);
            slot->b->all_elements++;
#if VERBOSE
            getcaptrace(p, buffer, buffer->buffer_offset,
            slot->current_buffer % slot->d->buffer_count);
#endif
            for (slot->current_buffer++,
            curr = (slot->current_buffer % slot->d->buffer_count);;)
                {
                buffer = (slot->buffers[slot->current_buffer % slot->d->
                buffer_count]);
                if (!buffer)
                    {
                    slot->full = 0xFFFFFFFF;
                    break;
                    }
                if (!buffer->flags)
                    {
#if DYNAMIC_MTU
                    if ((buffer->buffer_offset +
                    sizeof(ELEMENT_HEADER) +
                    (ndevs[index]->mtu * 2)) < slot->buffer_size)
#else
                    if ((buffer->buffer_offset +
                    sizeof(ELEMENT_HEADER) +
                    slot->max_packet_size) < slot->buffer_size)
#endif
                        {
                        break;
                        }
                    }
                if ((++slot->current_buffer % slot->d->buffer_count) ==
                curr)
                    {
                    slot->full = 0xFFFFFFFF;
                    break;
                    }
                }
            spin_unlock_irqrestore(&slot->s_lock, slot->s_flags);
            return p;
            }
        }
    lock_count++;
    if ((++slot->current_buffer % slot->d->buffer_count) == curr)
        break;
    }
```

Figure 21:
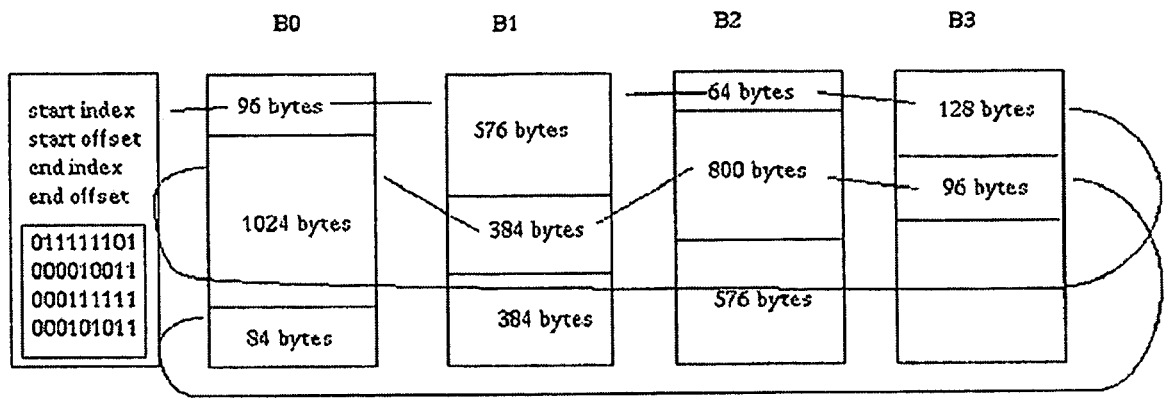
FIG. 21 depicts populated slot buffers in which the packets are of variable size and are efficiently stored so as to use all available buffer space in the slot cache element buffer chain.

FIG. 21 depicts an example of populated slot buffers in which the packets are of variable size and are efficiently stored so as to use all available buffer space in the slot cache element buffer chain. This is achieved assigning bugger allocations from allocated preload buffers until the adaptor releases that buffer through a receive interrupt and posts the size of the received packet. The buffer is then set to the next index:offset pair and flagged as available for pre-load allocation into the adapter ring buffer. This approach allows network packets to be tightly packed using the full amount of available slot cache buffer memory with little waste. This improves capture line rates by using disk storage space and reducing the write size overhead for captured data. With this model, data captured from the network in terms of bytes/second is more accurately reflected as the actual writes sizes of data written through the disk I/O channel.

The Disk Space Record contains a 32 entry slot chain table. The Slot chain table defines the starting and ending slot Identifiers for a chain of populated slot cache elements that reside in the non-volatile system cache (on-disk). The Slot Chain table also records the date extents for capture network packets that reside in the time domain that comprises the sum total of elapsed time between the starting and ending slot chain element.

As slots are filled, each slot records the starting and ending time for the first and last packet contained within the slot cache element. Slots internally record time at the microsecond interval as well as UTC time for each received packet, however, within the Slot Chain and Space Table, only the UTC time is exported and recorded since microsecond time measurement granularity is not required at these levels for virtual file system interaction.

Figure 22:
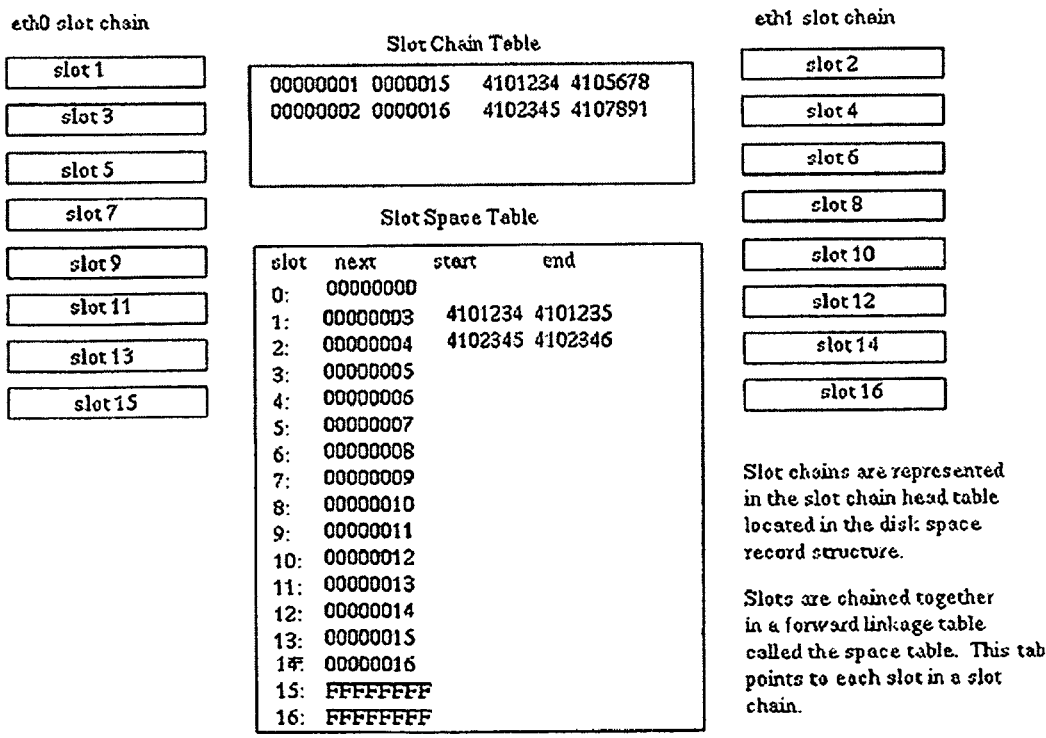
FIG. 22 depicts the Slot Chain Table and Slot Space Table in schematic form.

FIG. 22 depicts the Slot Chain Table and Slot Space Table in schematic form. Slot chains are represented in the slot chain head table located in the disk space record structure. Slots are chained together in a forward linkage table called the slot space table that points to each slot in a slot chain. As slots are chained together in the system, the starting and ending time domains are recorded in the slot chain table located in the disk space record that reflect the time domain contained within a slot chain. The DSFS file system is time domain based for all stored slot cache elements and slot chains that exist within a given disk space record store. Slot recycling uses these fields in order to determine which slots will be reused by the system when the non-volatile (on-disk) slot cache becomes fully populated and must reclaim the oldest slots within the store to continue capturing and archiving network traffic.

Figure 23:
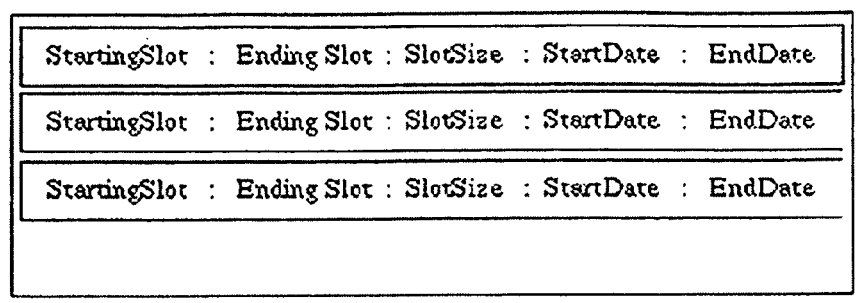
FIG. 23 depicts the internal layout depicted of the Slot Chain Table.

The Slot Chain Table uses the internal layout depicted in FIG. 23 to record specific information about each allocated slot chain. The disk space record contains a slot chain table the records the starting and ending slot index for a slot chain of captured elements. This table also records the number of slots in a chain and the starting and ending date:time for data stored in a linked chain of slots.

The Slot Chain Table records the starting slot address for a slot chain, the ending slot address for a slot chain, the number of total slots that comprise a slot chain, and the starting and ending dates for a slot chain. The dates are stored in standard UTC time format in both the Slot Chain Table and the System Space Table.

The slot chain table is contained within these fields in the disk space record header:

```
ULONG slot_starting_cluster[MAX_INTERFACE_SLOTS];
ULONG slot_ending_cluster[MAX_INTERFACE_SLOTS];
ULONG slot_starting_time_domain[MAX_INTERFACE_SLOTS];
ULONG slot_ending_time_domain[MAX_INTERFACE_SLOTS];
ULONG slot_chain_size[MAX_INTERFACE_SLOTS];
long long slot_element_count[MAX_INTERFACE_SLOTS];
long long slot_element_bytes[MAX_INTERFACE_SLOTS];
long long slot_slice_bytes[MAX_INTERFACE_SLOTS];
SPACE_TABLE space_entry[MAX_INTERFACE_SLOTS];
SPACE_TABLE slice_entry[MAX_INTERFACE_SLOTS];
BYTE slot_names[MAX_INTERFACE_SLOTS][IFNAMSIZ];
INTERFACE_INFO interface_info[MAX_INTERFACE_SLOTS];
```

Figure 24:
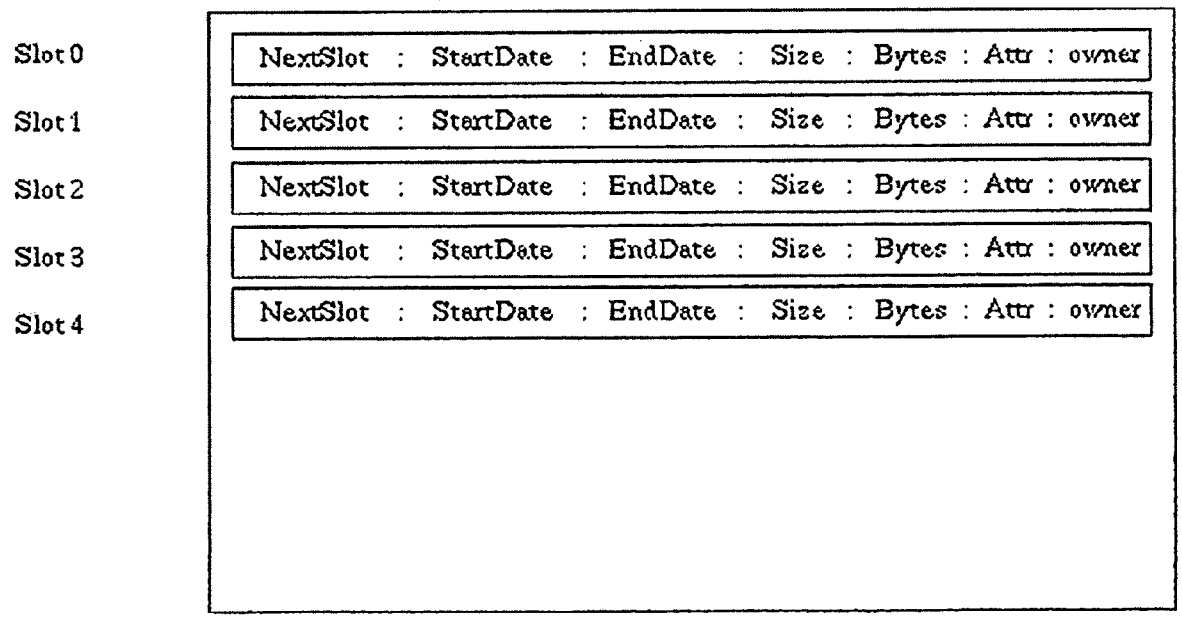
FIG. 24 depicts the Space Table layout schematically.

The Space Table serves as the file allocation table for Slot Chains in the system. FIG. 24 depicts the Space Table layout schematically. Slot Chains are analogous to files in a traditional file system. The Space table contains a field that points to the next logical slot within a slot chain, as well as starting and ending dates in UTC time format for packets stored within a Slot Cache Element.

The space table also stores meta-data used for dynamic file reconstruction that includes the number of packets stored in a slot cache element, the number of total packet bytes in a slot cache element, file attributes, owner attributes, meta-data header size, and the size of packet sliced bytes (96 byte default).

Space Table Entries use the following internal structure:

```
typedef struct _SPACE_TABLE
{
    ULONG slot;
    ULONG time_domain;
    ULONG ending_domain;
    ULONG element_count;
    ULONG element_bytes;
    ULONG slice_bytes;
    ULONG meta_bytes;
    WORD interface;
    umode_t mode;
    uid_t uid;
    gid_t gid;
    long long size;
} SPACE_TABLE;
```

Space Table Linkages are created by altering the next slot field which corresponds to a slot on a Disk Space Record Store. The Space Table entries are sequentially ordered based on slot position within the store. Index 0 into the Space Table corresponds to slot 0, index 1 to slot 1, and so forth. Space Table information is mirrored in both a secondary Mirrored Space table, and also exists within the slot cache element header for a slot as well. This allows a Space Table to be rebuilt from slot storage even if both primary and secondary Space Table mirrors are lost and is provided for added fault tolerance.

The slot number address space is a 32-bit value for which a unique disk space record store is expressed as:

(0xFFFFFFFF-1)=total number of slot addresses.

Value 0xFFFFFFFF is reserved as an EOF (end of file) marker for the Space Table next slot entry field which allows a range of 0-(0xFFFFFFFF-1) permissible slot addresses. Slot Chains are created and maintained as a linked list in the Space Table of slots that belong to a particular slot chain. The beginning and ending slots and their time domain and ending domain values are stored in the Slot Chain table in the DSR, and the actual linkages between slots is maintained in the space table. During Space Table traversal, when the value 0xFFFFFFFF is encountered, this signals end of chain has been reached.

The DSFS space table maintains an allocation table that employs positional chain elements in a forward linked list that describe a slot index within a DSFS file system partition. The Disk Space record stores the actual cluster based offset into a DSFS partition for meta-table and slot storage.

Figure 25:
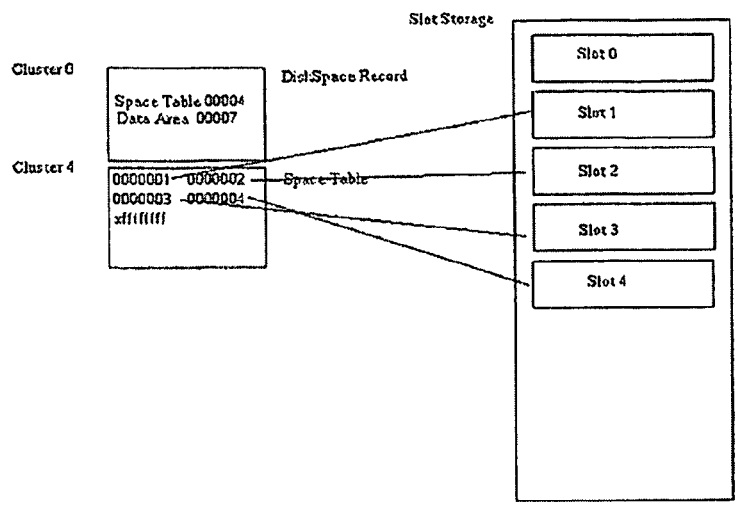
FIG. 25 depicts the storage of the Disk Space record and the Space Table linked to stored slots.

FIG. 25 depicts the storage of the Disk Space record and the Space Table linked to stored slots. This example illustrates a slot chain comprising elements 0-4. Space Table index 0 has a next slot entry of 1, 1 points to 2, 2 to 3, 3 to 4, and 4 to 0xFFFFFFFF.

During normal operations in which a disk space record store has not been fully populated, slots are allocated based upon a bit table built during DSR mount that indicated the next free slot available on a particular DSR. As slots are allocated, and the disk space record store becomes full, it becomes necessary to recycle the oldest slot cache elements from the store. Since the time domain information for a particular slot chain is stored in the Disk Space Record header, it is a simple matter to scan the 32 entries in the table and determine the oldest slot cache element reference in a slot chain head. When the slot cache has become completely full, the oldest slot segment is pruned from the head of the target slot chain and re-allocated for storage from the volatile (in-memory) slot element cache.

Figure 26:
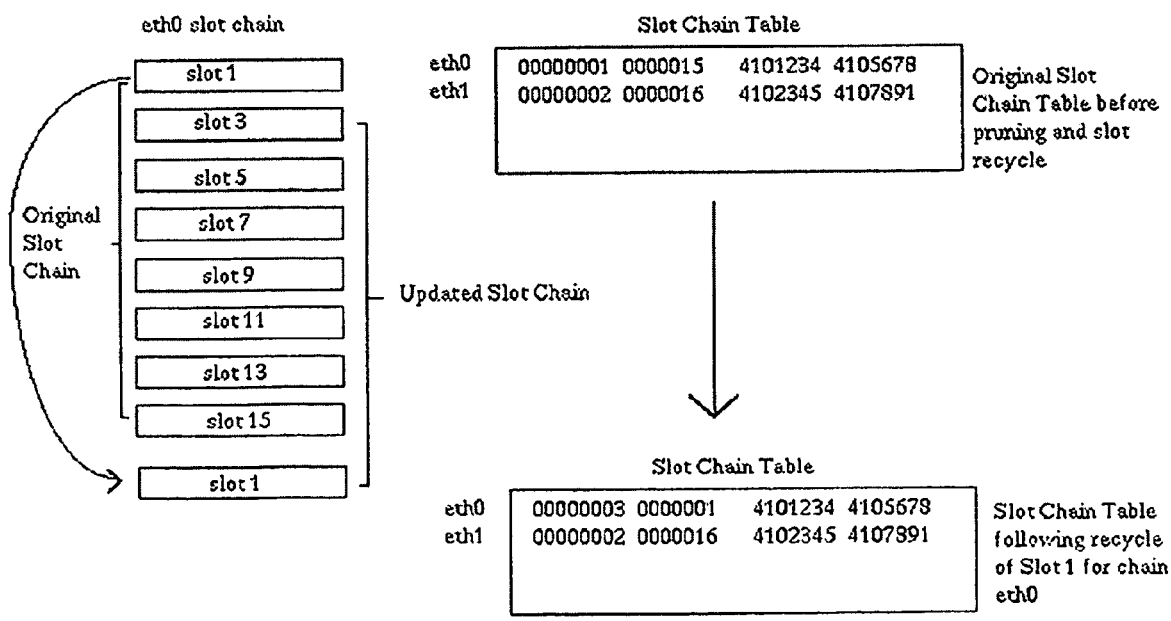
FIG. 26 depicts the on-disk slot cache segment chains employing a last recently uses LRU recycling method.

The Slot Chain Heads are correspondingly updated to reflect the pruned slot and the storage is appended to the ending slot of the active slot chain that allocated the slot cache element storage. FIG. 26 depicts the on-disk slot cache segment chains employing a last recently uses LRU recycling method. The starting slot located in the slot chain table is pruned from the slot chain head based on the oldest starting slot in the Slot Chain Table for a given Disk Space Record of slot cache storage segments.

During initial mounting and loading of a DSFS disk space record store, the store is scanned, space tables are scanned for inconsistencies, and the chain lengths and consistencies are checked. During this scan phase, the system builds several bit tables that are used to manage allocation of slot cache element storage and chain management. These tables allow rapid searching and state determinations of allocations and chain location and are used by the DSFS virtual file system to dynamically generate file meta-data and LIBPCAP headers. These tables also enable the system to correct data inconsistencies and rapid-restart of due to incomplete shutdown.

Figure 27:
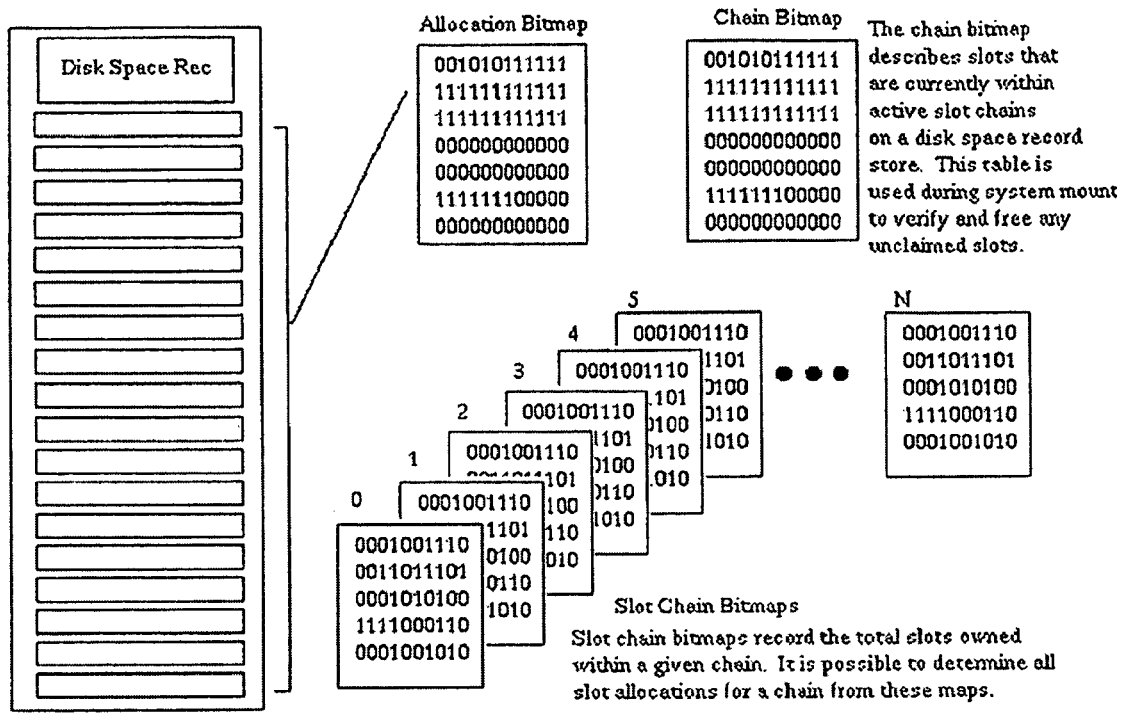
FIG. 27 depicts the Allocation Bitmap and Chain Bitmap table structure.

The Space Tables are mirrored during normal operations on a particular DSR and checked during initial mounting to ensure the partition is consistent. The system also builds an allocation map based on those slots reflected to exist with valid linkages in the space table. FIG. 27 depicts the Allocation Bitmap and Chain Bitmap table structure. After this table is constructed, DSFS verifies all the slot chain links and compares the allocations against a chain bitmap table that is annotated as each chain element is traversed. If a chain is found to have already been entered into the bitmap table, then a circular chain has been detected and the chain is truncated to a value of 0xFFFFFFFF. Following verification of chain linkages, the system compares the allocation bitmap with the chain bitmap and frees any slots in the space table that do not have valid linkages in the chain bitmap table. This allows the system to dynamically recover from data corruption due to improper shutdown or power failures without off-line (un-mounted) repair. Each Slot Chain Head maintains a bitmap of current slot allocations within it's particular chain. This table is used to validate slot membership within a chain by user space processes running about DSFS that may have stale handles or context into a chain after a recycle event.

It is possible for a user space application to hold a slot open for a particular slot chain, and for the chain to re-cycle the slot underneath the user during normal operations. The Slot Chain bitmaps allow the DSFS virtual file system to verify a slots membership in a chain before retrying the read with a known slot offset location.

The volatile (in-memory) slot element cache is designed as a memory based linked listing of slot cache elements that mirrors the slot cache element structure used on disk. The format is identical on-disk to the in-memory format that described a slot cache element. This list is maintained through three sets of linkages that are combined within the slot buffer header for a slot cache element. The structure of a slot cache element is as follows:

```
typedef struct _SLOT_BUFFER_HEADER
{
    ULONG signature;
    ULONG asynch_io_signature;
    ULONG slot_instance;
    struct _SLOT_BUFFER_HEADER *next;
    struct _SLOT_BUFFER_HEADER *prior;
    struct _SLOT_BUFFER_HEADER *lnext;
    struct _SLOT_BUFFER_HEADER *lprior;
    struct _SLOT_BUFFER_HEADER *hashNext;
    struct _SLOT_BUFFER_HEADER *hashPrior;
    struct _SLOT_BUFFER_HEADER *list_next;
    struct _SLOT_BUFFER_HEADER *list_prior;
    volatile unsigned long state;
    ULONG max_packet_size;
    ULONG buffer_size;
    ULONG current_buffer;
    ULONG buffers_allocated;
    ULONG sequence;
    ULONG io_count;
    ULONG critical_section;
    ULONG slot_age;
    CAPTURE_BUFFER_HEADER *buffers[RING_SLOTS_MAX];
    CAPTURE_BUFFER_HEADER *slot_buffer;
    CAPTURE_BUFFER_HEADER *last_buffer;
    void *last_element;
    DISK_SPACE_RECORD *d;
    ULONG waiters;
    ULONG lock_count;
    ULONG slot_id;
    ULONG io_signature;
    ULONG (*slot_cb)(struct _SLOT_BUFFER_HEADER *);
    ULONG slot_cb_param;
    ULONG lru_recycled;
    ULONG last_slot_id;
    ULONG slot_type;
    ULONG posted_count;
    ULONG submitted_count;
#if (!LINUX_UTIL)
    spinlock_t s_lock;
    ULONG s_flags;
#endif
    ULONG last_eip;
#if (!LINUX_UTIL)
    struct semaphore sema;
    struct semaphore release_sema;
#endif
    SPACE_TABLE *space;
    SPACE_TABLE_BUFFER *space_buffer;
    SLOT_BANK_HEADER *b;
    ULONG full;
    ULONG flags;
} SLOT_BUFFER_HEADER;
```

Figure 28:
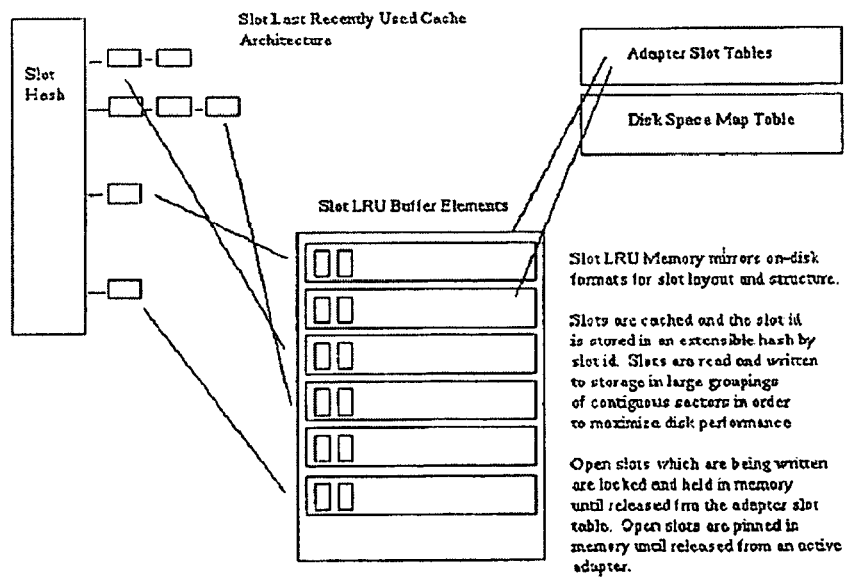
FIG. 28 depicts the use of a slot hash table to map slot LRU buffer elements.

The slot buffer header that describes a slot cache element is a member of four distinct lists. The first list is the master allocation list. This list maintains a linkage of all slot buffer heads in the system. It is used to traverse the slot LRU listing for aging of slot requests and write I/O submission of posted slots. The slot buffer header also can exist in a slot hash listing. FIG. 28 depicts the use of a slot hash table to map slot LRU buffer elements. This listing is an indexed table that utilizes an extensible hashing algorithm to keep a hash of slots currently cached in the system. This allows rapid lookup of a slot by number from the system and is the main view portal from user space into the DSFS file system. If a slot does not exist in the hash listing with a valid ID, then it is not accessible during initial open operations of a slot.

The LRU list is used by DSFS to determine which slot buffer header was touched last. More recent accesses to a slot buffer header result in the slot buffer header being moved to the top of the listing. Slot cache elements that have valid data and have been flushed to disk and have not been accessed tend to move to the bottom of this list over time. When the system needs to re-allocate a slot cache element and it's associated slot buffer header for a new slot for either a read or write request to the volatile slot LRU cache, then the caching algorithm will select the oldest slot in memory that is not locked, has not been accessed, and has been flushed to disk and return date from it. In the event of a read request from user space, it the slot is does not exist in the slot hash listing, it is added, the oldest slot buffer header is evicted from the cache, and scheduled for read I/O in order to load the requested slot from a user space reader.

Figure 29:
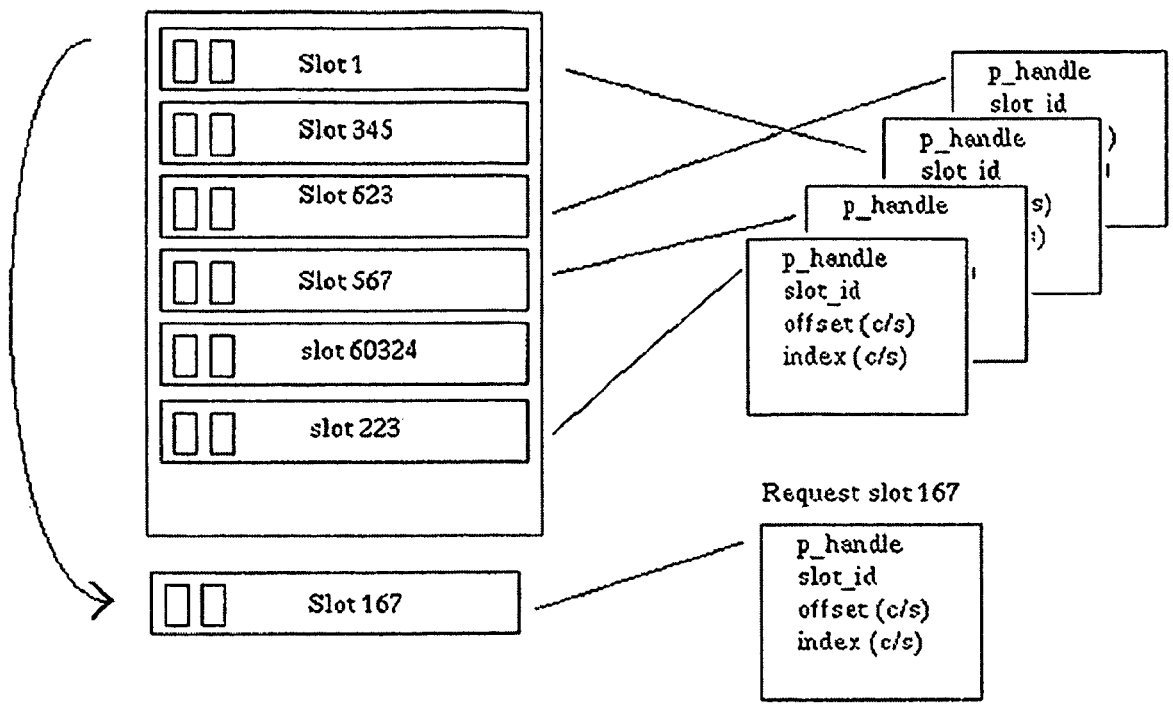
FIG. 29 depicts a request for reading or writing slot data from the volatile and non-volatile slot caches.

FIG. 29 depicts a request for reading or writing slot data from the volatile and non-volatile slot caches. A p_handle is used to submit a request to open a slot for reading network packets into user space applications. If the slot is already in memory, the p_handle opens the lost and reads packets until it reaches the end of slot data. If the slot is not in the LUR cache, the last recently used slot cache buffer is recycled and submits an asynchronous read to the disk to fill the slot from non-volatile (on-disk) cache storage.

Figure 30:
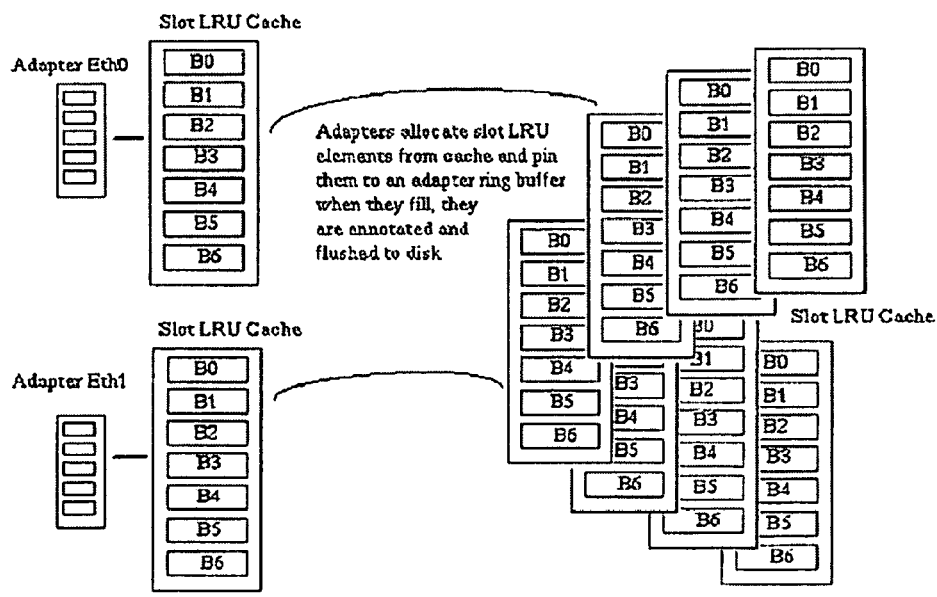
FIG. 30 depicts Ethernet adaptors allocating slot LRU elements from cache.

Network adapters that are open and capturing network packets allocate an empty slot buffer header which reference a slot cache element and its associated buffer chain from the LRU cache based on the algorithm depicted in FIG. 30 which shows how adaptors allocate slot LRU elements from cache. These slot buffer headers are locked and pinned in memory until the adapter releases the allocated buffers. The system keeps track of allocated slot buffer headers through an adapter slot table that records the current active slot cache element that is being accessed by a particular adapter ring buffer.

If a reader from user space accesses a slot buffer header and its associated slot cache element buffer chain during a recycle phase of a target slot, the slot LRU allows the network adapter at this layer to reallocate the same slot address in a unique slot buffer header and slot cache element. This process requires that the slot id be duplicated in the slot LRU until the last user space reference to a particular slot address is released. This even can occur if user space applications are reading data from a slot chain, and the application reaches a slot in the chain that has been recycled due to the slot store becoming completely full. In most cases, since slot chains contain the most recent data at the end of a slot chain, and the oldest data is located at the beginning of a slot chain, this is assumed to be an infrequent event.

Figure 31:
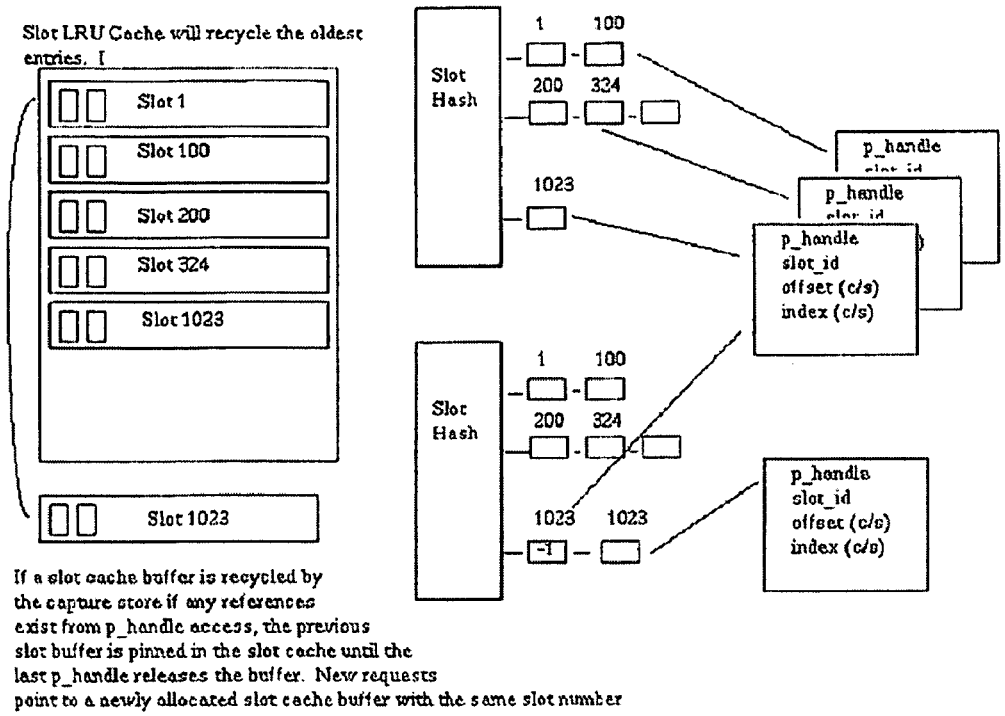
FIG. 31 depicts the recycling of the oldest entries as they are released.

The newly allocated slot chain element in this case becomes the primary entry in the slot hash list in the LRU, and all subsequent open requests are redirected to this entry. The previous slot LRU entry for this slot address is flagged with a −1 value and removed from the slot hash list that removes it from the user space portal view into the DSFS volatile slot cache. When the last reference to the previous slot buffer header is released from user space, the previous slot buffer header is evicted from the slot LRU and placed on a free list for reallocation by network adapters for writing or user space readers for slot reading by upper layer applications. FIG. 31 depicts the recycling of the oldest entries as they are released. When a slot cache buffer is recycled by the capture store, if any references exist from p_handle access, the previous slot buffer is pinned in the slot cache until the last p_handle releases the buffer. New request point to a newly allocated slot cache buffer with the same slot number.

A single process daemon is employed by the operating system that is signaled via a semaphore when a slot LRU slot buffer header is dirty and requires the data content to be flushed to the disk array. This daemon uses the master slot list to peruse the slot buffer header chain to update aging timestamps in the LRU slot buffer headers, and to submit writes for posted LRU elements. By default, an LRU slot buffer header can have the following states:

```
#define L__AVAIL 0x0000001
#define L__FREE 0x0000002
#define L__DATAVALID 0x0000004
#define L__DIRTY 0x0000008
#define L__FLUSHING 0x0000010
#define L__LOADING 0x0000020
#define L__UPTODATE 0x0000040
#define L__MAPPED 0x0000080
#define L__MODIFIED 0x0000100
#define L__POST 0x0000200
#define L__LOCKED 0x0000400
#define L__DROP 0x0000800
#define L__HASHED 0x0001000
#define L__VERIFIED 0x0002000
#define L__CREATE 0x0004000
#define L__REPAIR 0x0008000
#define L__ADJUST 0x0010000
```

Entries flagged as L_POST or L_REPAIR are written to non-volatile storage immediately. Entries flagged L_DIRTY are flushed at 30 second intervals to the system store. Metadata updates to the Space Table for L_DIRTY slot buffer headers are synchronized with the flushing of a particular slot address. Slot buffer headers flagged L_LOADING are read requests utilizing asynchronous read I/O. L_HASHED means the slot address and slot buffer header are mapped in the slot hash list and are accessible by user space applications for open, read, and close requests.

Figure 32:
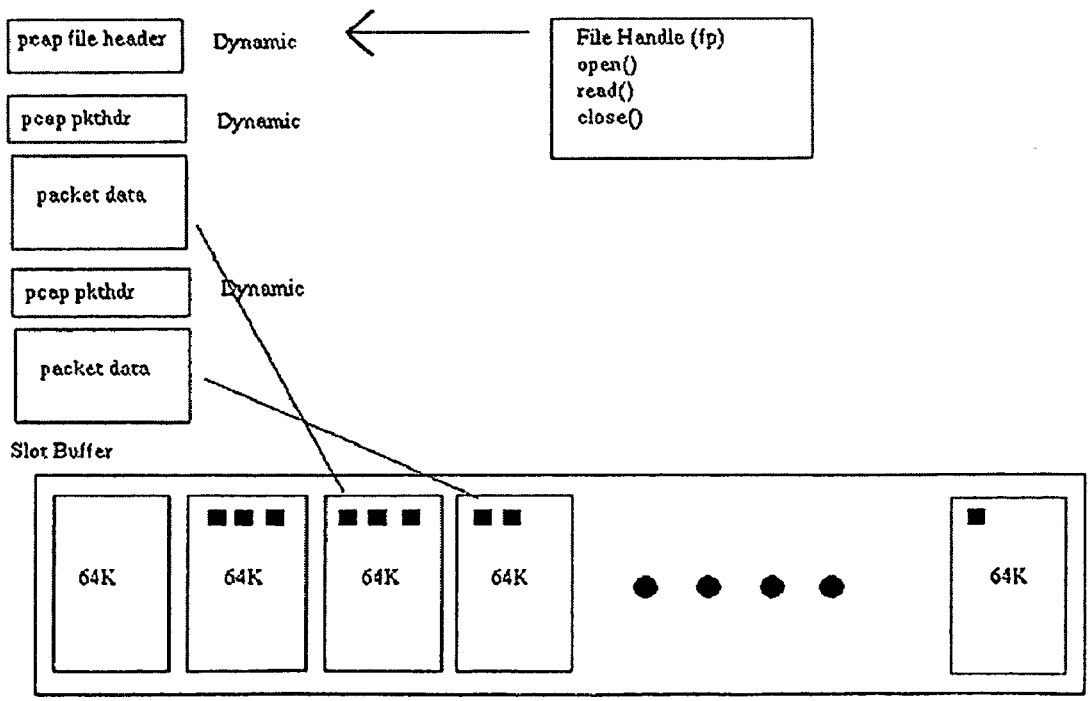
FIG. 32 depicts the DSFS virtual file system.

FIG. 32 depicts the DSFS virtual file system. The DSFS Virtual File System maps slots cache element as files and chains of slot cache elements as files to the user space operating system environment. DSFS also has the capability to expose this data in raw slot format, or dynamically generate LIBPCAP file formats to user space applications that use the file system interfaces. DSFS also exposes file system and capture core statistics as virtual files that can be read in binary and text based formats for external applications. The Virtual file system utilizes a virtual directory structure that allows a particular slot to expose multiple views of the slot data to user space.

The directory layouts are all accessible via open( ), read( ), write( ), lseek( ), and close( ) system calls; Slot chains are also exposed as virtual files and can also use standard system calls to read an entire slot chain of capture network traffic. LIBPCAP allows this data to be exported dynamically to a wide variety of user space applications and network forensics monitoring and troubleshooting tools.

The DSFS file system utilizes a P_HANDLE structure to create a unique view into a slot cache element or a chain of slot cache elements. The P_HANDLE structure records the network interface chain index into the Slot Chain table, and specific context referencing current slot address, slot index address, and offset within a slot chain, if a slot chain is being access and not an individual slot cache element.

The P_HANDLE structure is described as:

```
typedef struct __P_HANDLE
{
    ULONG opened;
    ULONG instance;
    ULONG interface;
    ULONG vinterface;
    struct net_device *dev;
    ULONG minor;
    ULONG slot_id;
    BYTE *buffer;
    ULONG length;
    ULONG flags;
    ULONG pindex;
    ULONG index;
    ULONG offset;
    ULONG slot_offset;
    ULONG turbo_slot;
    ULONG turbo_index;
    long long turbo_offset;
    SLOT_BUFFER_HEADER *slot;
    ULONG slot_instance;
    struct timeval start;
    struct timeval end;
    solera_file_node *node;
    ULONG slot_anchor;
    unsigned long long offset_anchor;
    ULONG pindex_anchor;
    ULONG anchor_date_limit;
    unsigned long long anchor_limit;
    ULONG xmit_flags;
    BITMAP *bitmap;
    ULONG bitmap_size;
    struct __P_HANDLE *next;
    struct __P_HANDLE *prior;
    void *d;
    struct timeval next_timestamp;
    unsigned long p_count;
    unsigned long p_curr;
    unsigned long p_mask;
    struct __P_HANDLE *p_active;
    ULONG p_active_size;
    ULONG p_active_offset;
    BYTE p_state[MAX_INTERFACE_SLOTS];
    struct __P_HANDLE *p_array[MAX_INTERFACE_SLOTS];
    long long p_offset[MAX_INTERFACE_SLOTS];
} P_HANDLE;
```

The P_HANDLE structure is also hierarchical, and allows P_HANDLE contexts to be dynamically mapped to multiple slot cache elements in parallel, that facilitates time domain based merging of captured network traffic. In the case of asymmetrically routed TX/RX network traffic across separate network segments, or scenarios involving the use of an optical splitter, network TX/RX traffic may potentially be stored from two separate network devices that actually represent a single stream of network traffic.

With hierarchical P_HANDLE contexts, it is possible to combine several slot chains into a single chain dynamically by selecting the oldest packet from each slot chain with a series of open p_handles, each with it's own unique view into a slot chain. This facilitates merging of captured network traffic from multiple networks. This method also allows all network traffic captured by the system to be aggregated into a single stream of packets for real time analysis of network forensics applications, such as an intrusion detection system from all network interfaces in the system.

Figure 33:
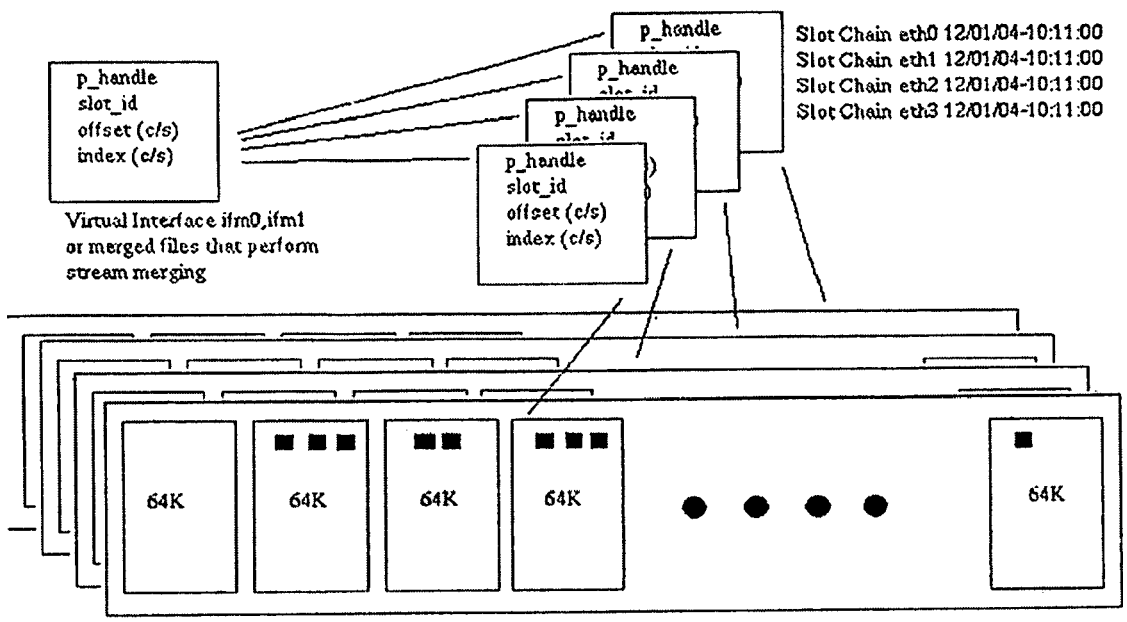
FIG. 33 depicts the use of p_handle context pointers in merging sots based on time domain indexing.

FIG. 33 depicts the use of p_handle context pointers in merging sots based on time domain indexing. The DSFS file system provide a specialized directory called the merge directory that allows user space application to create files that map P_HANDLE context pointers into unique views into a single capture slot chain, or by allowing user space applications to created a merged view of several slot chains that are combined to appear logically as a single slot chain.

Commands are embedded directly into the created file name and parsed by the DSFS virtual file system and used to allocate and map P_HANDLE contexts into specific index locations within the specified slot chains. The format of the command language is more fully defined as:

Name Format→int0:int1:int2:int3-data:<D>-data:<D,S>
D—Beginning or Ending Date
S—Maximum Size Where <int0> is the name or chain index number of a slot chain and <D> date is either a starting or ending date formatted in the following syntax or a date and an ending size of a merged series of slot chains. The touch command can be used to create these views into specified slot chains. To create a file with a starting and ending date range you wish to view, enter:

touch <interface[number]:interface[number]>-MM.D-D.YYYY.HH.MM.SS:d-MM.DD.YYYY.H-H.MM.SS:d To create a file with a starting date that is limited to a certain size, enter:

touch <interface[number]:interface[number]>MM.D-D.YYYY.HH.MM.SS:d-<size in bytes>:s An interface number can also be used as an interface name. This was supported to allow renaming of interfaces while preserving the ability to read data captured on a primary partition including, by way of example, the following data sets and their respective command line entries:

all packets captured for a time period of 1 second on Aug. 2, 2004 at 14:15:07 through Aug. 2, 2004 at 14:15:08 on eth1 and eth2 touch eth1:eth2-08.02.2004.14.15.07:d-08.02.2004.14.15.08:d all packets captured for a time period of Aug. 2, 2004 at 14:15:07 up to the <size> of the specified data range on eth1 touch eth1-08.02.2004.14.15.07:d-300000:s all packets captured for a time period of 1 second on Aug. 2, 2004 at 14:15:07 through Aug. 2, 2004 at 14:15:08 for eth1(11)

touch 11-08.02.2004.14.15.07:d-08.02.2004.14.15.08:d all packets captured for a time period of Aug. 2, 2004 at 14:15:07 up to the <size> of the specified data range eth1(11)

touch 11-08.02.2004.14.15.07:d-300000:s

Figure 34:
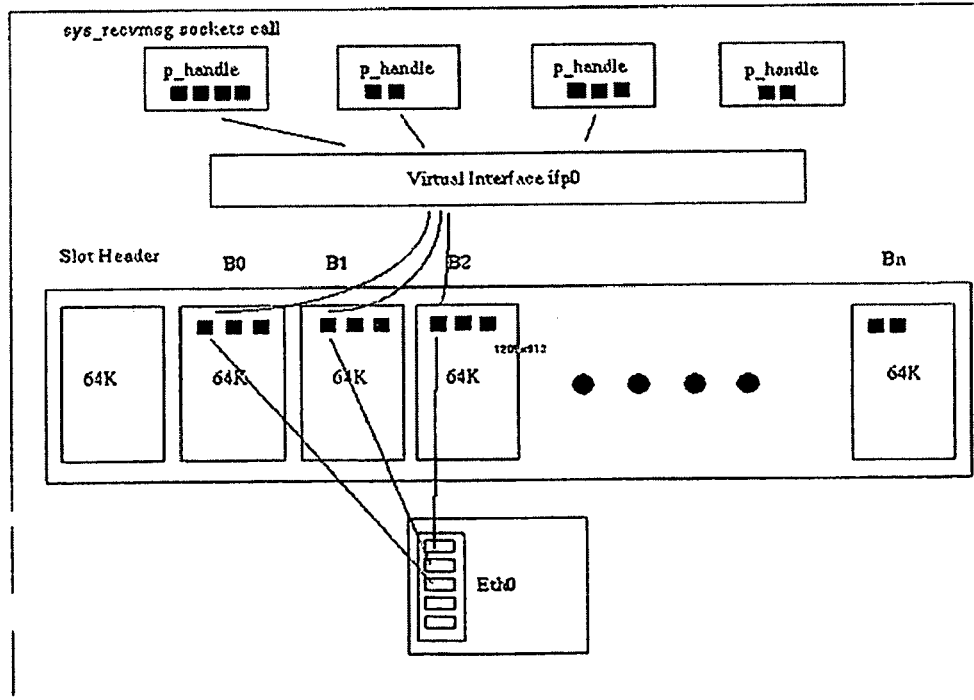
FIG. 34 depicts the employment of p_handle context structures via user space interfaces to create virtual network adapters that appear as physical adapters to user space applications.

P_HANDLE context structures are also employed via user space interfaces to create virtual network adapters to user space that appear as physical adapters to user space applications as depicted in FIG. 34. DSFS allows p_handle contexts to be mapped to the capture slot chain for a physical network adapter, such as eth0, and allow user space applications to read from the capture store as though it were a physical network. The advantage of this approach relates to packet lossless performance. With this architecture, the I/O subsystem in the DSFS capture system has been architected to favor network capture over user applications. Exporting virtual network interfaces allows user space intrusion detection systems to run as applications without being directly mapped to hardware devices. This also allows the user applications to process the captured network packets in the background while the network packets are streamed to the disk arrays in parallel. This provides significantly improved performance of intrusion detection applications without packet loss, since the application can simply sleep when the network load on the system becomes more active.

This also allows all known network forensic applications that use standard network and file system interfaces seamless and integrated access to captured data at real-time performance levels and additionally providing a multi-terabyte capture store that streams packets to disk in a permanent archive while at the same time supporting real-time analysis and filtering applications with no proprietary interfaces. Virtual interfaces are created using calls into the sockets layer of the underlying operating system. Calls to open s socket result in the creation of a P_HANDLE context pointer mapped into the captured slot chain for a mapped virtual device. The algorithm that maps a P_HANDLE context to an operating system socket is described as:

```
int bind_event(struct socket *sock, struct net_device *dev)
{
struct sock *sk = sock->sk;
P_HANDLE *p_handle;
if (dev && ifp_state[dev->ifindex] && !sk->priv_data)
{
if (!verify_license(VI_ACTIVE))
{
P_Print("Solera Networks, Inc.: license feature
VIRTUAL_INTERFACE not installed\n");
return –10;
}
p_handle = KMALLOC(sizeof(P_HANDLE), GFP_KERNEL);
if (!p_handle)
return 0;
memset(p_handle, 0, sizeof(P_HANDLE));
#if USE_LOCAL_BUFFER
p_handle->buffer = KMALLOC(MAX_BUFFER_SIZE,
GFP_KERNEL);
if (!p_handle->buffer)
{
kfree(p_handle);
return 0;
}
memset(p_handle->buffer, 0, MAX_BUFFER_SIZE);
p_handle->length = MAX_BUFFER_SIZE;
#endif
p_handle->opened = –1;
p_handle->instance = (ULONG) sock;
p_handle->vinterface = –1;
p_handle->dev = NULL;
if (dev)
{
p_handle->vinterface = dev->ifindex;
p_handle->dev = dev;
}
p_handle->interface = 0;
p_handle->minor = 0;
p_handle->slot_id = 0;
p_handle->slot_anchor = –1;
p_handle->offset_anchor = 0;
p_handle->pindex_anchor = 0;
p_handle->anchor_date_limit = 0;
p_handle->anchor_limit = 0;
p_handle->slot_instance = 0;
p_handle->pindex = 0;
p_handle->index = 0;
p_handle->offset = 0;
p_handle->slot_offset = 0;
p_handle->turbo_slot = –1;
p_handle->turbo_index = 0;
p_handle->turbo_offset = 0;
#if LINUX_26
p_handle->start.tv_sec = CURRENT_TIME.tv_sec;
#else
p_handle->start.tv_sec = CURRENT_TIME;
#endif
p_handle->start.tv_usec = 0;
p_handle->end.tv_sec = 0xFFFFFFFF;
p_handle->end.tv_usec = 0xFFFFFFFF;
p_handle->flags = –1;
p_handle->next = NULL;
p_handle->prior = NULL;
if ((p_handle->vinterface != –1) &&
(p_handle->vinterface < MAX_INTERFACE_SLOTS) &&
(vbitmap[p_handle->vinterface]))
{
p_handle->bitmap = vbitmap[p_handle->vinterface];
p_handle->bitmap_size = sizeof(BITMAP);
}
sk->priv_data = p_handle;
if (dev->name && !(strncmp(dev->name, "ifm", 3)))
{
register int j;
for (p_handle->p_mask = p_handle->p_count = j = 0;
j < MAX_INTERFACE_SLOTS; j++)
{
if (ndev_state[j])
{
register P_HANDLE *new_p_handle;
new_p_handle = KMALLOC(sizeof(P_HANDLE),
GFP_KERNEL);
if (!new_p_handle)
break;
memset(new_p_handle, 0, sizeof(P_HANDLE));
#if USE_LOCAL_BUFFER
new_p_handle->buffer =
KMALLOC(MAX_BUFFER_SIZE, GFP_KERNEL);
if (!new_p_handle->buffer)
{
kfree(new_p_handle);
break;
}
memset(new_p_handle->buffer, 0, MAX_BUFFER_SIZE);
new_p_handle->length = MAX_BUFFER_SIZE;
#endif
new_p_handle->opened = –1;
new_p_handle->instance = (ULONG) sock;
new_p_handle->vinterface = –1;
new_p_handle->dev = NULL;
if (dev)
{
new_p_handle->vinterface = dev->ifindex;
new_p_handle->dev = dev;
}
new_p_handle->interface = j;
new_p_handle->minor = 0;
new_p_handle->slot_id = 0;
new_p_handle->slot_anchor = –1;
new_p_handle->offset_anchor = 0;
new_p_handle->pindex_anchor = 0;
new_p_handle->anchor_date_limit = 0;
new_p_handle->anchor_limit = 0;
new_p_handle->slot_instance = 0;
new_p_handle->pindex = 0;
new_p_handle->index = 0;
new_p_handle->offset = 0;
new_p_handle->slot_offset = 0;
new_p_handle->turbo_slot = –1;
new_p_handle->turbo_index = 0;
new_p_handle->turbo_offset = 0;
#if LINUX_26
new_p_handle->start.tv_sec = CURRENT_TIME.tv_sec;
#else
new_p_handle->start.tv_sec = CURRENT_TIME;
#endif
new_p_handle->start.tv_usec = 0;
new_p_handle->end.tv_sec = 0xFFFFFFFF;
new_p_handle->end.tv_usec = 0xFFFFFFFF;
new_p_handle->flags = –1;
new_p_handle->next = NULL;
new_p_handle->prior = NULL;
#if ZERO_NEXT_TIMESTAMP
new_p_handle->next_timestamp.tv_sec = 0;
new_p_handle->next_timestamp.tv_usec = 0;
#else
new_p_handle->next_timestamp.tv_sec = 0xFFFFFFFF;
new_p_handle->next_timestamp.tv_usec = 0xFFFFFFFF;
#endif
if ((p_handle->vinterface != –1) &&
(p_handle->vinterface < MAX_INTERFACE_SLOTS)
```

-continued

```
&&
(vbitmap[p_handle->vinterface]))
{
new_p_handle->bitmap = vbitmap[p_handle-
>vinterface];
new_p_handle->bitmap_size = sizeof(BITMAP);
}
p_handle->p_array[p_handle->p_count] = new_p_handle;
p_handle->p_state[p_handle->p_count] = 0;
p_handle->p_count++;
}
}
}
}
return 0;
}
int release_event(struct socket *sock)
{
struct sock *sk = sock->sk;
register int j;
P_HANDLE *p_handle, *m_handle;
if (sk->priv_data)
{
p_handle = (P_HANDLE *)sk->priv_data;
for (j=0; j < p_handle->p_count; j++)
{
if (p_handle->p_array[j])
{
m_handle = p_handle->p_array[j];
#if USE_LOCAL_BUFFER
if (m_handle->buffer)
kfree(m_handle->buffer);
#endif
kfree(m_handle);
p_handle->p_array[j] = 0;
}
}
#if USE_LOCAL_BUFFER
if (p_handle->buffer)
kfree(p_handle->buffer);
#endif
kfree(p_handle);
sk->priv_data = NULL;
}
return 0;
}
```

Subsequent IOCTL calls to the virtual device return the next packet in the stream. For merge slot chains, the IOCTL call returns the oldest packet for the entire array of open slot chains. This allows virtual interfaces ifm0 and ifm1 to return the entire payload of a captured system to user space applications though a virtual adapter interface. P_HANDLE contexts are unique and by default, are indexed to the current time the virtual interface is opened relative to the time domain position in a captured slot chain. This mirrors the actual behavior of a physical network adapter. It is also possible through the P_HANDLE context to request a starting point in the slot chain at a time index that is earlier or later than the current time a virtual interface was opened. This allows user space application to move backwards or forward in time on a captured slot chain and replay network traffic. Virtual interfaces can also be configured to replay data to user space applications with the exact UTC/microsecond timings the network data was actually received from the network segments and archived.

Playback is performed in a slot receive event that is also hooked to the underlying operating system sys_recvmsg sockets call. calls to recvmsg redirect socket reads to the DSFS slot cache store and read from the mapped slot chain for a particular virtual interface adapter.

The sys_recvmsg algorithm for redirecting operating system user space requests to read a socket from a virtual interface is described as:

```
int receive_event(struct socket *sock, struct msghdr *msg,
int len, int flags, struct timeval *stamp)
{
struct net_device *dev;
struct sock *sk = NULL;
register P_HANDLE *p_handle = NULL;
register P_HANDLE *new_p_handle = NULL;
register int ifindex;
if (!sock)
return -EBADF;
sk = sock->sk;
if (!sk)
return -EBADF;
// not mapped to virtual interface
p_handle = (P_HANDLE *)sk->priv_data;
if (!p_handle)
return 0;
ifindex = p_handle->vinterface;
if (ifindex == -1)
return -EBADF;
if ((sk->sk_family & PF_PACKET) &&
(ifindex <= MAX_INTERFACE_SLOTS) && (sk->priv_data))
{
if (ifp_state[ifindex])
{
register ULONG pindex, copied;
ULONG length = 0;
READ_ELEMENT_HEADER header;
read_again:;
if (ifp_merge[ifindex])
{
new_p_handle = get_merge_target(p_handle, NULL,
NULL);
if (!new_p_handle)
return -ENOENT;
}
else
{
new_p_handle = p_handle;
p_handle->interface = get_ifp_mapping(ifindex);
if (p_handle->interface < 0)
return -EBADF;
}
pindex = read_chain_packet(new_p_handle->interface, msg,
len,
new_p_handle, &length, stamp, &header,
&new_p_handle->start, &new_p_handle-
>end,
NULL);
if (pindex = = -ENOENT)
{
#if VERBOSE
P_Print("-ENOENT\n");
#endif
return pindex;
}
if (pindex = = 0xFFFFFFFF)
{
#if VERBOSE
P_Print("pindex = = 0xFFFFFFFF\n");
#endif
if (flags & MSG_DONTWAIT)
return -EAGAIN;
if (!pm_sleep(VIRTUAL_SLEEP))
goto read_again;
return 0;
}
if (!length)
{
#if VERBOSE
P_Print("!length\n");
#endif
if (flags & MSG_DONTWAIT)
return -EAGAIN;
if (!pm_sleep(VIRTUAL_SLEEP))
```

```
goto read_again;
return 0;
}
copied = length;
if (copied> len)
{
copied = len;
msg->msg_flags |= MSG_TRUNC;
}
if (sock->type = = SOCK_PACKET)
{
struct sockaddr_pkt *spkt =
(struct sockaddr_pkt *)msg->msg_name;
if (spkt)
{
dev = dev_get_by_index(ifindex);
if (dev)
{
spkt->spkt_family = dev->type;
strncpy(spkt->spkt_device, dev->name,
sizeof(spkt->spkt_device));
spkt->spkt_protocol = header.protocol;
if solera_rx(dev, length, 0);
dev_put(dev);
}
}
}
else
{
struct sockaddr_ll *sll =
(struct sockaddr_ll *)msg->msg_name;
if (sll)
{
sll->sll_family = AF_PACKET;
sll->sll_ifindex = ifindex;
dev = dev_get_by_index(ifindex);
if (dev)
{
sll->sll_protocol = header.protocol;
sll->sll_pkttype = header.type;
sll->sll_hatype = dev->type;
sll->sll_halen = dev->addr_len;
memcpy(sll->sll_addr, dev->dev_addr, dev->
addr_len);
if solera_rx(dev, length, 0);
dev_put(dev);
}
else
{
sll->sll_hatype = 0;
sll->sll_halen = 0;
}
}
}
if (ifp_time_state[ifindex] &&
stamp && (stamp->tv_sec || stamp->tv_usec))
{
if ((ifp_delay_table[ifindex].tv_sec) ||
(ifp_delay_table[ifindex].tv_usec))
{
long long usec = 0;
unsigned long sec = 0, i;
long long last_usec = 0, curr_usec = 0;
register ULONG usec_per_jiffies = 1000000 / HZ;
register ULONG j_usec;
i = ifindex;
last_usec = (ifp_delay_table[i].tv_sec * 1000000) +
ifp_delay_table[i].tv_usec;
curr_usec = (stamp->tv_sec * 1000000) + stamp-
>tv_usec;
if (curr_usec > last_usec)
{
usec = curr_usec – last_usec;
#if VERBOSE
printk("last-%lld curr-%lld usec-%lld\n",
last_usec, curr_usec, usec);
#endif
while (usec >= 1000000)
{
    usec -= 1000000;
    sec++;
}
#if VERBOSE
printk("sec-%u usec-%lld\n", (unsigned) sec, usec);
#endif
if (sec)
{
if (pi_sleep(sec))
goto end_timeout;
}
if ((usec) && (usec < 1000000))
{
j_usec = (ULONG)usec;
schedule_timeout(j_usec / usec_per_jiffies);
}
}
}
end_timeout:;
ifp_delay_table[ifindex].tv_sec = stamp->tv_sec;
ifp_delay_table[ifindex].tv_usec = stamp->tv_usec;
}
length = (flags & MSG_TRUNC) ? length: copied;
return length;
}
}
return 0;
}
```

Figure 35:
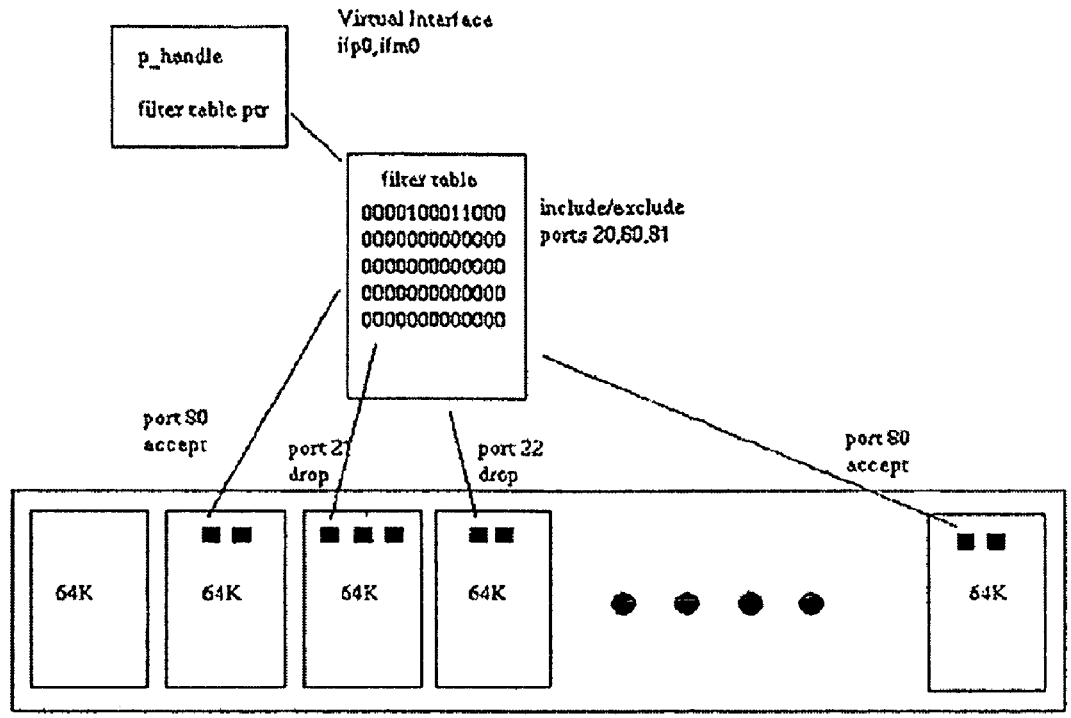
FIG. 35 depicts the use of a filter table to include or exclude packet data from a slot cache element.

Virtual network interface mappings also employ an include/exclude mask of port/protocol filters that is configured via a separate IOCTL call and maps a bit table of include/exclude ports to a particular virtual network interface. FIG. 35 depicts the use of a filter table to include or exclude packet data from a slot cache element. The algorithm that supports this will filter those network packets that do not match the search criteria from the sys_recvmsg socket based packet stream that is returned to user space applications. This allows virtual interfaces to be configured to return only packets that meet pre-determined port criteria, which is useful for those applications that may only need to analyze HTTP (web traffic). The actual implementation requires pre-defined bit tables to be created in user space by a system administrator, then these tables are copied into the DSFS slot cache store and associated with a particular virtual interface adapter. Packets that do not meet the filer parameters are skipped in the store and not returned to user space.

The algorithm that performs the filtering of network packets from open slot chains is more fully described as:

```
int int_bitmap_match(SLOT_BUFFER_HEADER *slot,
READ_ELEMENT_HEADER *element,
BITMAP *bitmap)
{
register int ip_hdr_len, s, d;
unsigned char *data;
struct iphdr *ip;
struct tcphdr *tcp;
struct udphdr *udp;
register int ie_ret = 1;
#if VERBOSE
P_Print("bitmap %08X\n",
(unsigned)bitmap);
#endif
if (!bitmap || !bitmap->ie_flag)
return 1;
switch (bitmap->ie_flag & IE_MASK)
{
case 0: // exclude
#if VERBOSE
```

```
P_Print("exclude set\n");
#endif
ie_ret = 1;
break;
case 1: // include
#if VERBOSE
P_Print("include set\n");
#endif
ie_ret = 0;
break;
default:
#if VERBOSE
P_Print("default set\n");
#endif
ie_ret = 1;
break;
}
data = (BYTE *)((ULONG)element +
sizeof(ELEMENT_HEADER));
switch (slot->b->dev_type)
{
// Ethernet device
case 0:
case ARPHRD_ETHER:
case ARPHRD_LOOPBACK:
#if VERBOSE
P_Print("ETHER dev_type %X protocol-%X ie_ret %d\n",
(unsigned)slot->b->dev_type,(unsigned)ntohs(element-
>protocol),
(int)ie_ret);
#endif
switch (ntohs(element->protocol))
{
case ETH_P_802_3:
case ETH_P_802_2:
return ie_ret;
// Ethernet II, IP
case ETH_P_IP:
ip = (struct iphdr *)((ULONG)data + sizeof(struct ethhdr));
ip_hdr_len = ip->ihl * 4;
switch (ip->protocol)
{
case IPPROTO_TCP:
tcp = (struct tcphdr *)((ULONG)ip + ip_hdr_len);
#if VERBOSE
P_Print("TCP source %d dest %d \n",
(int)ntohs(tcp->source), (int)ntohs(tcp->dest));
#endif
if (bitmap->ie_flag & SOURCE_MASK)
{
s = ntohs(tcp->source);
if (bitmap->bitmap[s >>3] & (1<< (s & 7)))
{
#if VERBOSE
P_Print("hit TCP source %d dest %d ret-%d\n",
(int)ntohs(tcp->source), (int)ntohs(tcp->dest),
((bitmap->ie_flag & IE_MASK) ? 1 : 0));
#endif
return ((bitmap->ie_flag & IE_MASK) ? 1 : 0);
}
}
if (bitmap->ie_flag & DEST_MASK)
{
d = ntohs(tcp->dest);
if (bitmap->bitmap[d >> 3] & (1<< (d & 7)))
{
#if VERBOSE
P_Print("hit TCP source %d dest %d ret-%d\n",
(int)ntohs(tcp->source), (int)ntohs(tcp->dest),
((bitmap->ie_flag & IE_MASK) ? 1 : 0));
#endif
return ((bitmap->ie_flag & IE_MASK) ? 1 : 0);
}
}
return ie_ret;
case IPPROTO_UDP:
udp = (struct udphdr *)((ULONG)ip + ip_hdr_len);
#if VERBOSE
P_Print("UDP source %d dest %d \n",
(int)ntohs(udp->source), (int)ntohs(udp->dest));
#endif
if (bitmap->ie_flag & SOURCE_MASK)
{
s = ntohs(udp->source);
if (bitmap->bitmap[s >>3] & (1<< (s & 7)))
{
#if VERBOSE
P_Print("hit UDP source %d dest %d ret-%d\n",
(int)ntohs(udp->source), (int)ntohs(udp->dest),
((bitmap->ie_flag & IE_MASK) ? 1 : 0));
#endif
return ((bitmap->ie_flag & IE_MASK) ? 1 : 0);
}
}
if (bitmap->ie_flag & DEST_MASK)
{
d = ntohs(udp->dest);
if (bitmap->bitmap[d>>3] & (1<< (d & 7)))
{
#if VERBOSE
P_Print("hit UDP source %d dest %d ret-%d\n",
(int)ntohs(udp->source), (int)ntohs(udp->dest),
((bitmap->ie_flag & IE_MASK) ? 1 : 0));
#endif
return ((bitmap->ie_flag & IE_MASK) ? 1 : 0);
}
}
return ie_ret;
default:
return ie_ret;
}
return ie_ret;
}
return ie_ret;
// Raw IP
case ARPHRD_PPP:
#if VERBOSE
P_Print("PPP dev_type %X protocol-%X ie_ret %d\n",
(unsigned)slot->b->dev_type, (unsigned)ntohs(element-
>protocol),
(int)ie_ret);
#endif
if (ntohs(element->protocol) != ETH_P_IP)
return ie_ret;
ip = (struct iphdr *)data;
ip_hdr_len = ip->ihl * 4;
switch (ip->protocol)
{
case IPPROTO_TCP:
tcp = (struct tcphdr *)((ULONG)ip + ip_hdr_len);
#if VERBOSE
P_Print("TCP source %d dest %d \n",
(int)ntohs(tcp->source), (int)ntohs(tcp->dest));
#endif
if (bitmap->ie_flag & SOURCE_MASK)
{
s = ntohs(tcp->source);
if (bitmap->bitmap[s >> 3] & (1<< (s & )))
{
return ((bitmap->ie_flag & IE_MASK) ? 1 : 0);
}
}
if (bitmap->ie_flag & DEST_MASK)
{
d = ntohs(tcp->dest);
if (bitmap->bitmap[d>> 3] & (1<< (d & 7)))
{
return ((bitmap->ie_flag & IE_MASK) ? 1 : 0);
}
}
return ie_ret;
case IPPROTO_UDP:
udp = (struct udphdr *)((ULONG)ip + ip_hdr_len);
#if VERBOSE
P_Print("UDP source %d dest %d \n",
(int)udp->source, (int)udp->dest);
#endif
if (bitmap->ie_flag & SOURCE_MASK)
```

-continued

```
{
s = ntohs(udp->source);
if (bitmap->bitmap[s >> 3] & (1<< (s & 7)))
{
return ((bitmap->ie_flag & IE_MASK) ? 1 : 0);
}
}
if (bitmap->ie_flag & DEST_MASK)
{
d = ntohs(udp->dest);
if (bitmap->bitmap[d >> 3] & (1<< (d & 7)))
{
return ((bitmap->ie_flag & IE_MASK) ? 1 : 0);
}
}
return ie_ret;
default:
return ie_ret;
}
return ie_ret;
default:
return ie_ret;
}
return ie_ret;
}
```

Figure 36:
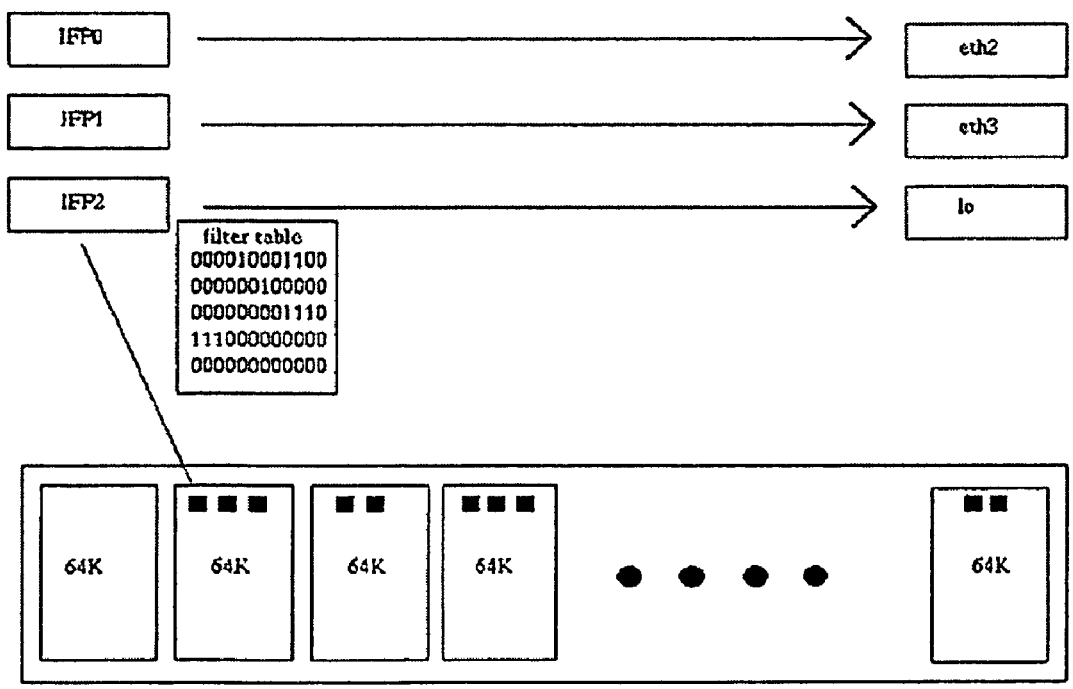
FIG. 36 depicts a Virtual Interface mapped to a specific shot chain.

Virtual network interfaces can also be used to regenerate captured network traffic onto physical network segments for playback to downstream IDS appliances and network troubleshooting consoles. FIG. 36 depicts a Virtual Interface mapped to a specific shot chain. Virtual Network interfaces also can employ a filter bit table during regeneration to filter out network packets that do not conform with specific include/exclude mask criteria. Virtual Network interfaces can be configured to regenerate network traffic at full physical network line rates or at the rates and UTC/microsecond timing the network packets were captured. Time replay virtual network interfaces (ift#) are employed to replay captured traffic to downstream devices that need to receive traffic at the original capture timing. Raw Virtual Network Interfaces (ifp#) will replay captured and filtered content at the full line supported by the physical interface.

When a virtual interface encounters end of stream (0xFFFFFFFF) the call will block on an interruptible system semaphore until more packets are received at the end of the slot chain. Captured network traffic can be regenerated from multiple virtual network interfaces onto a single physical network interface, and filters may also be employed. This implementation allows infinite capture of network traffic and concurrent playback to downstream IDS appliances and support for real-time user space applications monitoring of captured network data.

Regeneration creates a unique process for each regenerated virtual network interface to physical interface session. This process reads from the virtual network device and outputs the data to the physical interface upon each return from a request to read a slot chain. A P_HANDLE context is maintained for each unique regeneration session with a unique view into the captured slot chain being read.

The regeneration process con be configured to limit data output on a physical segment in 1 mb/s (megabit per second) increments. The current embodiment of the invention allows these increments to span 1-10000 mb/s configurable per regeneration thread.

Regeneration steps consist of mapping a P_HANDLE context to a virtual interface adapter and reading packets from an active slot chain until the interface reaches the end of the slot chain and blocks until more packet traffic arrives. As the packets are read from the slot chain, they are formatted into system dependent transmission units (skb's on Linux) and queued for transmission on a target physical network interface.

The regeneration algorithm meters the total bytes transmitted over a target physical interface relative to the defined value for maximum bytes per second set by the user space application that initiated a regeneration process. The current embodiment of packet and protocol regeneration is instrumented as a polled method rather than event driven method.

The regeneration algorithm is more fully described as:

```
int regen_data(void *arg)
{
register ULONG pindex;
struct sk_buff *skb;
long long size;
int err, skb_len, tx_queue_len;
ULONG length = 0;
VIRTUAL_SETUP *v = (VIRTUAL_SETUP *)arg;
P_HANDLE *p_handle;
register ULONG s_pindex, s_index, s_offset, s_turbo_slot,
    s_turbo_index;
long long s_turbo_offset;
struct net_device *dev;
#if LINUX_26
daemonize("if_regen%d", (int)v->pid);
#else
sprintf(current->comm, "if_regen%d", (int)v->pid);
daemonize( );
#endif
regen_active++;
v->active++;
dev = dev_get_by_index(v->pindex);
if (!dev)
return 0;
tx_queue_len = dev->tx_queue_len;
dev->tx_queue_len = 60000;
dev_put(dev);
while (v->ctl)
{
retry:;
if (v->interval)
{
#if LINUX_26
v->currtime = CURRENT_TIME.tv_sec;
#else
v->currtime = CURRENT_TIME;
#endif
if (v->lasttime = = v->currtime)
{
if (v->totalbytes >= (v->interval * (1000000/ 8)))
{
pi_sleep(1);
goto retry;
}
}
}
if (kill_regen)
break;
skb = create_xmit_packet(v->pindex, &err, &skb_len);
if (!skb)
{
switch (err)
{
case -ENXIO:
v->retry_errors++;
v->interface_errors++;
if (!pm_sleep(VIRTUAL_SLEEP))
goto retry;
goto exit_process;
case -ENETDOWN:
v->interface_errors++;
v->retry_errors++;
if (!pm_sleep(VIRTUAL_SLEEP))
goto retry;
goto exit_process;
```

```
case -EMSGSIZE:
    v->size_errors++;
    v->retry_errors++;
    if (!pm_sleep(VIRTUAL_SLEEP))
        goto retry;
    goto exit_process;
case -EINVAL:
    v->fault_errors++;
    v->retry_errors++;
    if (!pm_sleep(VIRTUAL_SLEEP))
        goto retry;
    goto exit_process;
case -ENOBUFS:
    v->no_buffer_errors++;
    v->retry_errors++;
    if (!pm_sleep(VIRTUAL_SLEEP))
        goto retry;
    goto exit_process;
default:
    v->fault_errors++;
    v->retry_errors++;
    if (!pm_sleep(VIRTUAL_SLEEP))
        goto retry;
    goto exit_process;
    }
}
read_again: ;
if ((kill_regen) || (!v->ctl))
{
    release_skb(skb);
    goto exit_process;
}
p_handle = v->p_handle;
if (!p_handle)
{
    release_skb(skb);
    goto exit_process;
}
s_pindex = p_handle->pindex;
s_index = p_handle->index;
s_offset = p_handle->offset;
s_turbo_slot = p_handle->turbo_slot;
s_turbo_index = p_handle->turbo_index;
s_turbo_offset = p_handle->turbo_offset;
pindex = regen_chain_packet(v->interface, skb, skb_len,
    p_handle,
    &length, NULL, NULL,
    &p_handle->start, &p_handle->end,
    v->d);
if (pindex = = -ENOENT)
{
    release_skb(skb);
    goto exit_process;
}
if (pindex = = 0xFFFFFFFF)
{
    if (!pm_sleep(VIRTUAL_SLEEP))
        goto read_again;
    release_skb(skb);
    goto exit_process;
}
if (!length)
{
    if (!pm_sleep(VIRTUAL_SLEEP))
        goto read_again;
    release_skb(skb);
    goto exit_process;
}
size = skb->len;
err = xmit_packet(skb);
if (err)
{
    p_handle->pindex = s_pindex;
    p_handle->index = s_index;
    p_handle->offset = s_offset;
    p_handle->turbo_slot = s_turbo_slot;
    p_handle->turbo_index = s_turbo_index;
    p_handle->turbo_offset = s_turbo_offset;
    v->retry_errors++;
    if (!pm_sleep(VIRTUAL_SLEEP))
        goto retry;
    goto exit_process;
    // v->packets_aborted++;
}
else
{
    v->bytes_xmit += size;
    v->packets_xmit++;
}
if (v->interval)
{
#if LINUX_26
    v->currtime = CURRENT_TIME.tv_sec;
#else
    v->currtime = CURRENT_TIME;
#endif
    if (v->lasttime != v->currtime)
        v->totalbytes = 0;
    v->totalbytes += size;
    v->lasttime = v->currtime;
}
}
exit_process:;
dev v dev_get_by_index(v->pindex);
if (!dev)
    return 0;
dev->tx_queue_len = tx_queue_len;
dev_put(dev);
v->active--;
regen_active--;
return 0;
}
```

Figure 37:
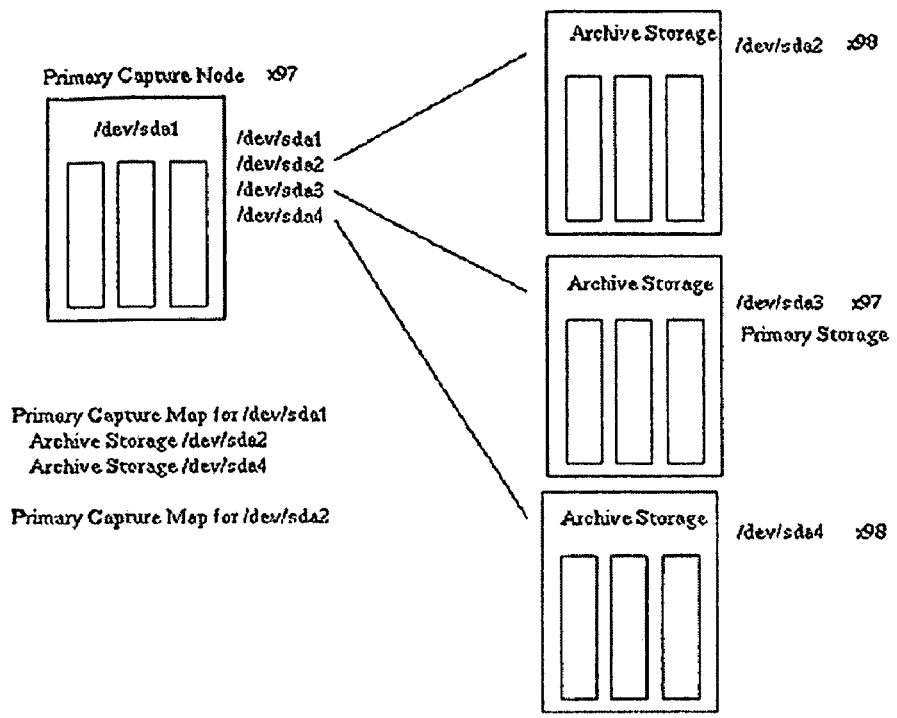
FIG. 37 depicts the DSFS primary capture node mapped onto multiple archive storage partitions.

The primary capture (type 0x97) disk space record for a DSFS system can be configured to map to multiple Archive Storage (type 0x98) partitions in an FC-AL clustered fiber channel System Area Network. FIG. 37 depicts the DSFS primary capture node mapped onto multiple archive storage partitions in FC-AL Raid Array. In this configuration, active slot LRU slot cache elements can be mirrored to flush in parallel to a remote pool of slot storage as well as the primary disk record store. This architecture allows large pools of cache storage to be instrumented over a SAN fiber channel network with the primary capture partition serving as a tiered cache that replicates captured slots into long term network storage. The DSFS also supports user-space replicating file systems such as Intermezzo, Coda, Unison and rsync of 0x97 type partitions to 0x98 partitions as is known in the art.

This architecture allows days, week, months, or even years of network packet data to be archived and indexed for off line post analysis operations, auditing, and network transaction accounting purposes.

Primary Capture partitions contain a table of mapped archive partitions that may be used to allocate slot storage. As slots are allocated and pinned by adapters and subsequently filled, if a particular primary storage partition has an associated map of archive storage partitions, the primary capture partitions creates dual I/O links into the archive storage and initiates a mirrored write of a particular slot to both the primary capture partition and the archive storage partition in tandem. Slot chains located on archive storage partitions only export two primary slot chains. The VFS dynamic presents the slots in a replica chain (chain 0) and an archive chain (1).

As slots are allocated from an Archive Storage partition, they are linked into the replica partition. Originating interface name, MAC address, and machine host name are also annotated in the additional tables present on a type 0x98 partition to identify the source name of the machine and interface information relative to a particular slot. Altering the attributes by setting an slot to read-only on an archive partition moves the slot from the replica slot chain (0) to the permanent archive slot chain (1). Slot allocation for selection of eligible targets for slot recycle on archive storage partitions is always biased to use the replica chain for slot reclamation. Slots stored on the archive slot chain (1) are only recycled if all slots in a given archive storage partition replica chain (0) have been converted to entries on the archive slot chain (1). In both cases, the oldest slots are targeted for recycle when an archive storage partition becomes fully populated. This allows forensic investigators the ability to pin specific slots of interest in an archive chain for permanent archival.

Figure 38:
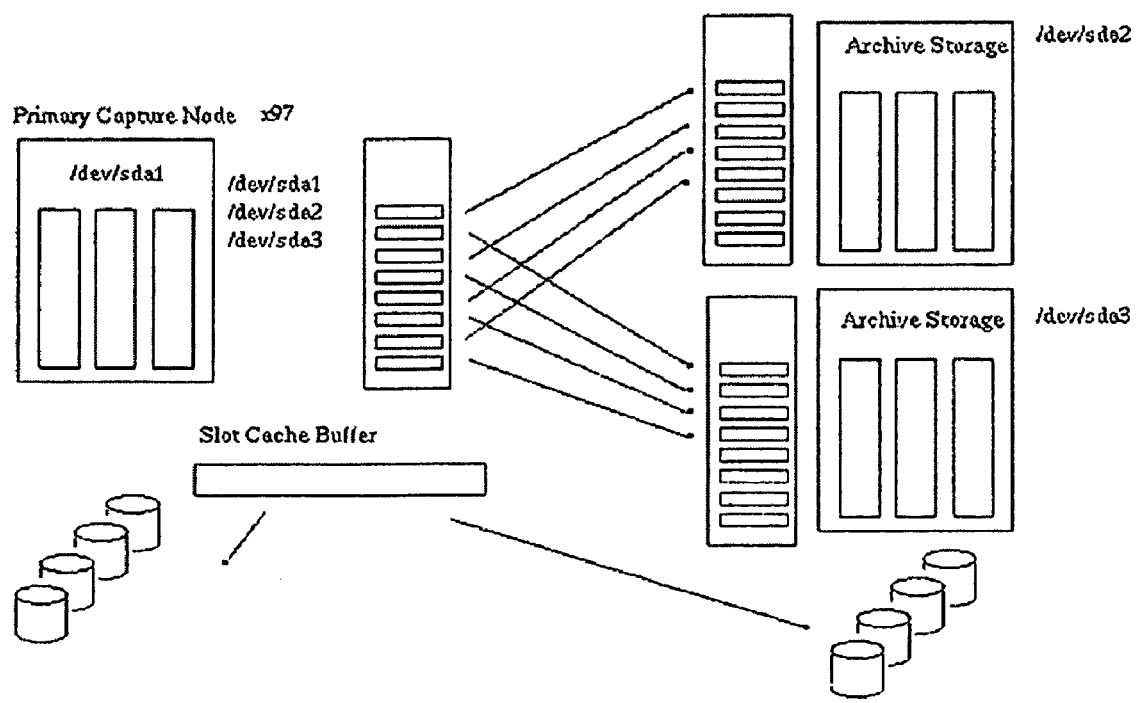
FIG. 38 depicts the use of a mirrored I/O model to write data simultaneously to two devices using direct DMA.

FIG. 38 depicts the use of a mirrored I/O model to write data simultaneously to two devices using direct DMA. The primary capture partition maintains a bitmap of slots that have completed I/O write transactions successfully to am archive storage partition. As slot buffer header writes are mirrored into dual storage locations, the Write I/O operations are tagged in an active bitmap that maintained in the Disk Space Record. This bitmap is maintained across mounts and individual entries are reset to 0 when a new slot is allocated on a primary capture partition. The bit is set when the slot has been successfully written to both the primary capture and archive storage partitions.

In the event a storage array has been taken off line temporarily, the slot bitmap table records a value of 0 for any slots that have not been mirrored due to system unavailability, and a background re-mirroring process is spawned when the off line storage becomes active and re-mirrors the slot cache elements onto the target archive storage partitions with a background process. The system can also be configured to simply drop captured slots on the primary capture partition and not attempt mirroring of slots lost during an off line storage event for a group of archive partitions.

To avoid elevator starvation cases for sector ordering during re-mirroring, slots may be re-mirrored backwards as a performance optimization starting at the bottom of a primary capture partition rather than at the beginning to prevent excessive indexing at the block I/O layer of the operating system of coalesced read and write sector run requests.

Figure 39:
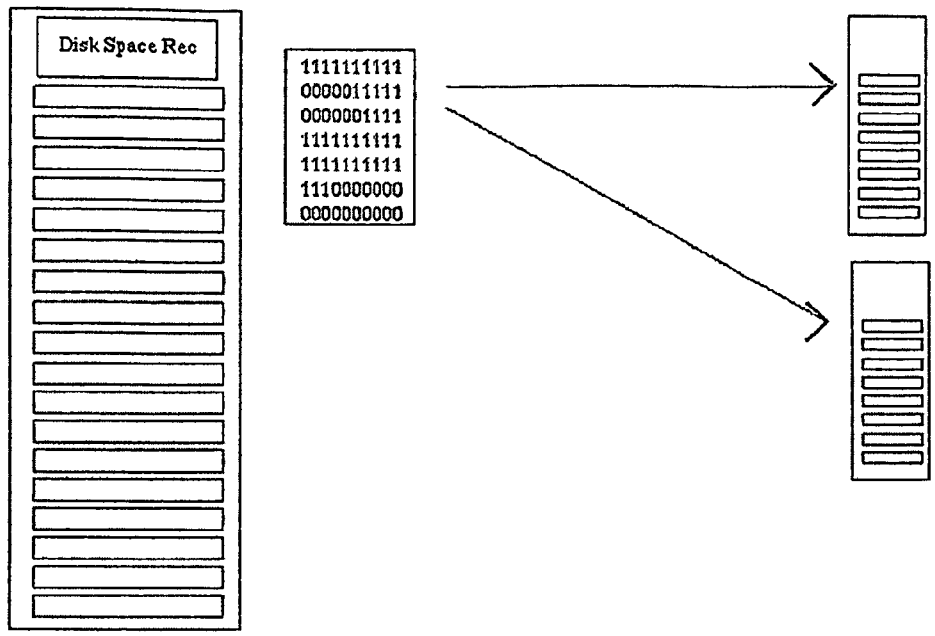
FIG. 39 depicts mirroring of captured data in a SAN (System Area Network) environment.

FIG. 39 depicts mirroring of captured data in a SAN (System Area Network) environment. Slot allocation for SAN attached storage arrays that host archive storage partitions (type 0x98) can be configured to allow stripe allocation of slots or contiguous slot allocation for a particular disk space record primary capture partition. Stripe allocation allows the primary capture partition to round robin a slot allocation for each entry in the primary capture map of archive storage partitions mapped to a primary capture partition. This allows distributed writes to be striped at a slot granularity across several remote fiber channel arrays in parallel and provides increased write performance. Contiguous allocation hard maps primary capture partitions to archive storage partitions in a linear fashion.

Figure 40:
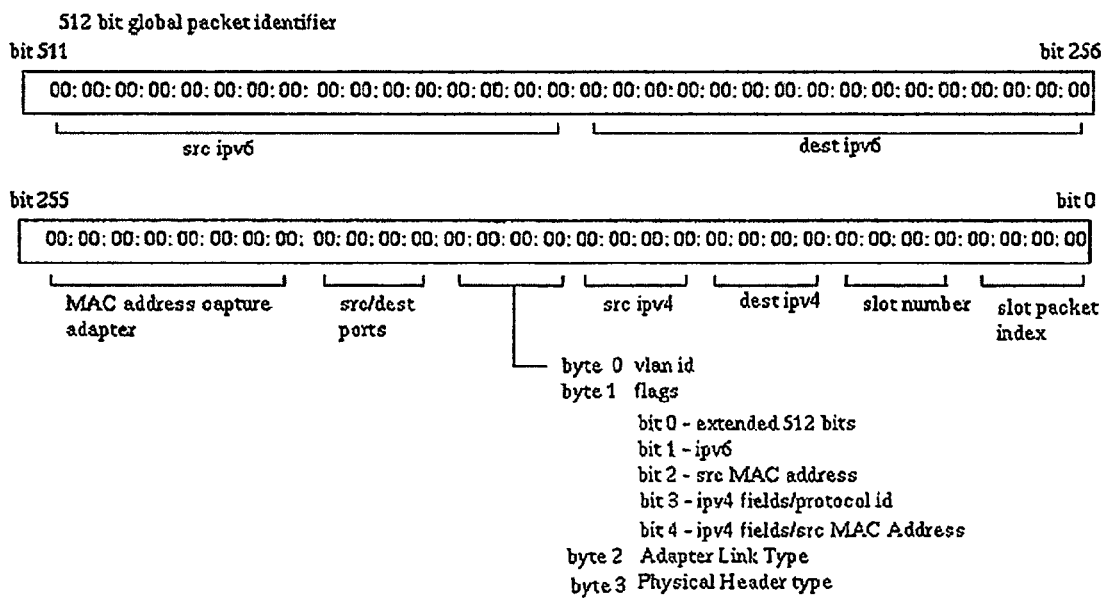
FIG. 40 depicts the method for tagging captured packets.

Off line indexing is supported by tagging each captured packet with a globally unique identifier that allows rapid searching and retrieval on a per packet basis of capture network packets. FIG. 40 depicts the method for tagging captured packets. These indexes are built during capture and combine the source MAC address of the capturing network adapter, the slot address and packet index within a slot, and protocol and layer 3 address information. These indexes are exposed through the /index subdirectory in the virtual file system per slot and are stored in 64K allocation clusters that are chained from the Slot Header located in the slot cache element.

Off line indexes allow external applications to import indexing information for captured network traffic into off line databases and allow rapid search and retrieval of captured network packets through user space P_HANDLE context pointers. The globally unique identifier is guaranteed to be unique since it incorporates the unique MAC address of the network adapter that captured the packet payload. The global packet identifier also stores Ipv4 and Ipv6 address information per packet and supports Ipv4 and Ipv6 indexing.

What is claimed is:

1. A method for capturing, storing, and retrieving pre-selected packets of data comprising the steps of:
   connecting at least one capture appliance to at least one predetermined data communications path;
   promiscuously capturing a predetermined portion of data communicated along the data communications path and replicating the predetermined portion of data in a volatile storage;
   aggregating the captured data in the volatile storage into a slot of the predetermined slot size by:
   a. creating a slot of predetermined size, comprised of a predetermined number of buffers, each buffer having a predetermined size; and
   b. collectively managing the slot based on a least recently used cache that maps the data in the slot to a non-volatile storage to create a cache image of the captured data across contiguous sectors of the non-volatile storage system using at least one high-performance parallel controller fabric to achieve striping and thereby allow the controller simultaneously to write to a plurality of non-volatile storage devices;
   annotating the aggregated data based on pre-determined heuristics and non-volatile storage characteristics annotated by fixed time domain and mapped addressed for transfer to the non-volatile storage;
   storing the annotated, aggregated data in the non-volatile storage using an infinitely journaled, write-once, hierarchical file system to create at least one index of a set of predetermined characteristics that are useable to retrieve the data;
   incorporating a means of reconstructing any corrupted data to ensure data accuracy;
   retrieving a predetermined portion of captured data from the stored slot by:
   a. identifying one or more characteristics of the data to be retrieved;
   b. computing the locality of the slot containing the data having the identified characteristics on the non-volatile storage;
   c. copying the data having the identified characteristics from the slot to the volatile storage using the least recently used algorithm to allocate space in the volatile storage;
   d. packaging and conforming the data having the identified characteristics to be accessible using industry standard access methods; and
   e. allowing a user to access and review the data having the identified characteristics.

* * * * *